United States Patent
Lehner

(10) Patent No.: US 8,775,349 B2
(45) Date of Patent: Jul. 8, 2014

(54) METHOD FOR PRODUCING AT LEAST ONE APPLICATION DESCRIPTION

(76) Inventor: Sascha Lehner, Bruehl (DE)

( * ) Notice: Subject to any disclaimer, the term of this patent is extended or adjusted under 35 U.S.C. 154(b) by 317 days.

(21) Appl. No.: 13/266,928

(22) PCT Filed: Apr. 28, 2010

(86) PCT No.: PCT/EP2010/002597
§ 371 (c)(1),
(2), (4) Date: Oct. 28, 2011

(87) PCT Pub. No.: WO2010/124853
PCT Pub. Date: Nov. 4, 2010

(65) Prior Publication Data
US 2012/0047100 A1    Feb. 23, 2012

(30) Foreign Application Priority Data

Apr. 30, 2009 (DE) .......................... 10 2009 019 319

(51) Int. Cl.
*G06F 17/00* (2006.01)
*G06N 5/02* (2006.01)
*G06F 17/21* (2006.01)
*G06F 17/24* (2006.01)
*G06F 17/22* (2006.01)

(52) U.S. Cl.
CPC ............ *G06F 17/211* (2013.01); *G06F 17/248* (2013.01); *G06F 17/2247* (2013.01)
USPC .......................................................... 706/46

(58) Field of Classification Search
CPC .. G06F 17/211; G06F 17/248; G06F 17/2247
See application file for complete search history.

(56) References Cited

U.S. PATENT DOCUMENTS

| 5,442,792 A | * | 8/1995 | Chun ............................ 717/155 |
| 5,815,717 A | | 9/1998 | Stack |
| 5,904,822 A | * | 5/1999 | Casavant ....................... 204/461 |
| 6,016,394 A | | 1/2000 | Walker |

FOREIGN PATENT DOCUMENTS

| DE | 195 23 036 A1 | 1/1996 |
| WO | 97/15882 A1 | 5/1997 |
| WO | 99/14651 A1 | 3/1999 |

OTHER PUBLICATIONS

Kuchar et al. "A Review of Conflict Detection and Resolution Modeling Methods", IEEE Transactions on Intelligent Transportation Systems, vol. 1, No. 4, 2000, pp. 179-189.*
Fisher et al. "Using Artificial Intelligence Planning to Generate Antenna Tracking Plans", AAAI, 1998, pp. 8.*

* cited by examiner

*Primary Examiner* — Li-Wu Chang
(74) *Attorney, Agent, or Firm* — Laurence A. Greenberg; Werner H. Stemer; Ralph E. Locher

(57) ABSTRACT

An application description is generated with a plurality of application blocks. First, at least one basic document is read in and analyzed. During the analysis of the basic document, a knowledge base is constructed with knowledge elements, wherein the knowledge elements recognized are at least one data field and/or at least one component, and the knowledge elements are preferably at least to some extent flagged as assumptions. Then, at least one conflict-free knowledge partition is determined, where the at least one knowledge partition has a respective set of conflict-free assumptions. The at least one application description is produced from the at least one knowledge partition with the application blocks.

43 Claims, 34 Drawing Sheets

Figure 1:
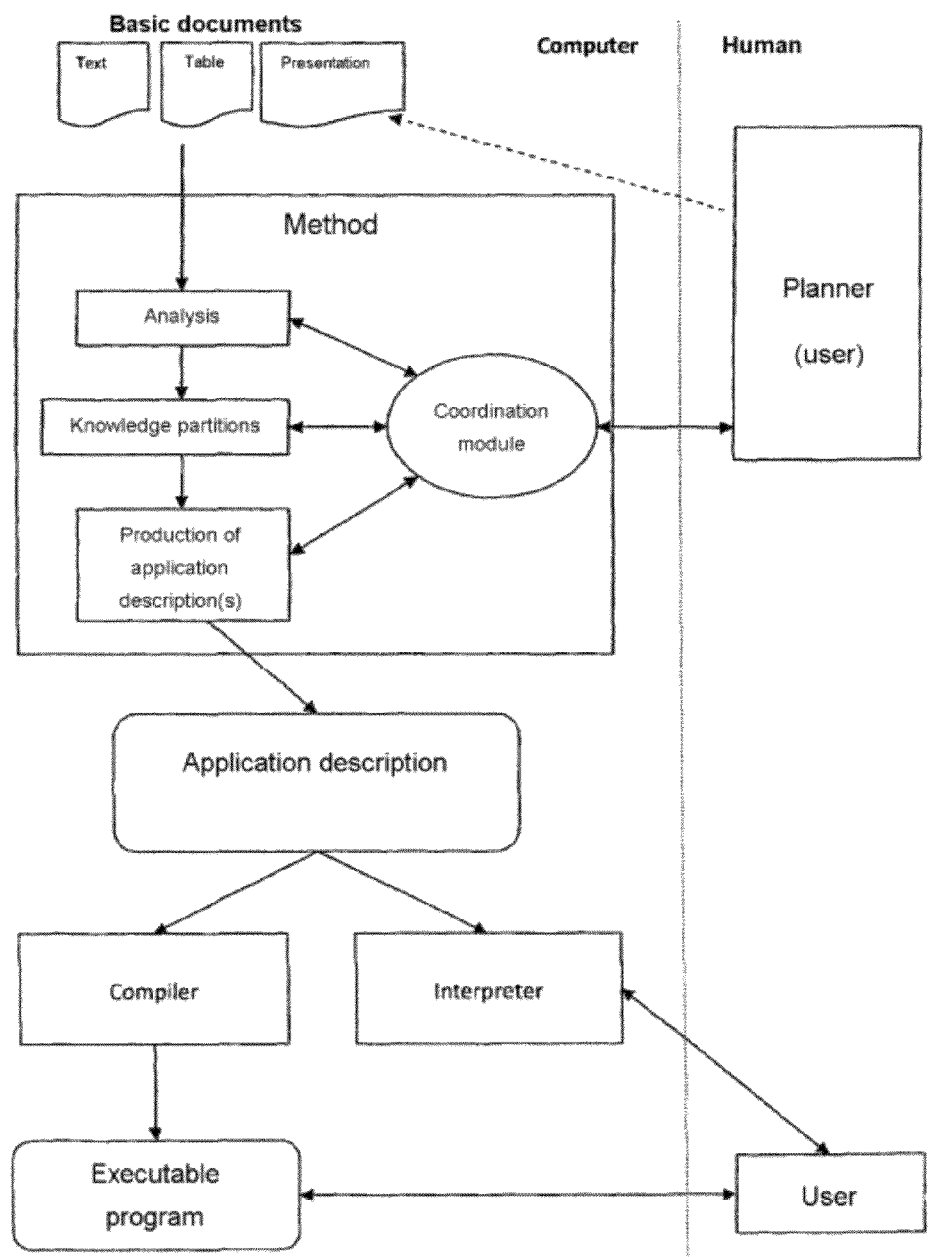

Basic document "Purchase order.doc":

| | |
|---|---|
| Sample firm · Am Platz 5 · 12345 Sample Town | Sample firm |
| | Am Platz 5 |
| | 12345 Sample Town |
| | Telephone: 01234 / 567-0 |
| | Fax: 01234 / 567-89 |

Name: Supplier — Type: Normal text
Name: Street — Type: Normal text
Name: Residence — Type: Normal text
Name: Zip code — Type: Normal text Order No. — Name: Order number, Type: Number
Your supplier number: — Name: Supplier number, Type: Number 27.04.2009 — Name: Date, Type: Current date We hereby order the following items from you:

Item        Quantity

This word carries the following comment:
"equals order quantity times parts list quantity"

FIG. 7

Basic document "Parts list.xls":

|   | A | B | C | D | E |
|---|---|---|---|---|---|
| 1 | Item order | Item purchase order | Supplier | Quantity | |
| 2 | 1000 | 975/3 | Müller GmbH | 1 | |
| 3 | 1000 | 35-blue | Franz Gerber | 4 | |
| 4 | 1001 | 976/2 | Müller GmbH | 2 | |
| 5 | 1001 | 35-blue | Franz Gerber | 5 | |
| 6 | | | | | |
| 7 | | | | | |

FIG. 8

Equals quantity times price
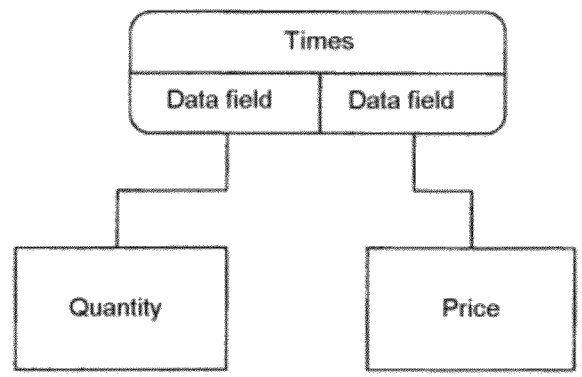
Equals order quantity times parts list quantity
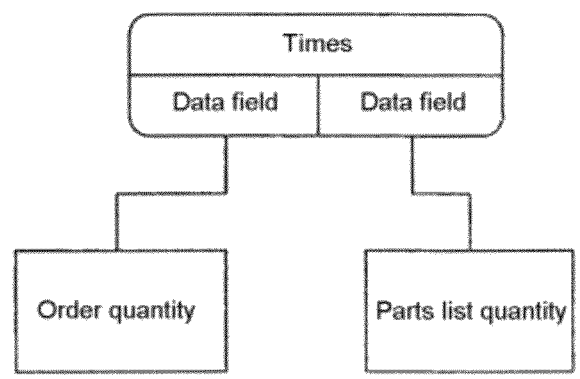
FIG. 13

☐ Maintain customer data, supplier data and parts list as appropriate (Customer data.xls, Supplier data.xls, Parts list.xls)

☐ Pick up order (Order.doc) and generate purchase orders

☐ Edit purchase orders (Purchase order.doc)

FIG. 19

Proposal 1 (basis: none, is always implemented)
Production of a document template block for the basic document "Order.doc", component 2

Proposal 2 (basis: none, is always implemented)
Production of a document template block for the basic document "Purchase order.doc", component 4

Proposal 3 (basis: none, is always implemented)
Production of a data source block for the data source object 1 ("parts list")

Proposal 4 (basis: none, is always implemented)
Production of a data source block for the data source object 2 ("customer list")

Proposal 5 (basis: none, is always implemented)
Production of the master data management for data source object 1 ("parts list") according to variant 2

Proposal 6 (basis: none, is always implemented)
Production of the master data management for data source object 2 ("customer list") according to variant 3

Proposal 7 (basis: assumption 10)
Production of a state block for component 2 ("order") as input component Proposal 8 (basis: assumption 10)
Production of a data source block for component 2

Proposal 9 (basis: assumption 10)
Production of a data source block for component 1

Proposal 10 (basis: assumption 18)
Production of a state block for component 4 ("purchase order") as input component Proposal 11 (basis: assumption 18)
Production of a data source block for component 4

Proposal 12 (basis: assumption 18)
Production of a data source block for component 3

Proposal 13 (basis: assumption 11)
Production of a state block for component 2 ("order") as output component Proposal 14 (basis: assumption 11)
Production of a data source block for component 2

Proposal 15 (basis: assumption 11)
Production of a data source block for component 1

Proposal 16 (basis: assumption 19)
Production of a state block for component 4 ("purchase order") as output component Proposal 17 (basis: assumption 19)
Production of a data source block for component 4

Proposal 18 (basis: assumption 19)
Production of a data source block for component 3

Proposal 19 (basis: assumption 109)
Connection between component 1 (source) and component 3 (destination) by component 5
Connecting data fields with source: date field 23 with data field 10
Connecting data fields with destination: data field 24 with data field 21

FIG. 21

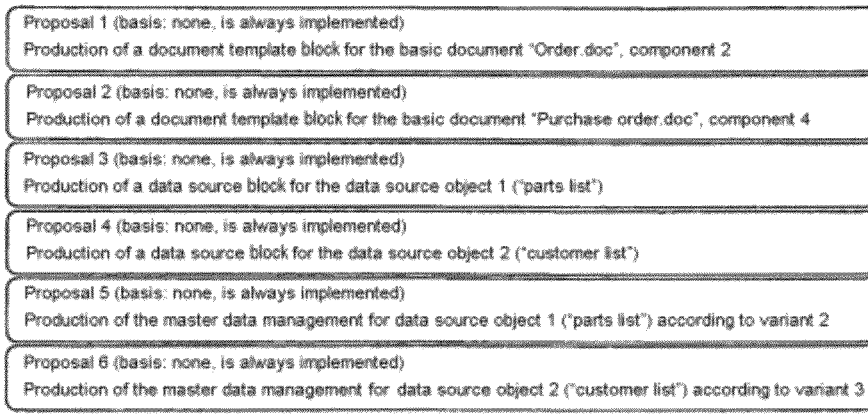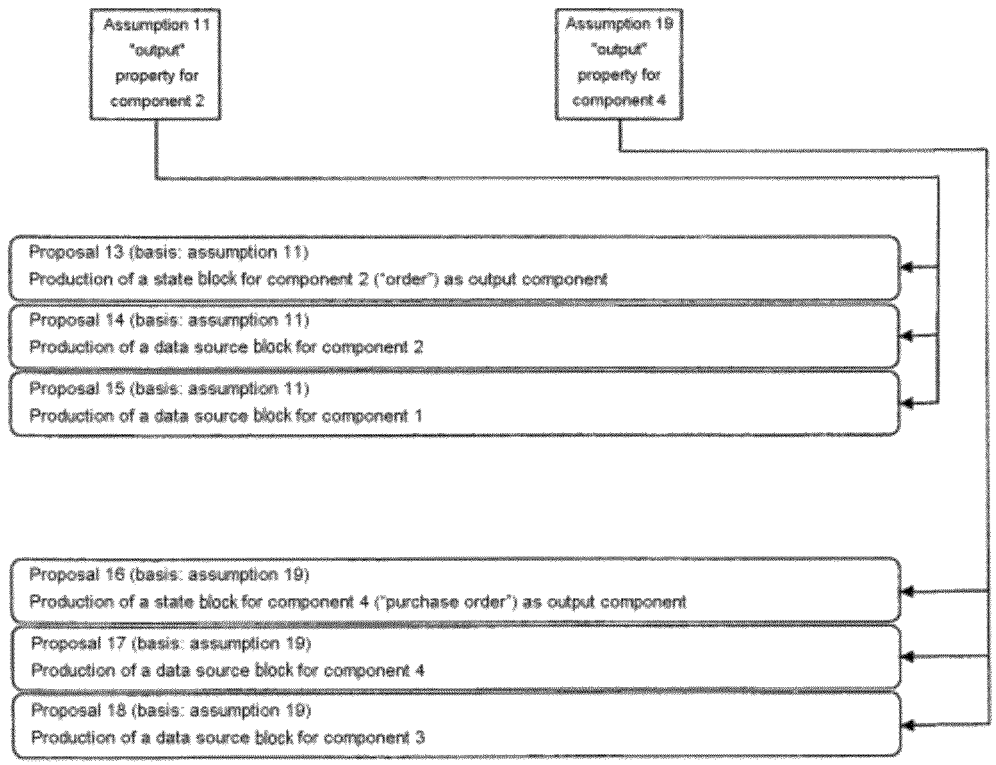
FIG. 25

METHOD FOR PRODUCING AT LEAST ONE APPLICATION DESCRIPTION

The invention relates to a method for producing at least one application description, having the following method step: the at least one application description is produced with a plurality of application blocks.

The present invention relates to the field of generative programming, wherein the method produces an application description. In computer-implemented form, the method is available as an application description generator. The application description generator is in the form of a computer program.

Methods for producing an application description and application description generators or program generators are known in the prior art.

WO 97/15882 discloses a method for producing an application description and an application description generator. The application description generator has an image editor which a human user can use to select program definitions, data definitions and field definitions from a plurality of input event elements. Various operator guidance questions are retrieved from a help file by the image editor when contents, programs, sequences, files and data records are defined by the user. In addition, operator guidance questions are selected by the image editor. In all cases, an appropriate starting text is presented which proposes the form and type of the user input response. As a result of the communication by the user with the image editor, the application description generator selects appropriate application blocks from which the application description is compiled.

WO 99/14651 discloses a method for producing an application description, namely for computer-aided database management software production. In this case, an application editor is to used to produce an application description, the application description representing the target software application and being created by the dialog with a human user. When the user begins to design the target software application, the application description is stored in a database—in this case called a dictionary. The application editor allows the user to input application designs hierarchically, so that application blocks which have not yet been defined can be referenced into higher application blocks.

DE 195 23 036 A1 discloses an application description generator. In the application description generator, an application description in the form of a source and object code is created automatically by virtue of the user using the workstation to work through the creation process for a physical file, a screen file, a form file and a program file. In this case, the program to be produced is compiled from 34 different application blocks. Each of the 34 application blocks is a source program in a partially finished state and comprises an individual portion B, which is altered for each application, and a basic body A, which is not altered. In this context, the application blocks can be classified coarsely into the following categories: system input generation, system query generation, primary maintenance generation, query window generation, printed receipt generation and change generation.

The application description generators known in the prior art and the methods for producing application descriptions are not yet of optimum design. The known methods and application description generators require a multiplicity of user inputs and special technical knowledge from the user about field definitions, form elements and the like. In addition, the known application description generators are inflexible and are each limited to a particular type of work process.

The invention is therefore based on the object of designing and developing a method and an application description generator for executing the method such that a user without specific technical IT knowledge can operate the application description generator and it is possible for various underlying work processes to be mapped largely automatically using the application description generator and the method.

The above object is now achieved for the method by
at least one basic document being read in,
the at least one basic document being analyzed, wherein during the analysis a knowledge base is constructed with knowledge elements, wherein the knowledge elements recognized are at least one data field and/or at least one component, and the knowledge elements are preferably at least to some extent flagged as assumptions,
at least one conflict-free knowledge partition being determined, wherein the at least one knowledge partition has a respective set of conflict-free assumptions,
wherein the at least one application description is produced from the at least one knowledge partition with the application blocks.

This method and, in the implementation as a computer program, the relevant application description generator allow electronically available basic documents and preferably data source objects—such as external databases—to be taken as a basis, without the intervention of a programmer or a human developer having technical IT knowledge, for producing an application description for execution on a computer, wherein inputs, functions and outputs of a work process are mapped and the work process is described implicitly by the electronic basic documents which have been read in. The method available in the form of a computer program can be called a designer or application designer, since the method creates the application description using the basic documents, and hence the underlying application is designed.

The application blocks used are preferably at least one data field block and at least one state block and preferably at least one action block.

In comparison with the known application description generators and methods, the present method affords a series of advantages:

The specification of the problem on which the work process is based arises directly from the basic documents used. A special functional specification for the programming is not necessary. The technical design of the application description and the programming of the application description are undertaken by the computer with the application description generator. There is therefore no need to use expensive specialists. The check on the application description is reduced to functional tests which can be performed by users, who do not need to be specialists, however.

If the specifications for a problem change, the method can then simply be reapplied to the changed basic documents. Complicated and error-prone adaptation of the executable application is not necessary. There is no need to adapt the already created application description generator.

The application description produced is, in principle, independent of a particular operating system. It can be ported to any desired operating system. The application description produced is available in digital form, for example in the form of one or more files, when the method has been executed.

The computer undertakes a series of tasks for the method which have been reserved for humans to date. The method and the application description generator provide a way of dealing with the problem by using technology, this problem not yet having been able to be overcome by technology to date. The method undertakes the design of computer applications. The design of computer applications is automated by the method. Overall, the method produces a significant gain in flexibility and speed for the development of applications or of application descriptions and at the same time a significant reduction in the costs of the application development.

The method or the application description generator uses no basic assumptions about the significance of the knowledge elements and also does not require them for its work. In particular, the method is not based on a particular type of work processes or of the finished products. The application description generator is not limited to individual work processes, such as bookkeeping, order handling, production control and the like. The application description generator can therefore be applied not only to the aforementioned work processes but also to other work processes. The fact that the method described here does not make any assumption regarding the type of work process and therefore does not make any assumption regarding a specific configuration for the knowledge elements means that the method does not need any technical knowledge from a human and can be used universally.

A work process is understood to mean a succession of activities which, in principle, can also be executed via a computer. The work process is described by the basic documents. The work process needs to be described by the basic documents not explicitly but rather merely implicitly. It suffices if the basic documents are designed in terms of their form and content such that a human would be capable, without extensive introduction into the work process, on the basis of the basic documents, to perform the work process completely with the basic documents in an electronic form or in paper form.

The method receives a set of basic documents, particularly at least one basic document, as an input. It is possible to read in a plurality of basic documents. In addition, the method can receive a data source object as an input, said data source object preferably likewise being read in. Reading in is understood to mean the provision of the basic documents and possibly the data source objects. Data source objects used may be particularly databases and/or other external "sources of data", such as interfaces to other programs.

As an output, the method produces an application description which is suitable for implementation on a computer system. The application description forms a formal representation of the work process. The application description describes all parts of the application unambiguously and completely using application blocks. The application description is a complete blueprint for the application which can either be executed by a computer program directly or can be translated into a directly executable program using a computer program. In the first case, the computer program as a runtime environment is of comparable design to an interpreter, and in the second case the computer program is comparable design to a compiler. In a further refinement, the application description itself may be available in machine language as a computer program and can thus be executed directly on a computer.

The basic documents and possibly the data source objects are analyzed automatically by the method. The method extracts the necessary knowledge for executing the mapped work process from the basic documents and the data source objects. To this end, during the analysis, a knowledge base is constructed with knowledge elements. At least one data field, particularly a plurality of data fields, and/or at least one component is/are recognized as knowledge elements. A component is defined as a set of data fields and the structure, which together form these data fields. Each component preferably has at least one data field. Preferably, however, further knowledge elements are also recognized, for example formulae, conditions, relationships between knowledge elements and data sources and also data source fields for mapping the data source objects and examples cited in the basic documents.

The recognized knowledge elements are preferably at least to some extent flagged as assumptions. In the simplest case, the knowledge elements are not flagged as assumptions, but rather the single knowledge partition then comprises the set of all the facts. In particular, the knowledge elements can be flagged as facts and assumptions, with facts also being able to be implemented as special cases of assumptions, namely as safe assumptions. Uncertain assumptions are provided with a plausibility and may also be in conflict with one another. Facts must not be in conflict with one another. Assumptions must not be in conflict with the facts. The knowledge elements recognized in this first substep are then analyzed in further substeps, with further knowledge elements and assumptions being formed. The analysis can be continued until no further assumptions and knowledge elements can be formed and no further analysis is possible.

In a further method step, the method determines at least one conflict-free knowledge partition. In particular, a plurality of knowledge partitions can be determined. The knowledge partition(s) preferably has/have all the facts and a respective finalized set of conflict-free assumptions. The knowledge partitions particularly comprise the facts and the finalized sets of conflict-free assumptions. The knowledge partitions are conflict-free and preferably finalized. A set of assumptions is conflict-free in this case when there are no two assumptions which are in conflict with one another. The set of assumptions for a knowledge partition is in each case preferably finalized. The set of assumptions is finalized when it is not possible to add further assumptions without violating the property of freedom from conflict.

Preferably, each knowledge partition is allocated a partition plausibility. The application description associated with the respective knowledge partition is produced only if the partition plausibility is greater than a particular setpoint plausibility. If the partition plausibility is great enough, the method produces a possible application description.

The application description is essentially compiled by different application blocks. During production, the at least one application description is created from the at least one knowledge partition with the application blocks. The application blocks used describe the function of the work process effectively from the point of view of general aspects through to detailed aspects.

In this case, it is essentially possible to distinguish between two types of application blocks, namely
- a first type of application blocks, which provides data and data processing for the application description, such as data field blocks, action blocks, formulae blocks and document template blocks; and
- a second type of application blocks, which provide the presentation and flow of the application description, such as state blocks, form element blocks, task blocks and condition blocks.

All data from the application description or from the basic documents are represented by data field blocks. A data field block may be of arbitrary type. Data field blocks may be attached by means of a data source block to a data source object, such as a database or a hardware interface, i.e. are able to load data from the data object and/or to store them therein. Action blocks or actions are initiated by user inputs or system events. An action block forms a series of commands. Formula blocks perform calculations and data manipulations. Formula blocks may be attached to data field blocks or can be called by action blocks. From document template blocks, it is possible for action blocks to produce document instances of the basic documents with data from the data field blocks.

The visible part of an application described by the application description is described by the state blocks. The flow logic for the application description is structured by the state blocks. A state block may essentially correspond to a form or a screen window. The visible part of an application, which part is described by the state blocks, may have a set of form elements or form element blocks. A form element block may have different functions, such as input and/or presentations of data from the data field blocks, initiation of an action block or a task block, changes to a condition with a condition block.

Task blocks are action blocks which initiate an input and/or an output and are started by the user directly or map these processes. Condition blocks map logic expressions which are dependent on data fields or data field blocks, particularly the values thereof. In this context, condition blocks may be constructed from elementary conditions. An elementary condition can map an arbitrary comparison of a data field with a value or with another data field; it is merely necessary to be able to perform comparison thereof.

The state blocks each comprise a set of form element blocks, action blocks and task blocks which are visible and available so long as the application is in the relevant state. The transition between states is described by action blocks and condition blocks. Condition blocks can automatically transfer the application to a new state, in which case the new state block becomes active as soon as the conditions are met. Conversely, a condition block or a condition can also prevent a particular state change by action blocks or other condition blocks from being possible. The application blocks produce the application description.

This application description forms the implementation of the work process. In this way, the user of the application description generator or of the method can be provided with one or more application descriptions which are based on respective knowledge partitions. The user or human planner can select one or more application descriptions, subsequently edit them and possibly clear them for further processing by one of the aforementioned computer programs.

Preferably, it is possible for questions to be put to the user. In this case, the possible responses can preferably be prescribed for the human user, and from these the user can then select the solution which is right for him.

The method is particularly suitable for work processes which involve a flow of input, processing and output of data, which flow can, in principle, be presented even without EDP using basic documents—e.g. forms and printed forms. The use of suitably defined basic documents means that the method is, in principle, also suitable for arbitrary work processes, however. By way of example, the method can be applied to basic documents which describe the input, processing and output of technical control data which are used for controlling a technical control process. The application description represents the work process. The method extracts the application description from the basic documents automatically using a computer system. The basic documents, the knowledge base and the application blocks and also all further data structures used are available in digital form and are processed via the computer system. The method can be executed on a computer system automatically. The associated application description can be executed as a computer program on the computer system and can be stored on a storage means.

Figure 2:
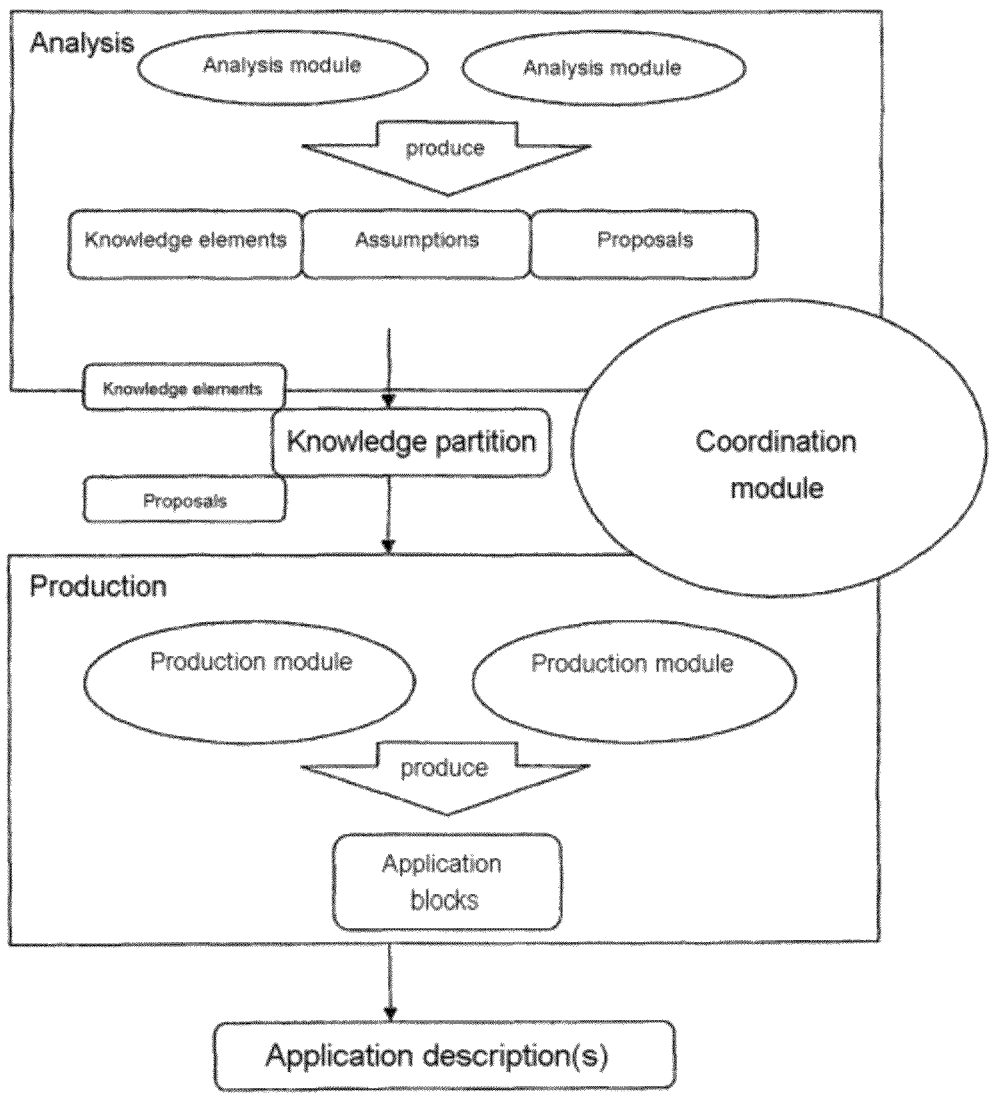
Figure 3:
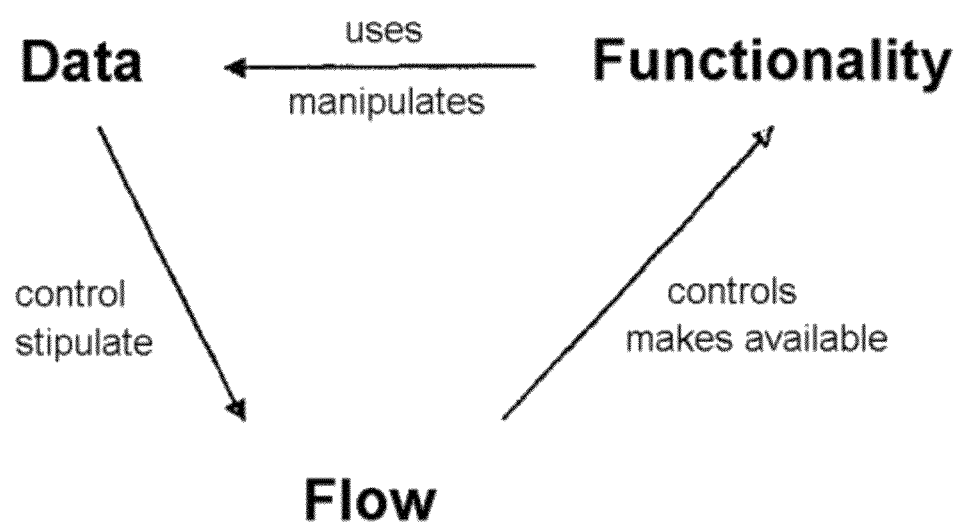
Figure 4:
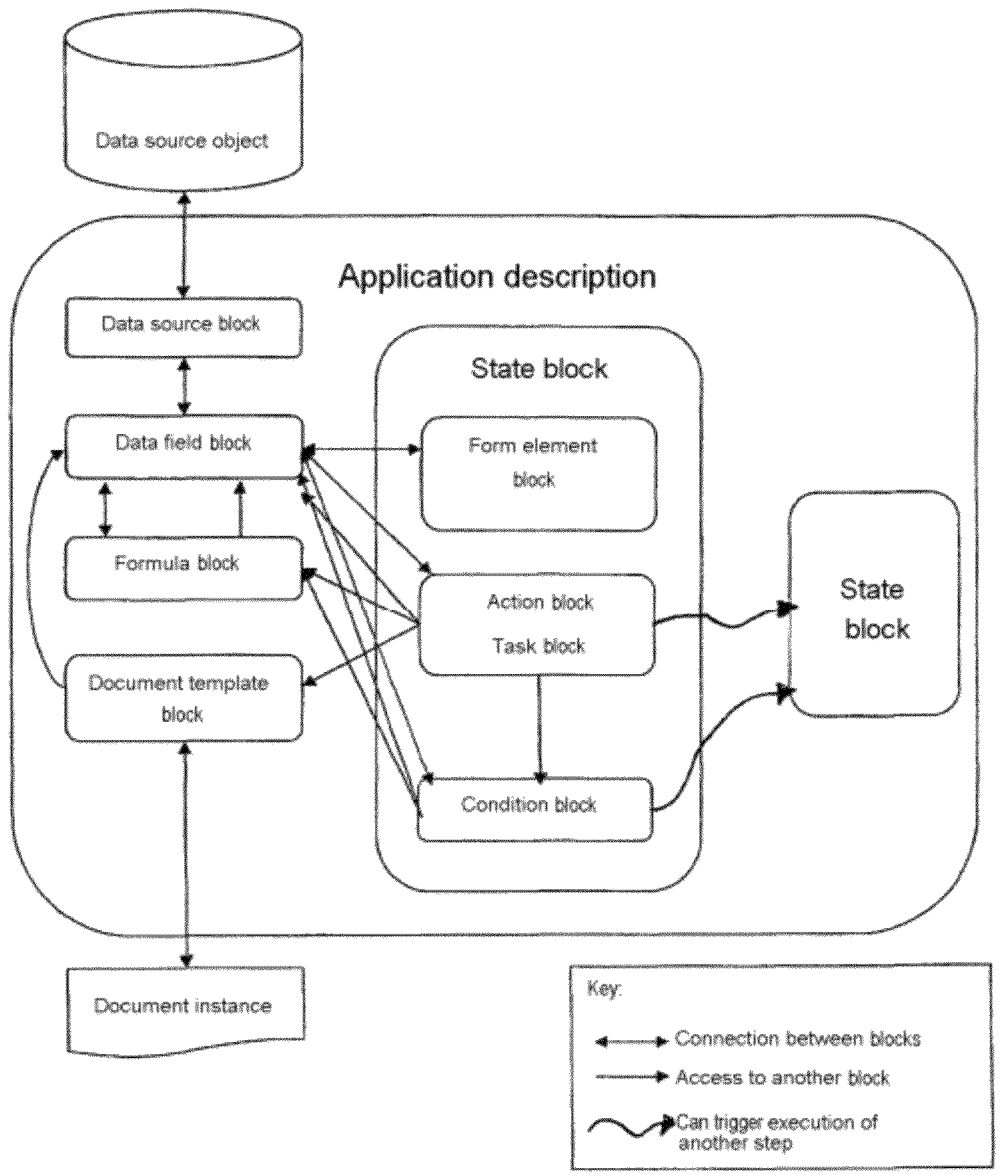
Figure 5:
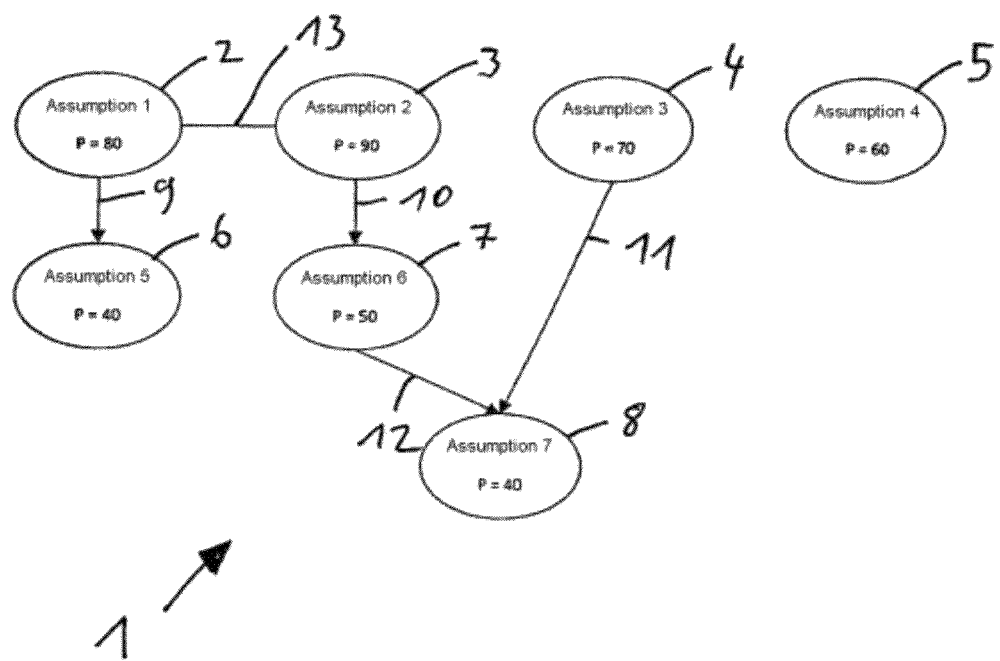
Figure 6:
Figures 9, 10:
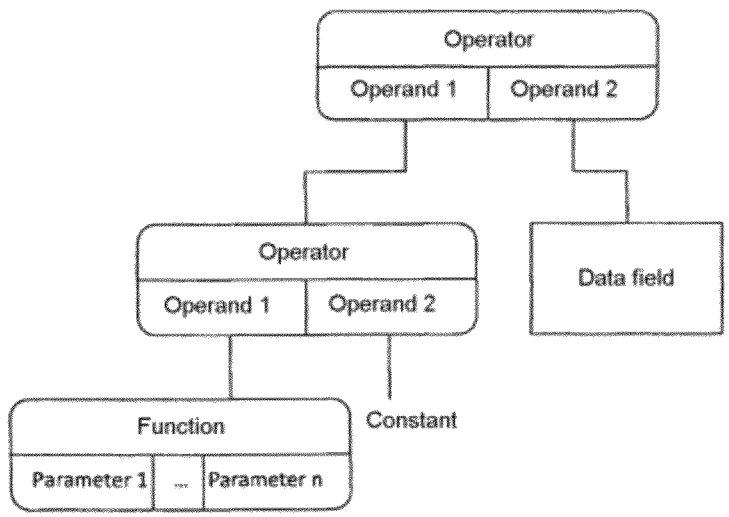
Figure 11:
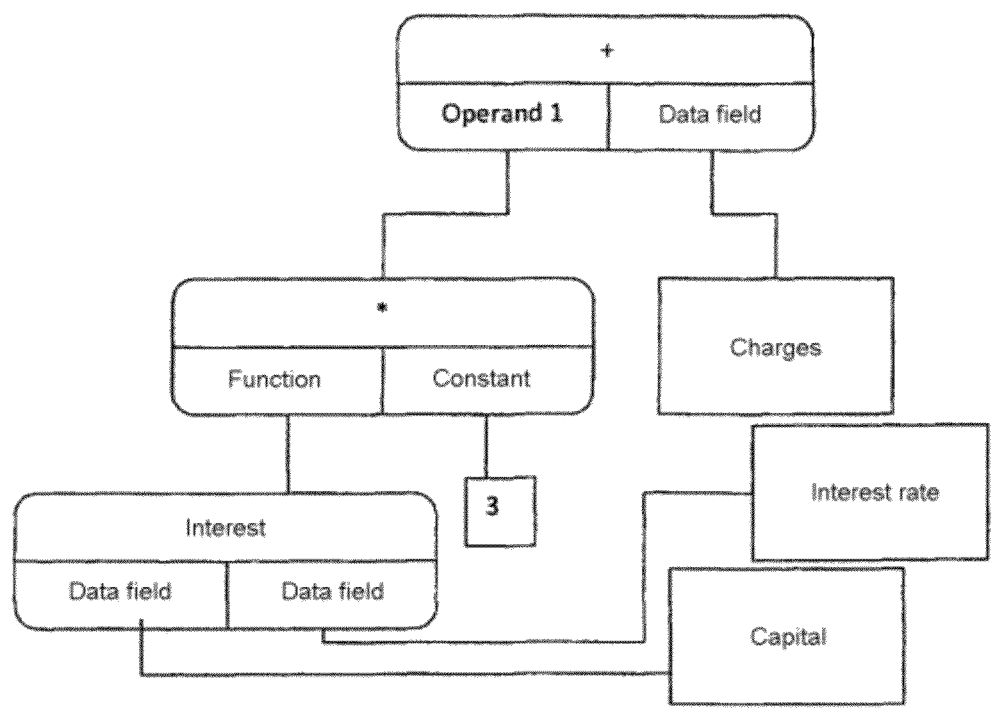
Figure 12:
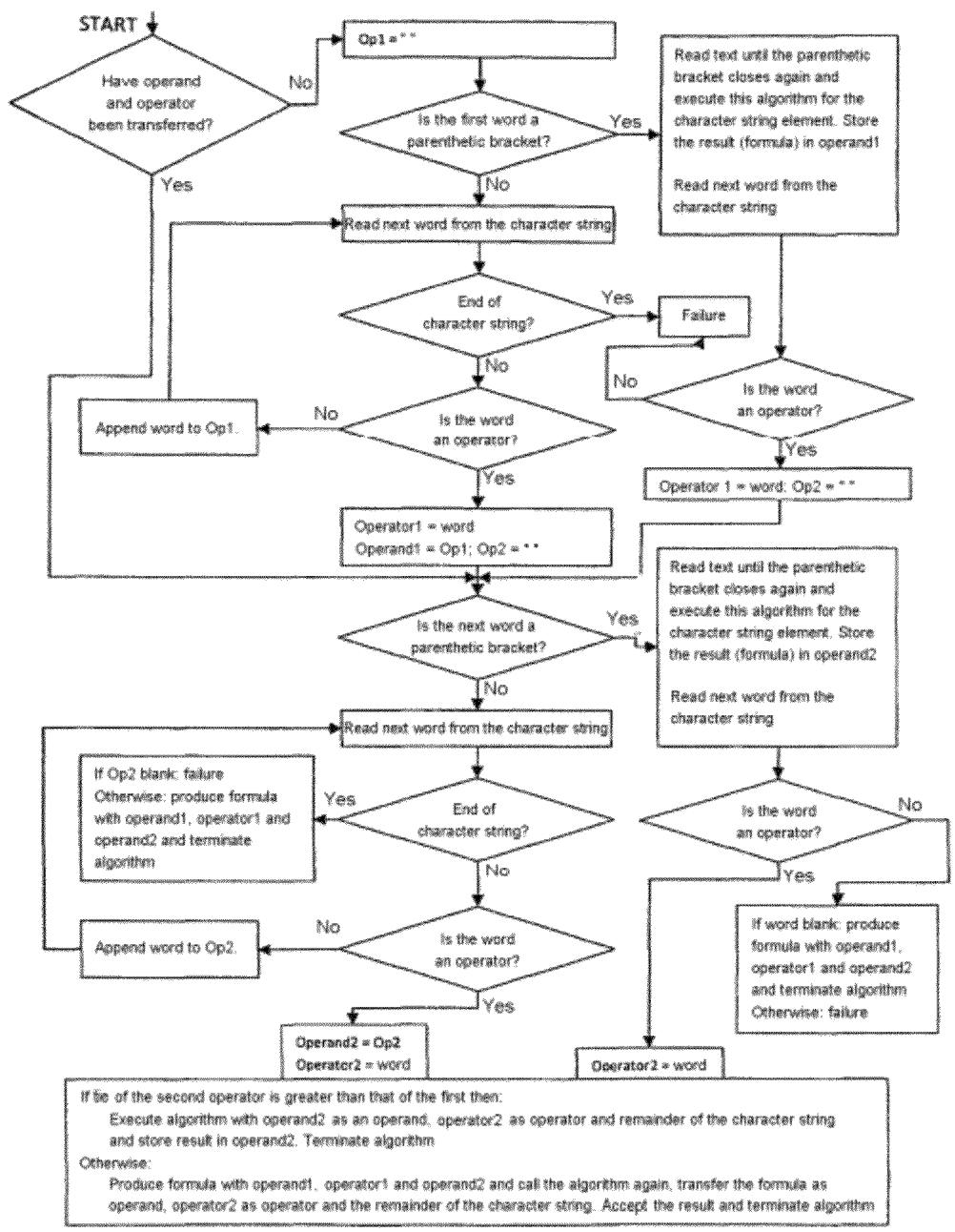
Figure 14:
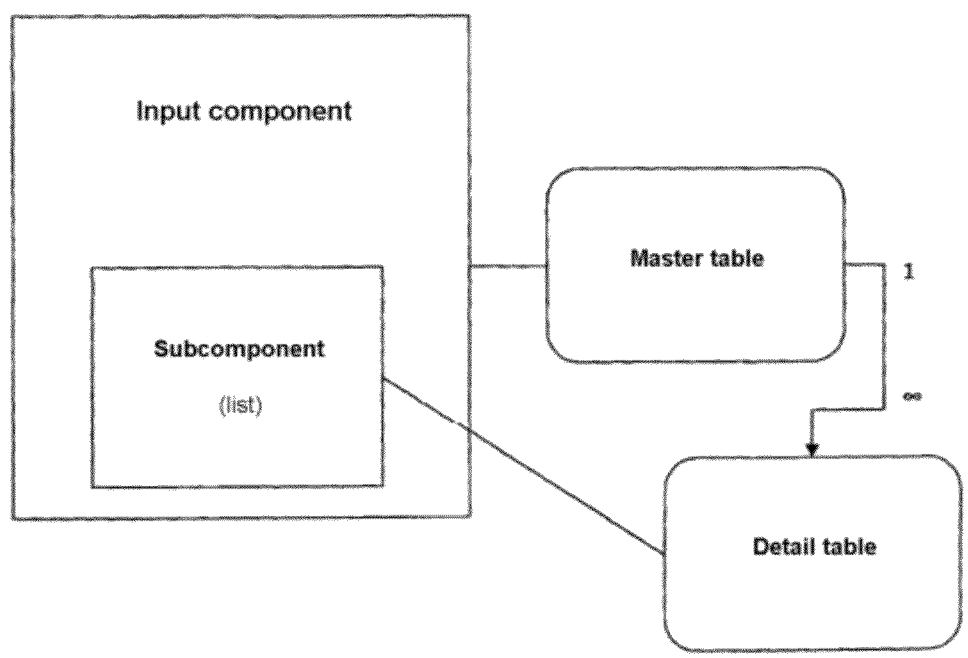
Figure 15:
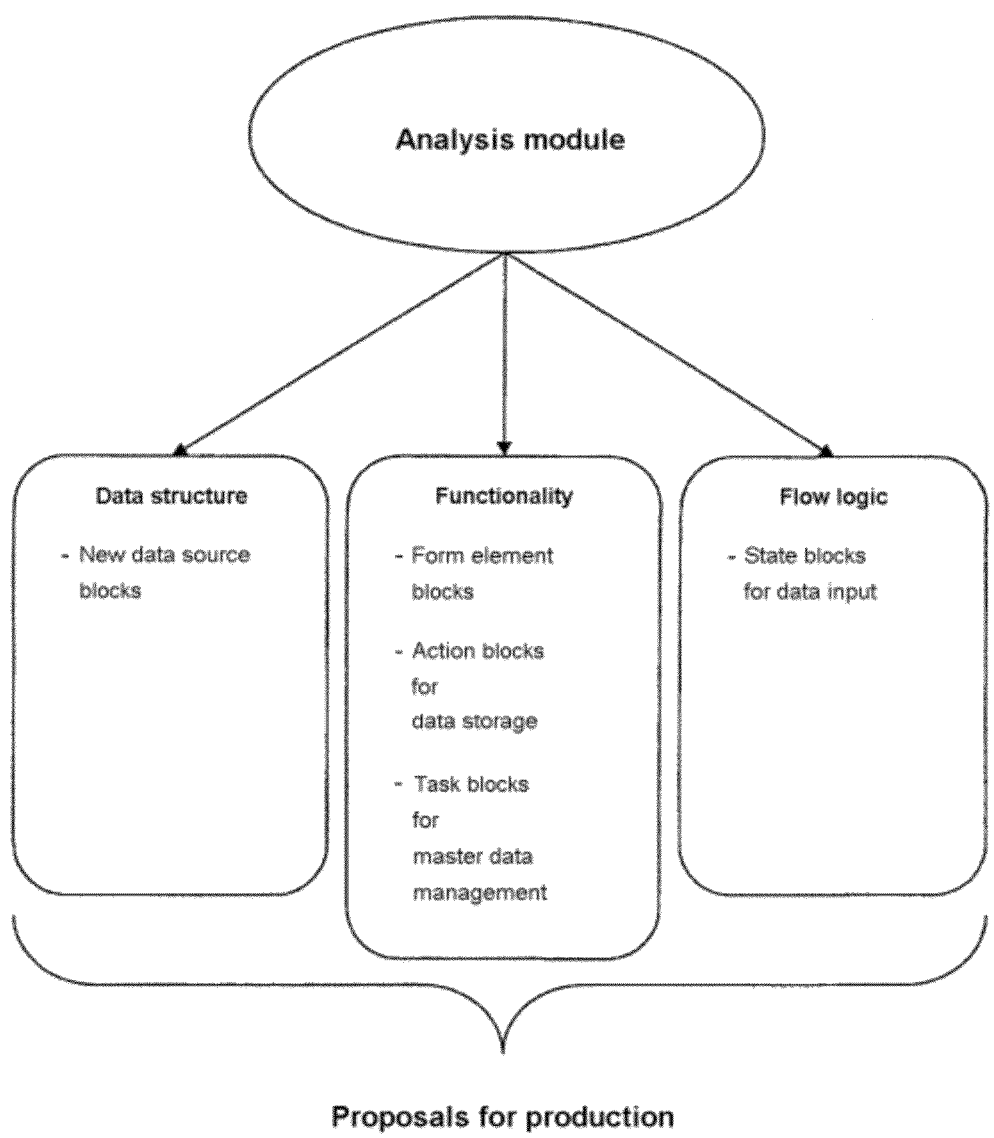
Figure 16:
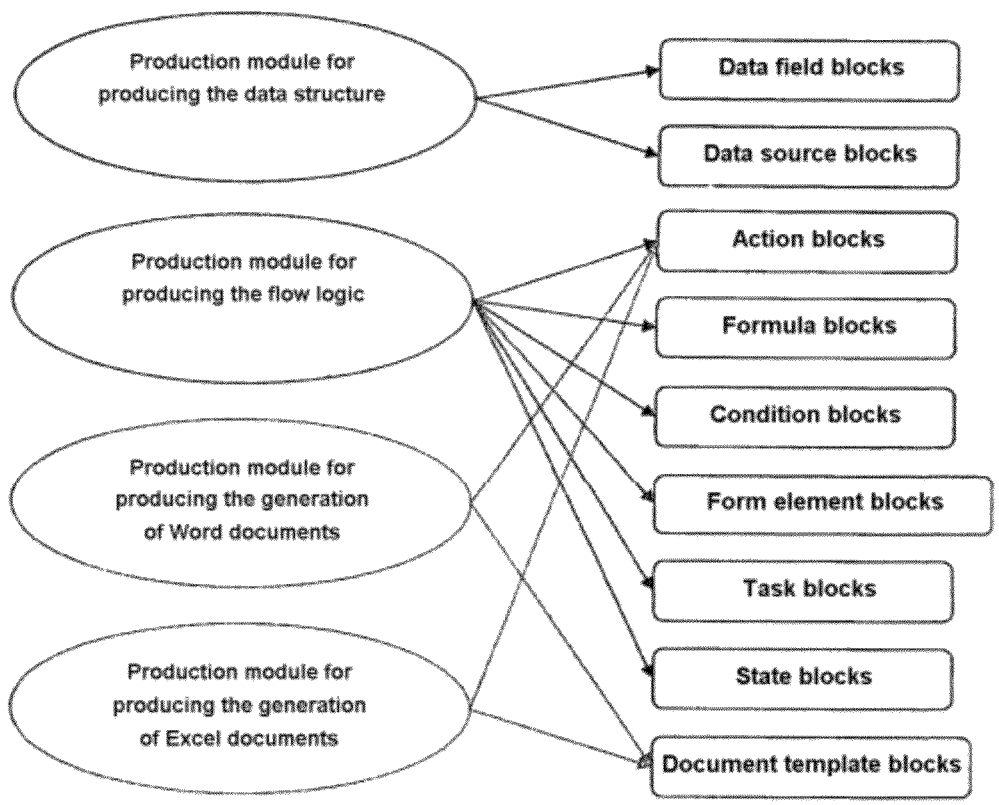
Figure 17:
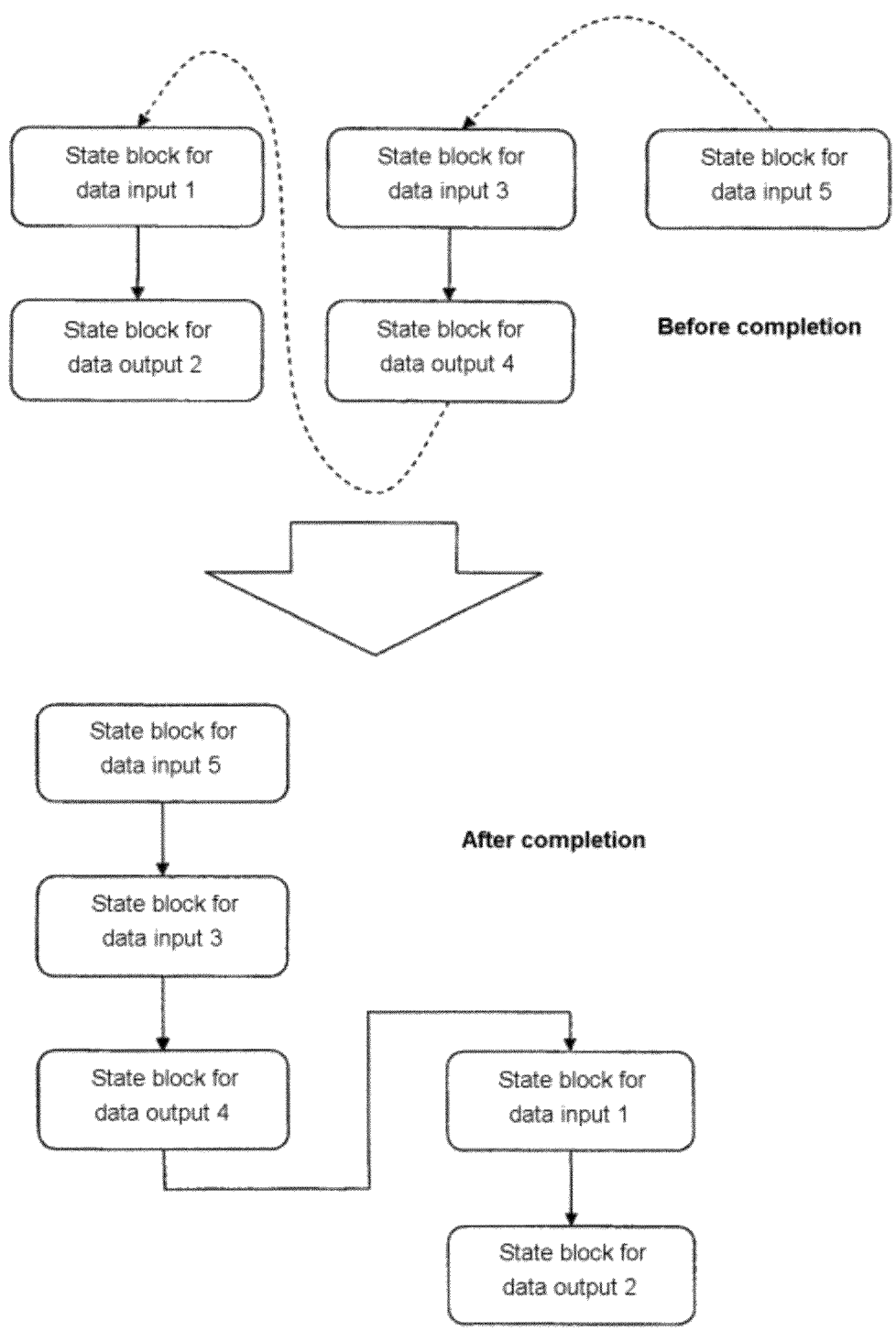
Figure 18:
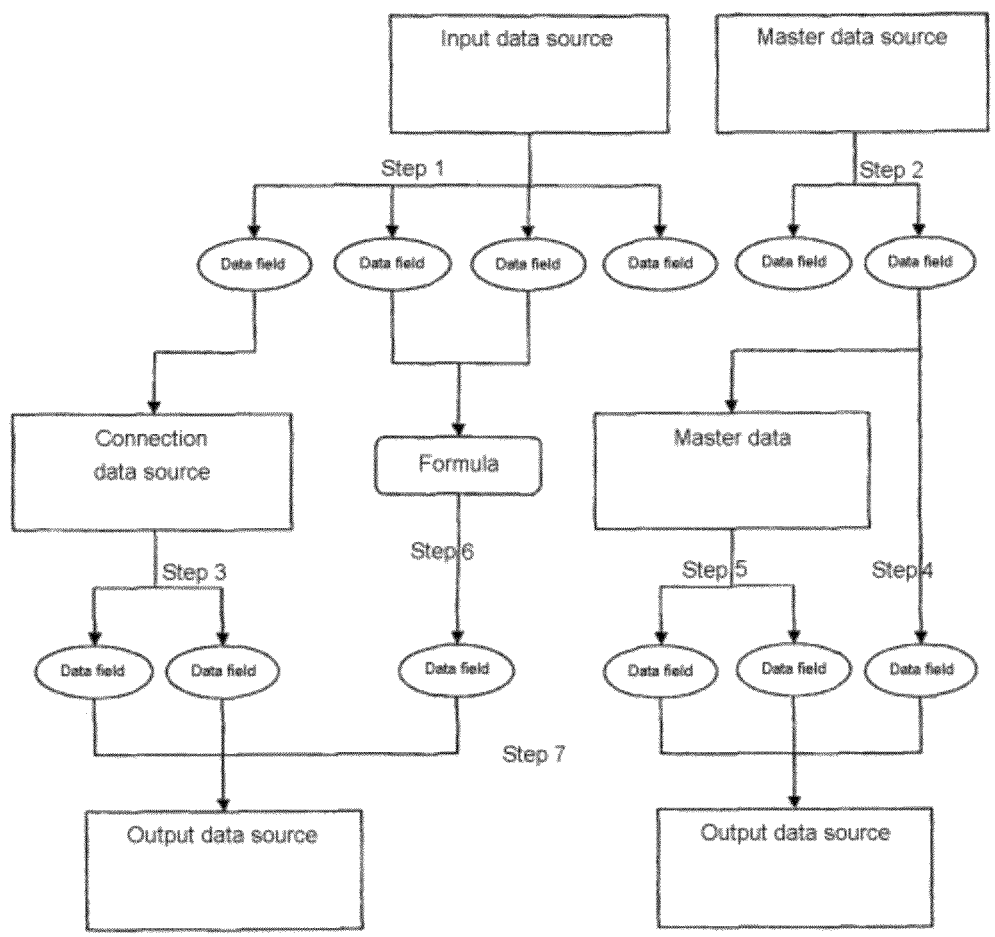
Figure 20:
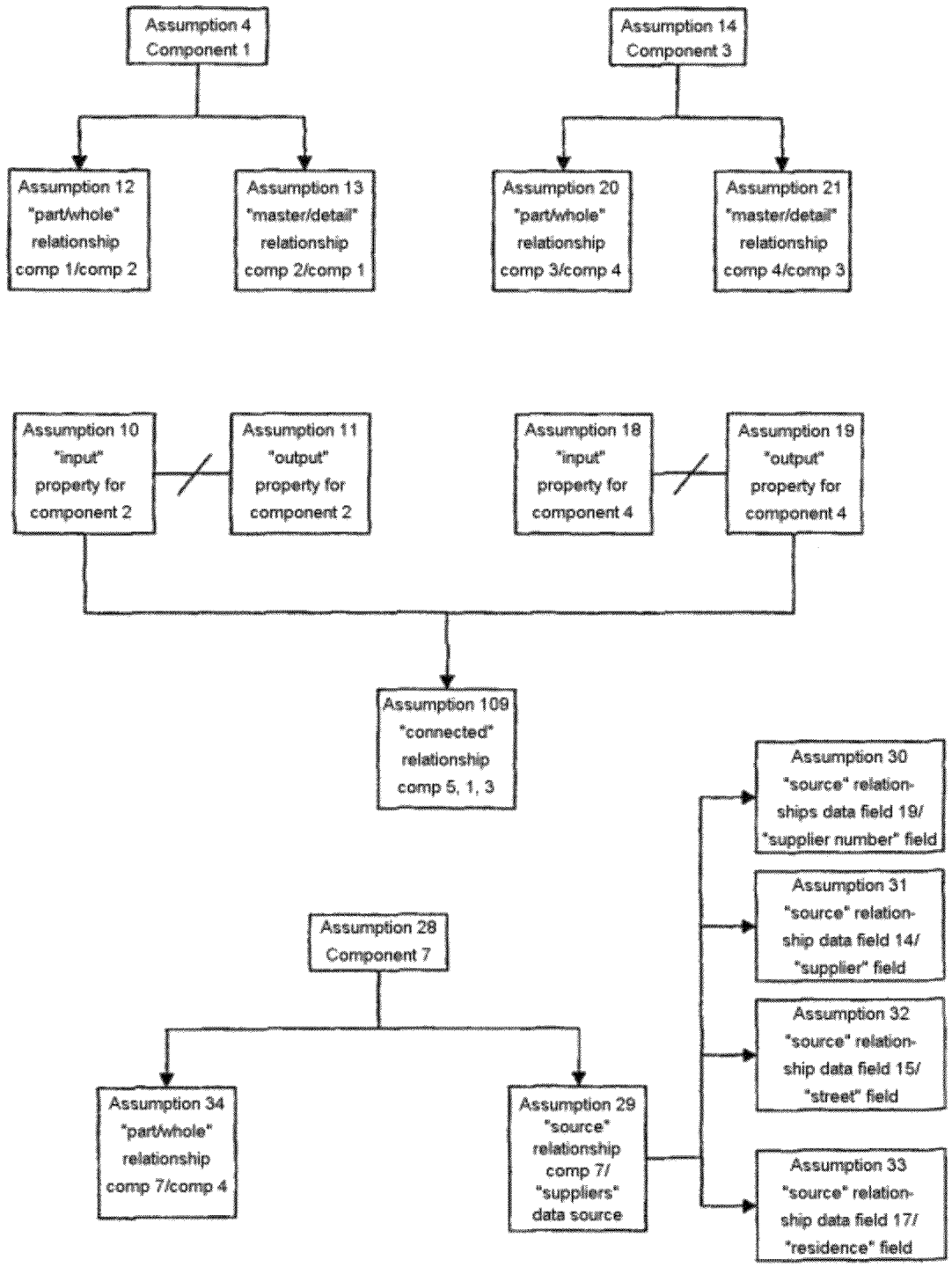
Figure 22:
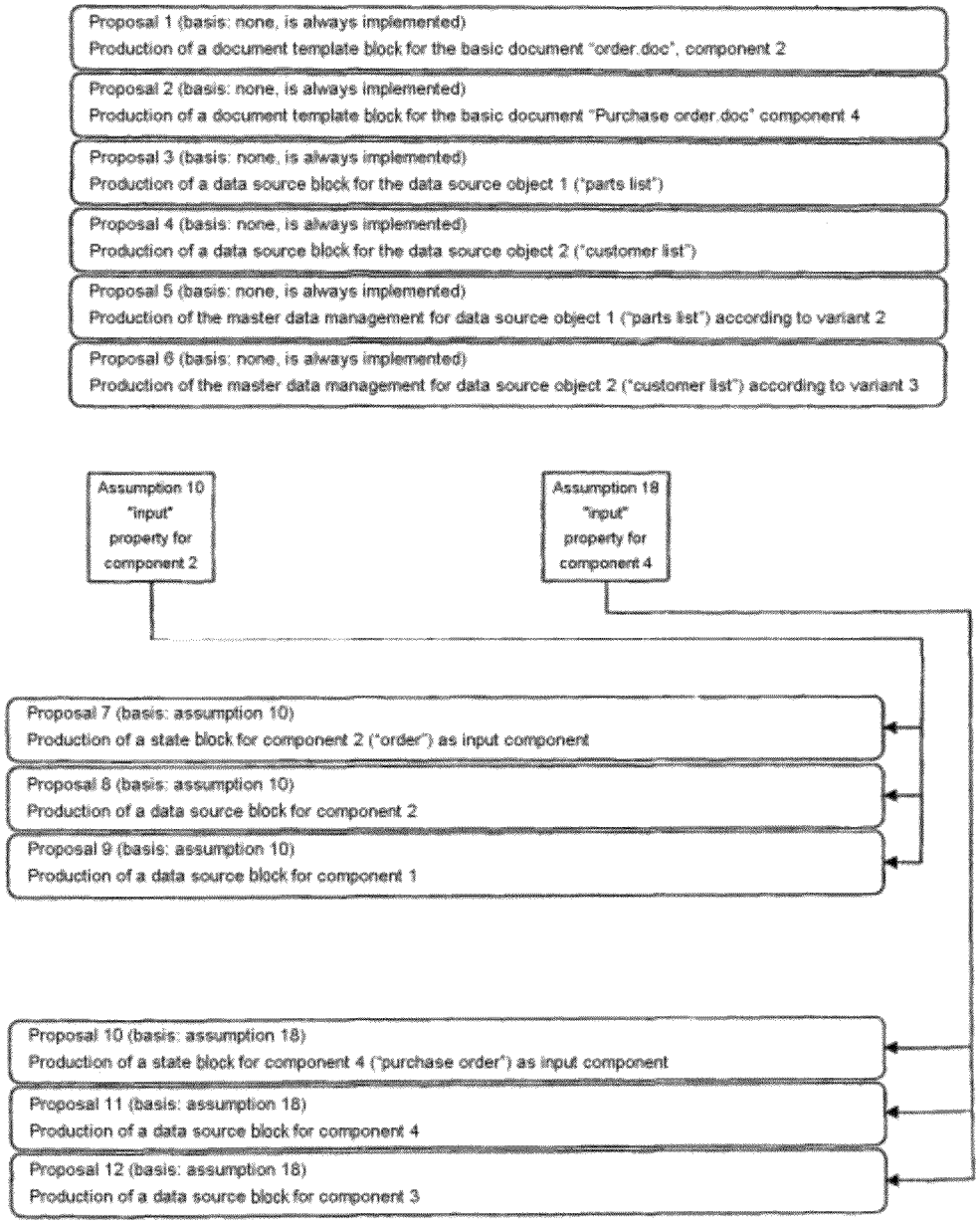
Figure 23:
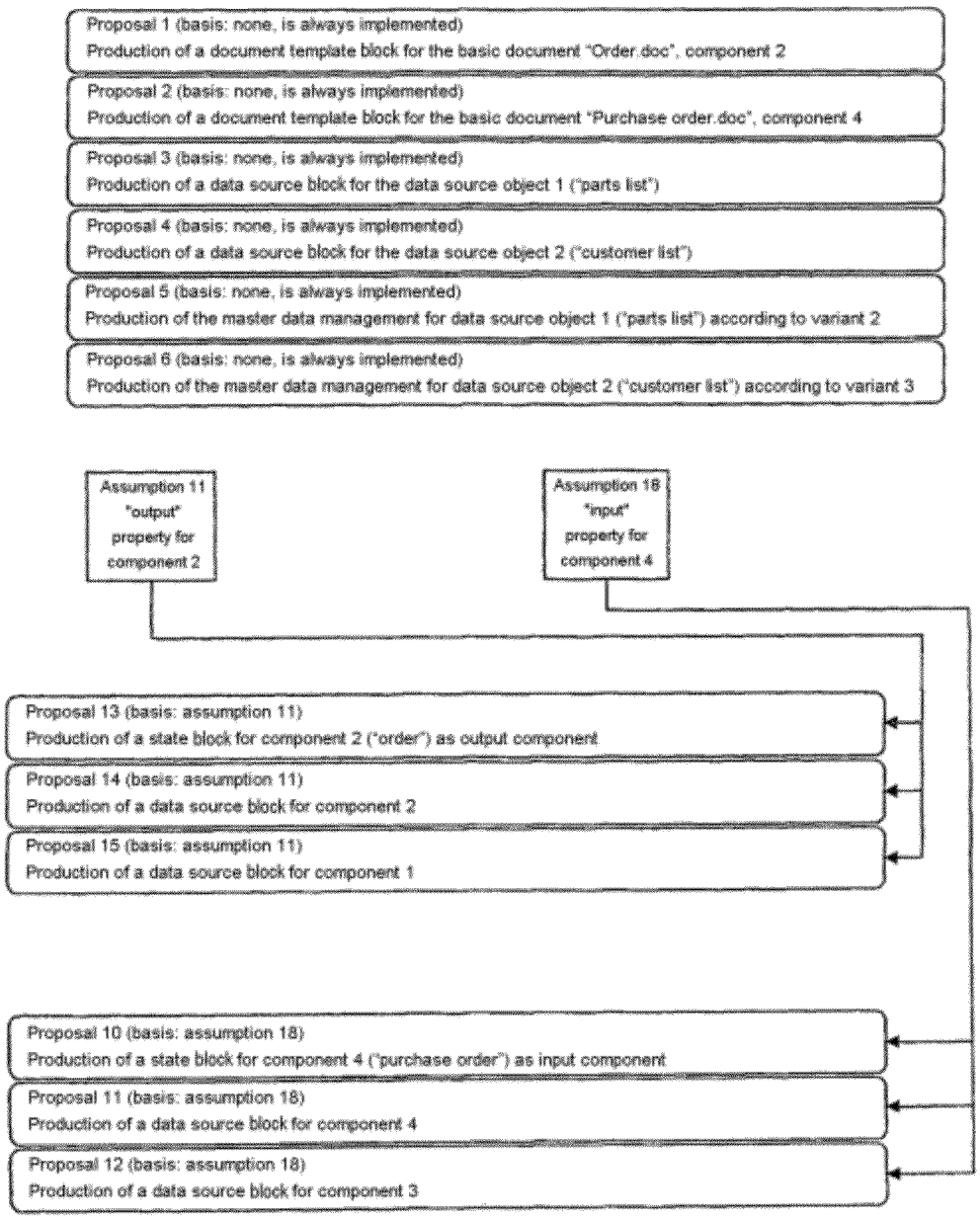
Figure 24:
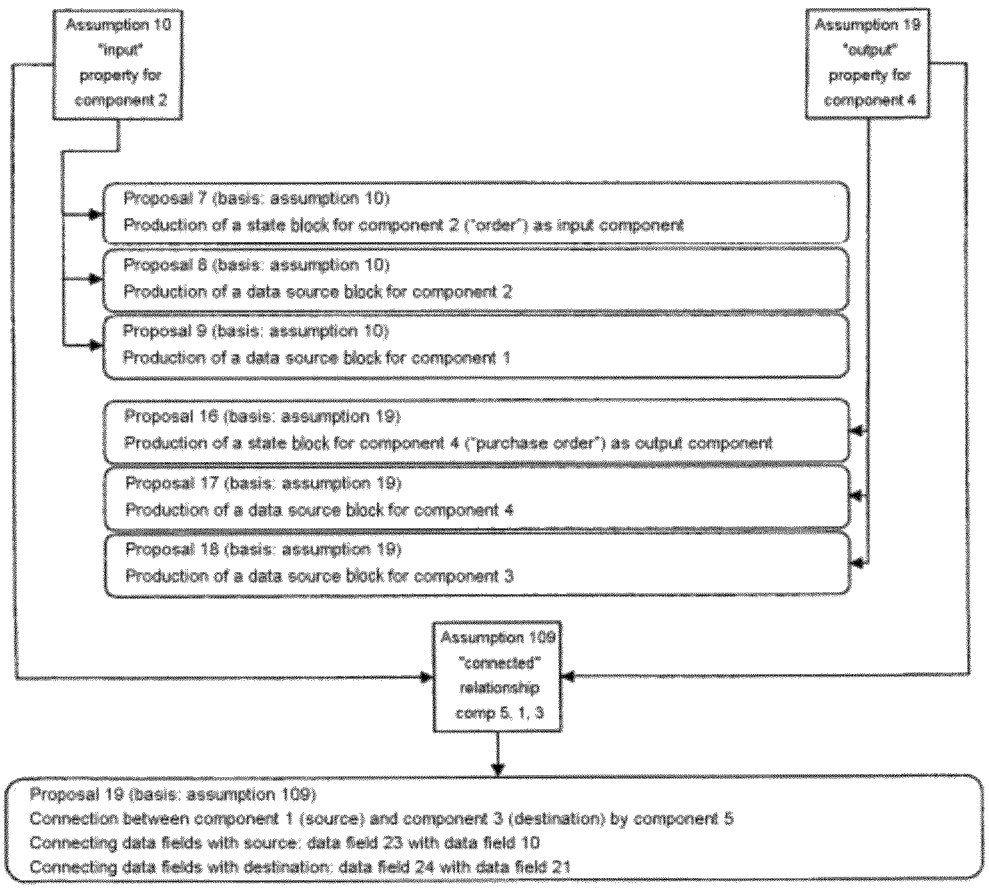
Figure 26:
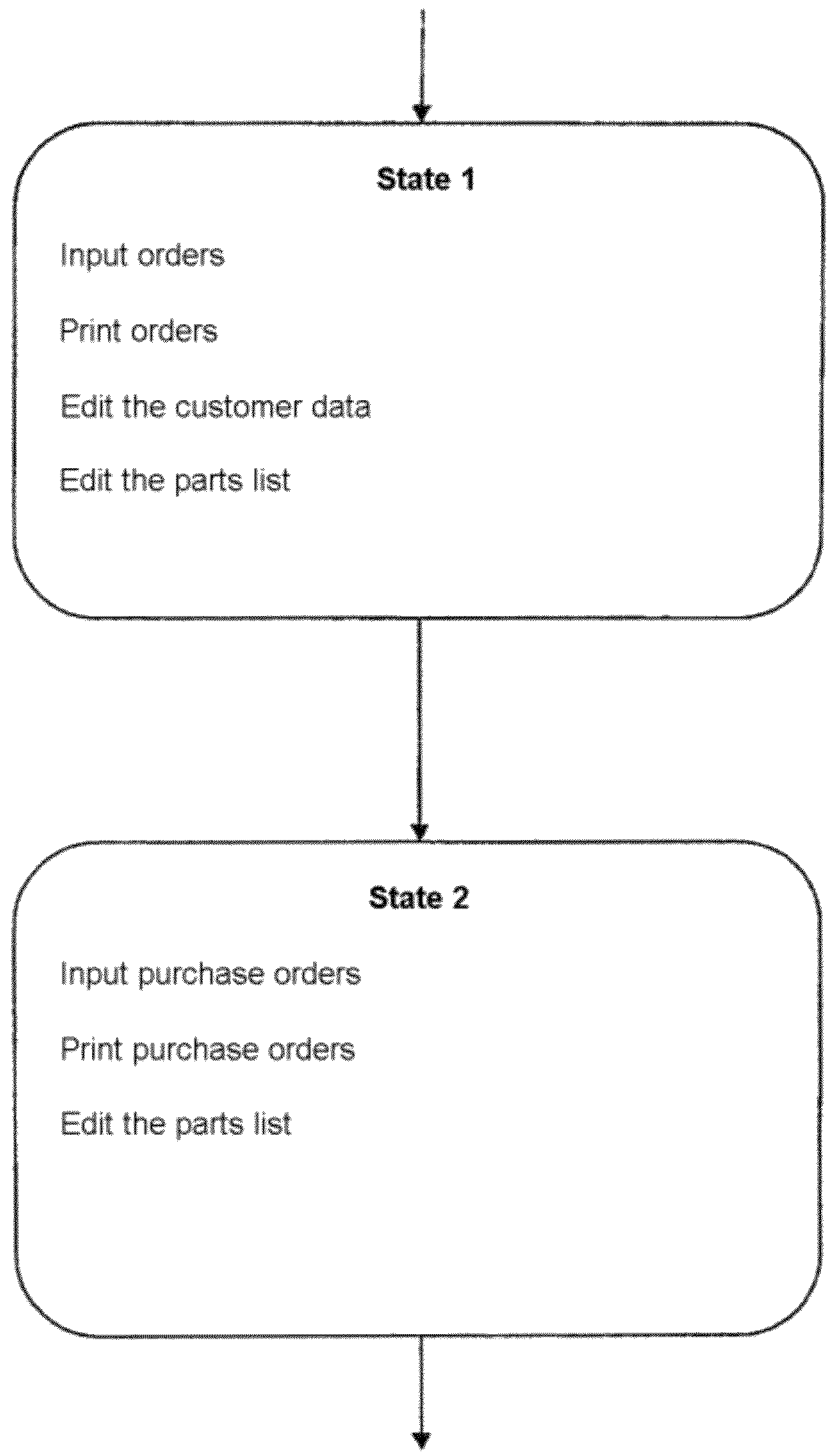
Figure 27:
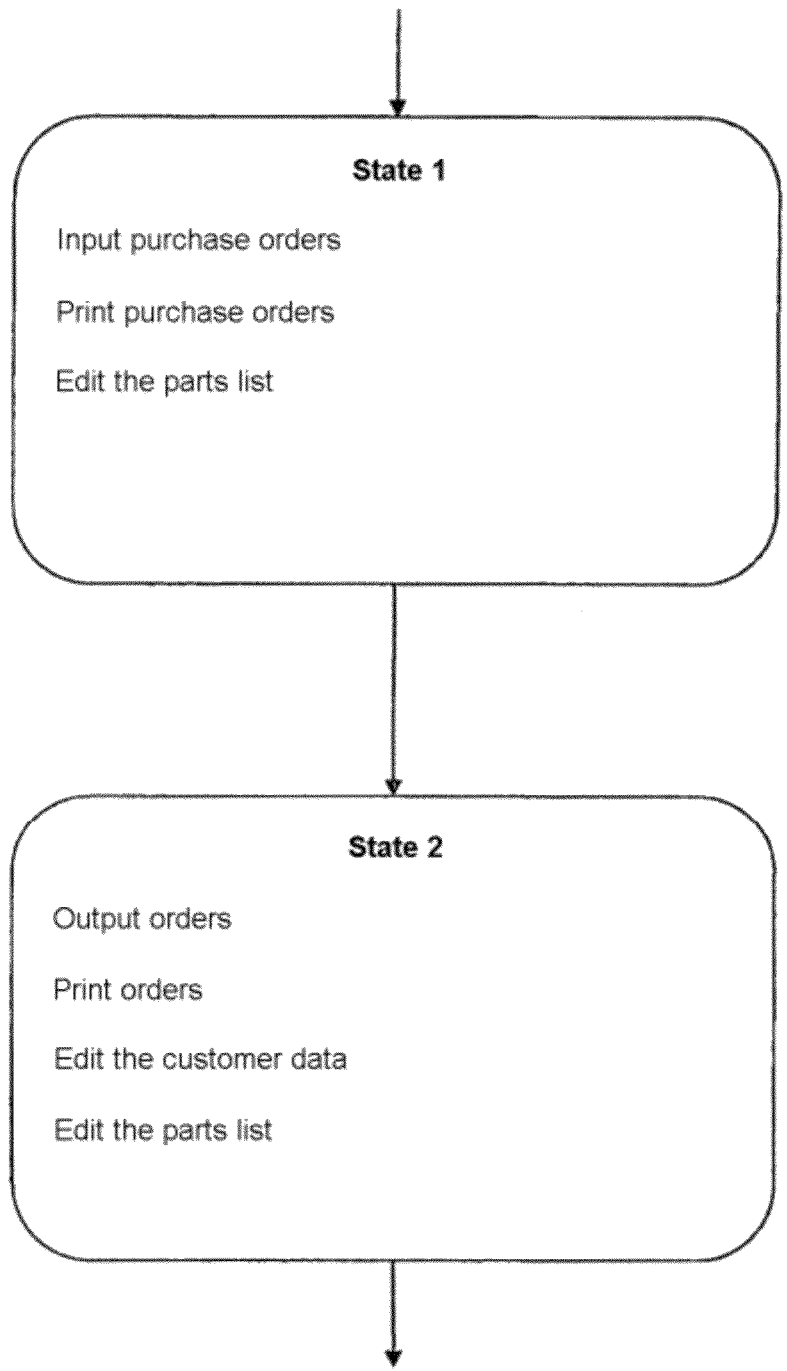
Figure 28:
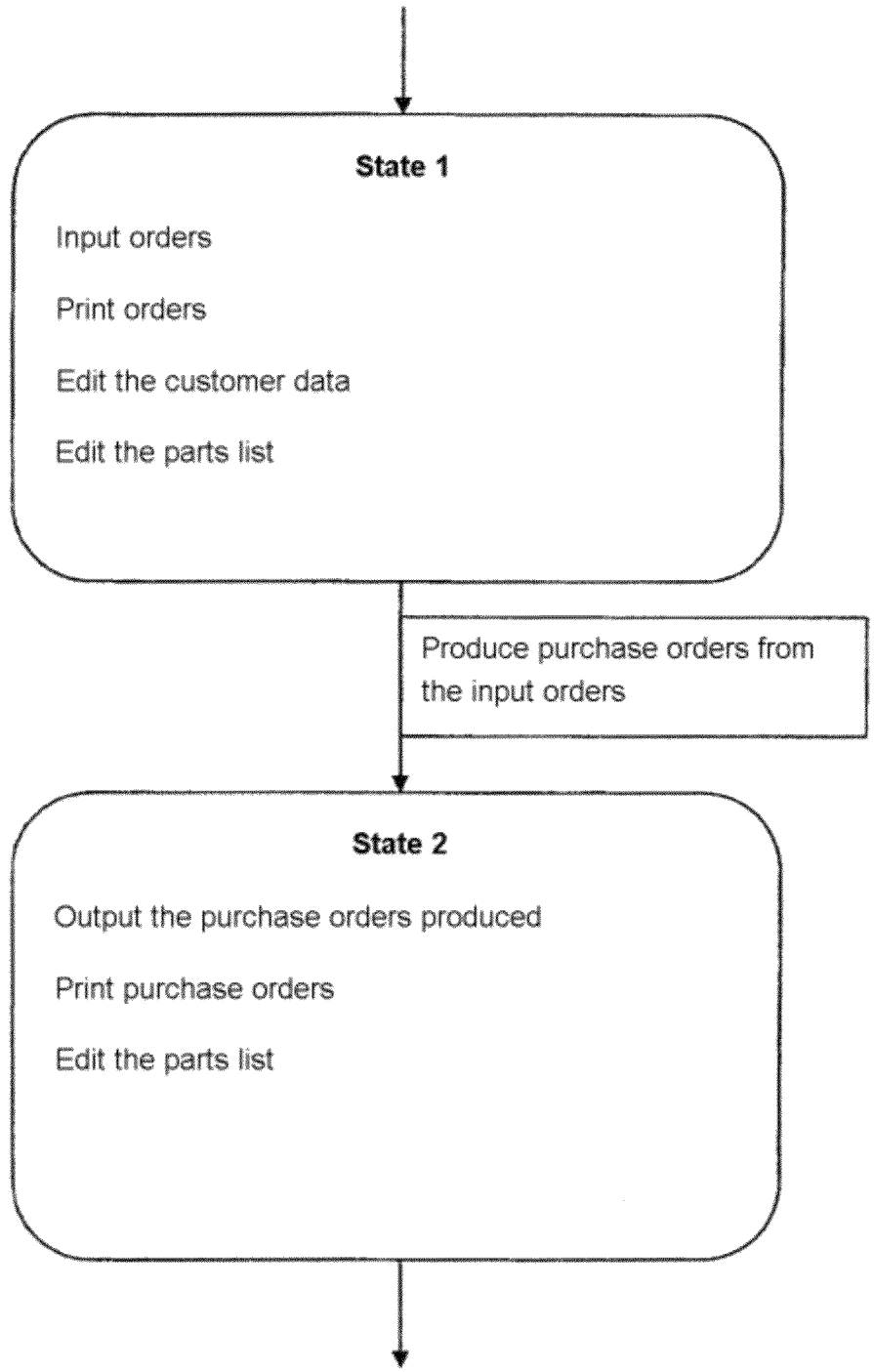
Figure 29:
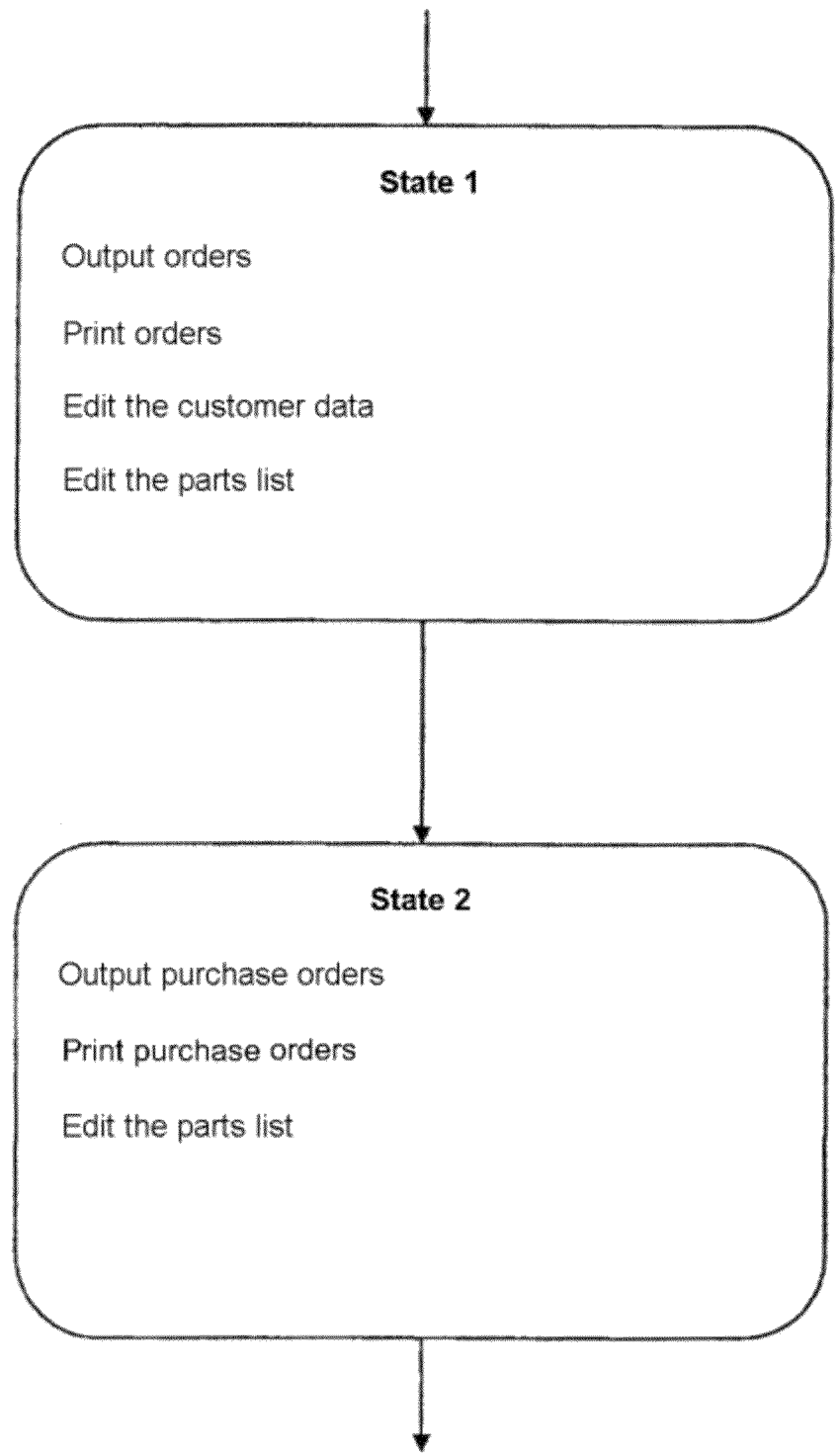
Figure 30:
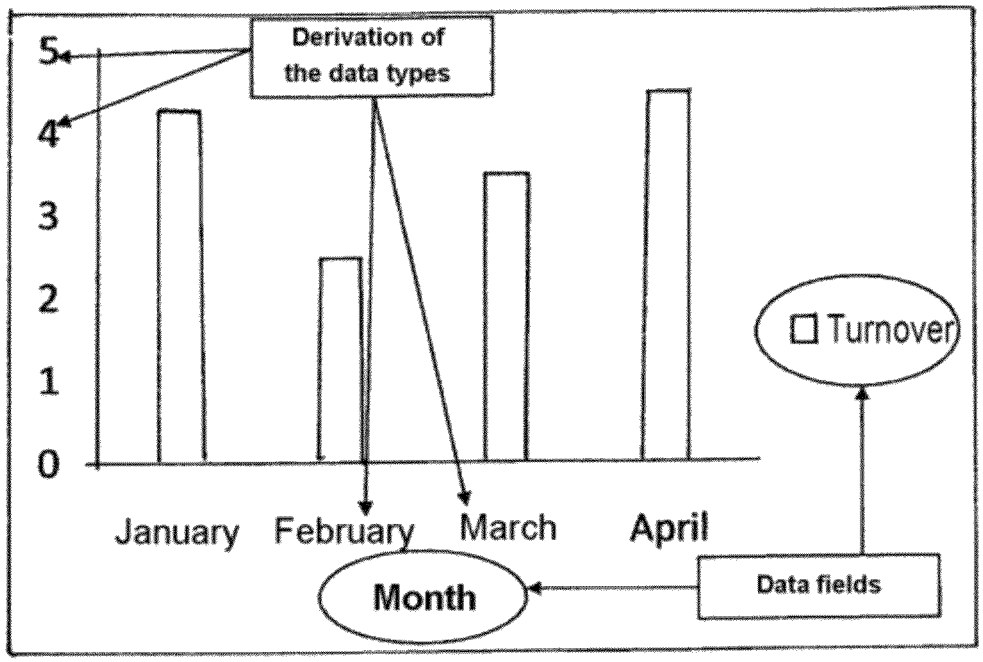
Figure 31:
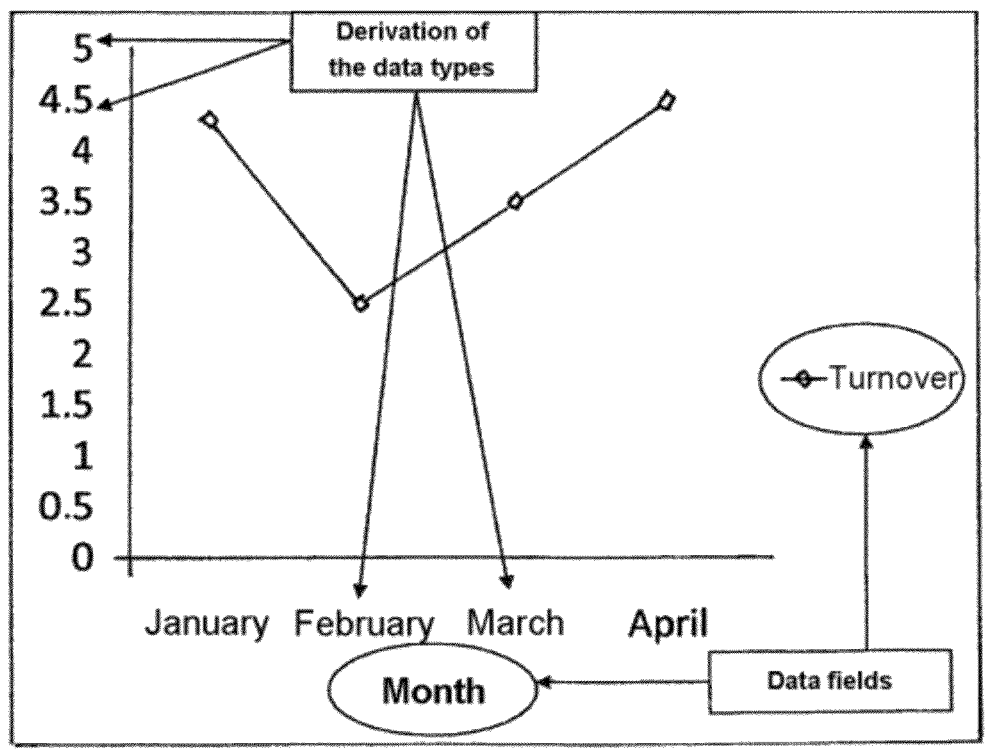
Figure 32:
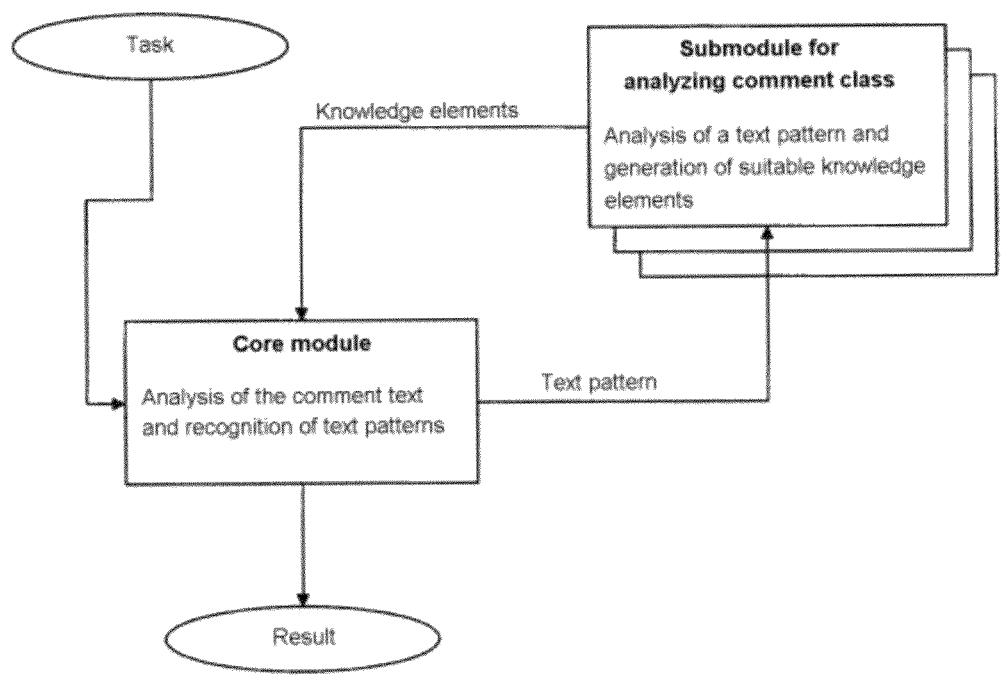
Figure 33:
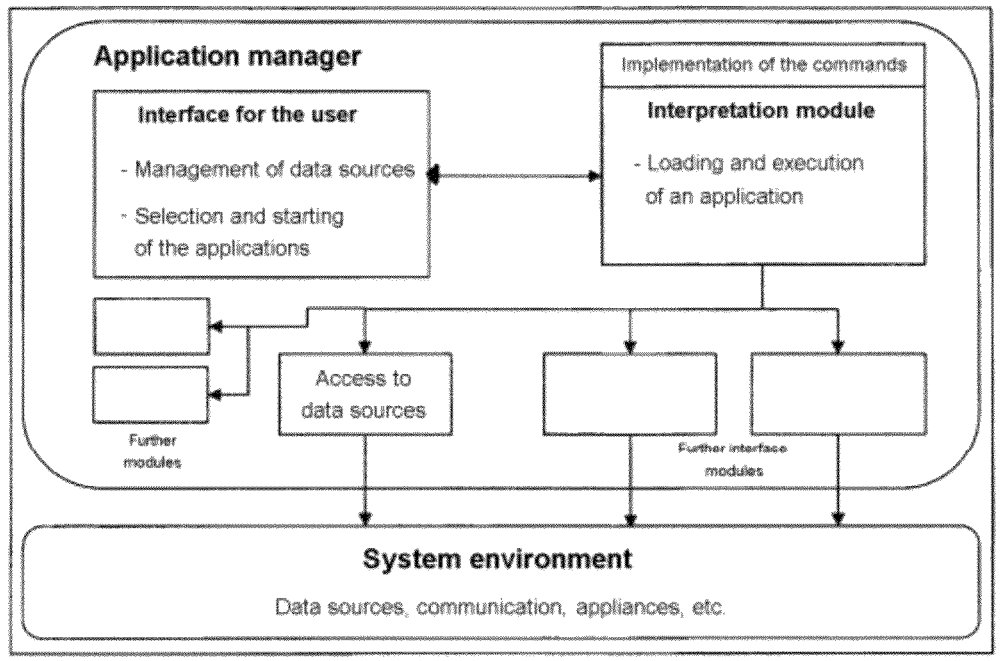
Figure 34:
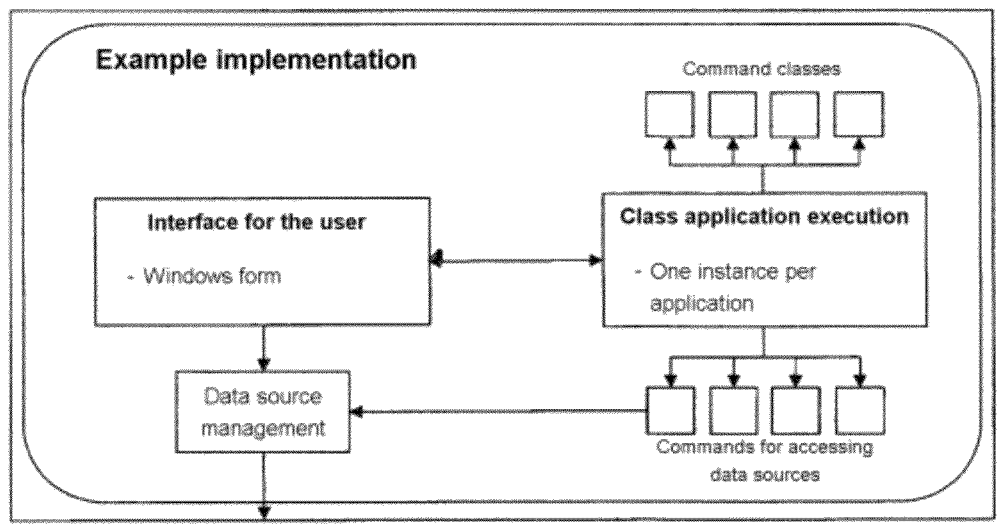
Figure 35:
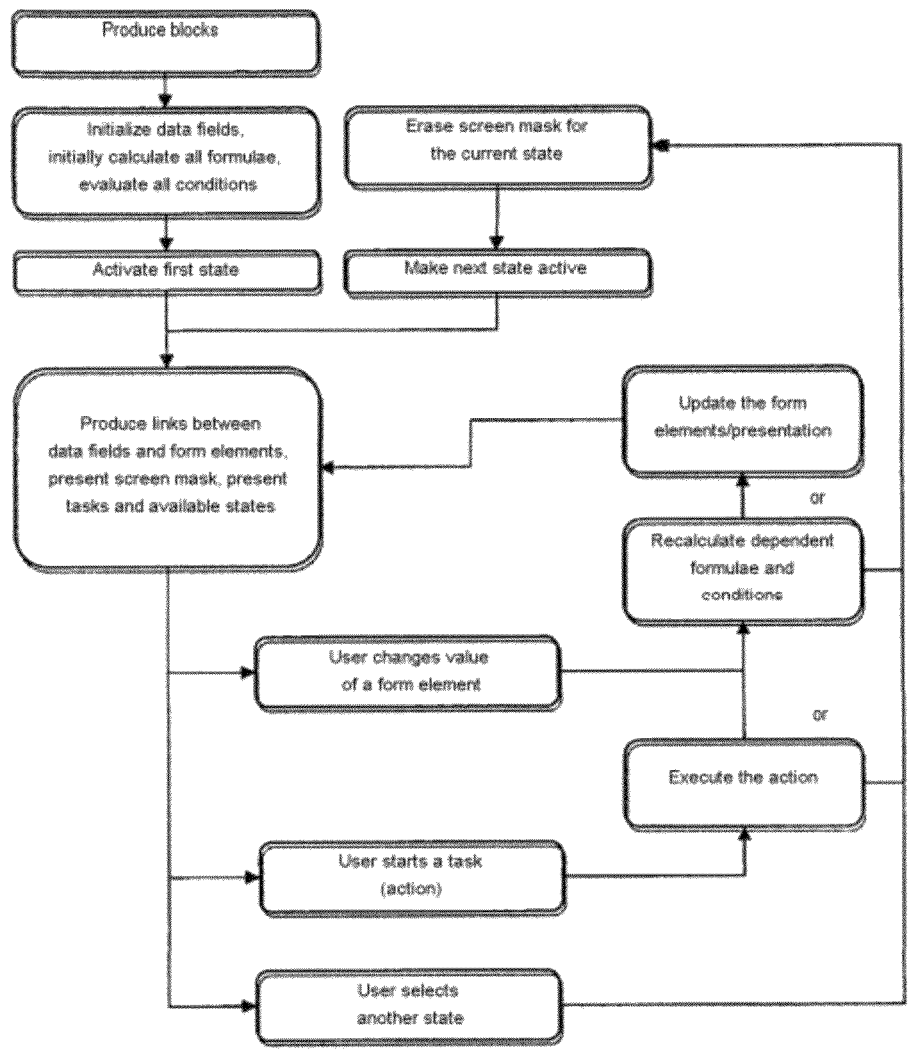
Figure 36:
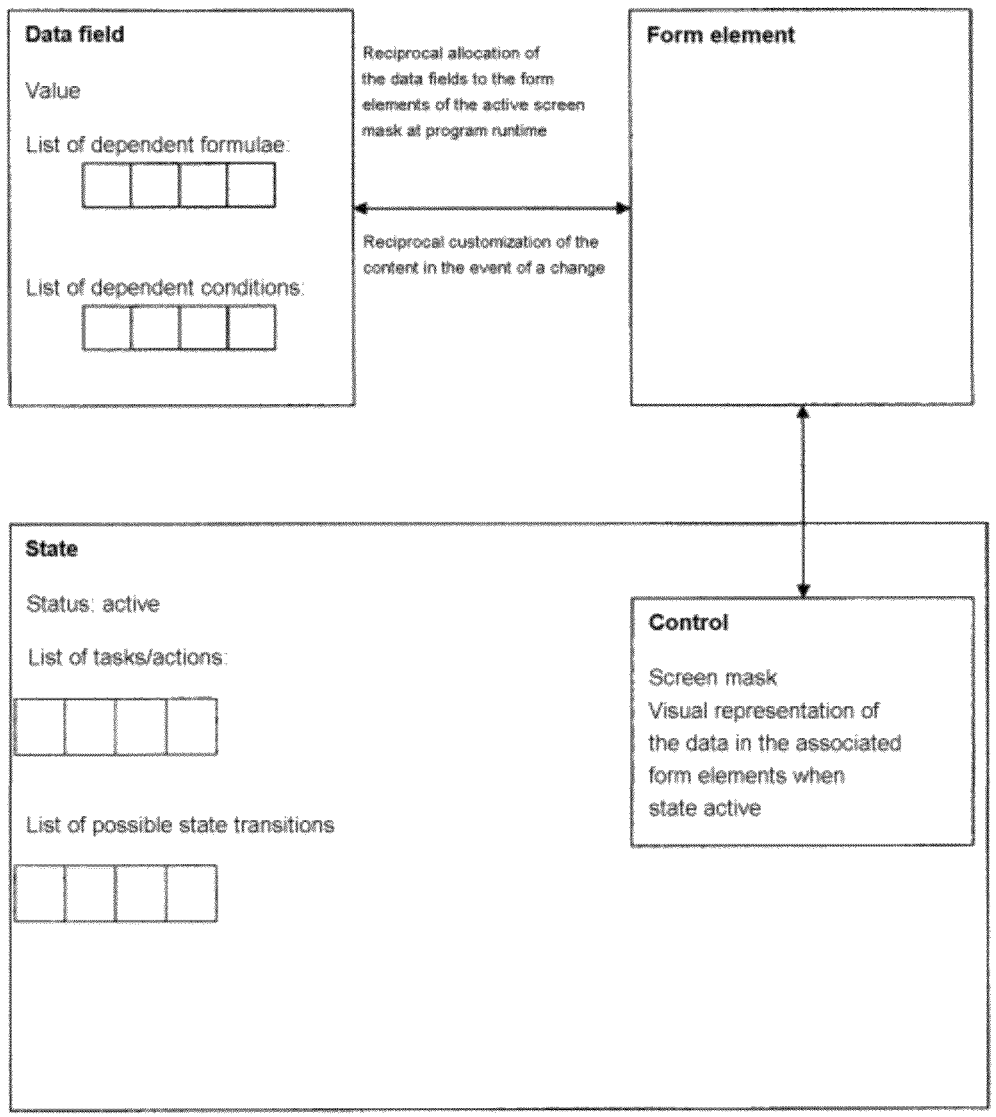
Figure 37:
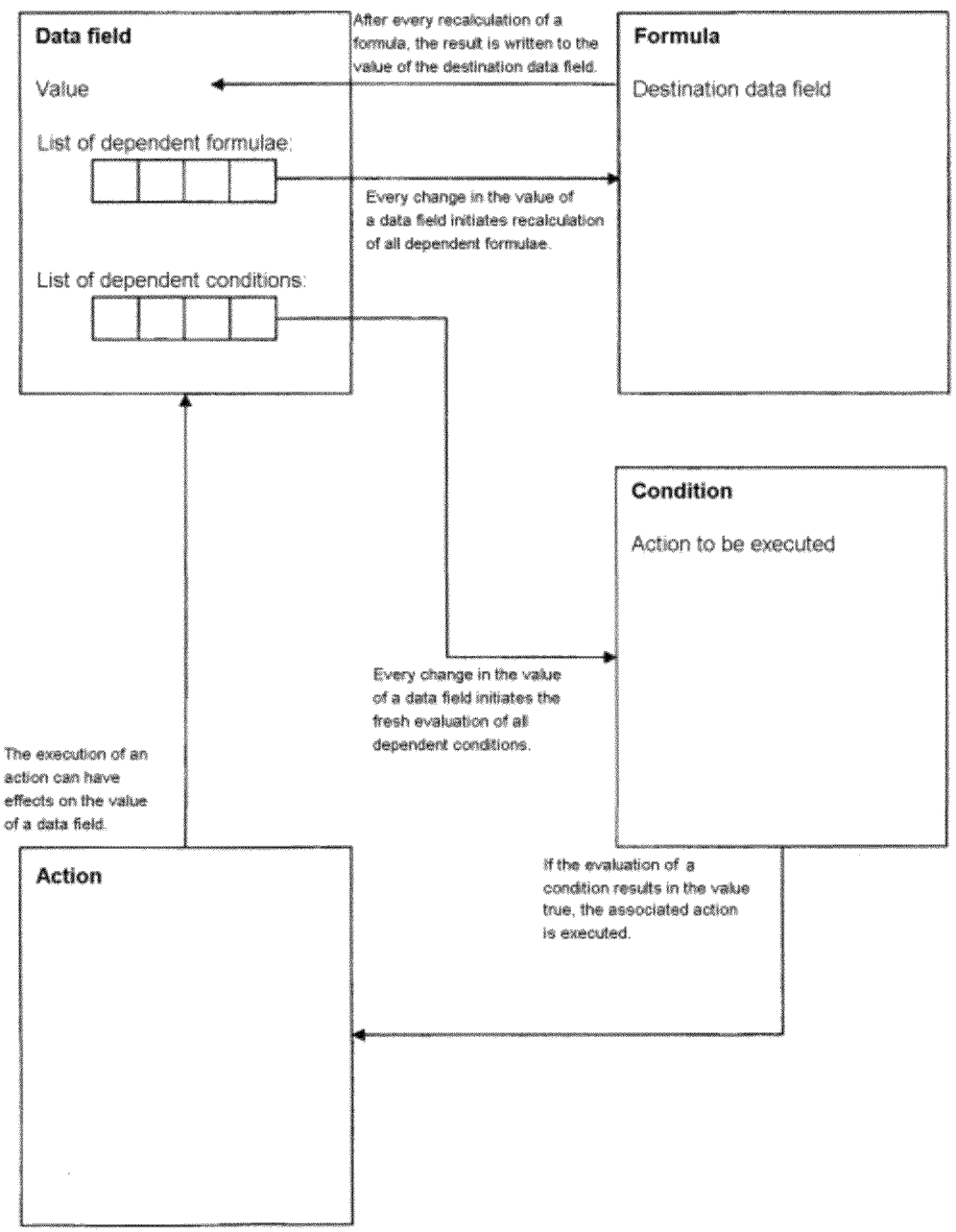

There are now a multiplicity of options for designing and developing the method according to the invention and the application description generator according to the invention advantageously. In this regard, reference may first of all be made to the patent claims which are subordinate to patent claim 1. A preferred refinement of the invention will now be explained in more detail below with reference to the drawing and the associated description. In the drawing:

FIG. 1 shows a schematic illustration of the flow of the method for producing at least one application description, FIG. 2 shows a schematic illustration of the method with analysis modules, production modules and a coordination module, FIG. 3 shows a schematic illustration of the interplay between data, functionality and the flow, FIG. 4 shows a schematic illustration of the structure of the application description with the individual application blocks, FIG. 5 shows a schematic illustration of a graph which is used to determine the knowledge partitions, FIG. 6 shows a schematic illustration of a first basic document, FIG. 7 shows a schematic illustration of a second basic document, FIG. 8 shows a schematic illustration of a third basic document, FIG. 9 shows a schematic illustration of a fourth basic document, FIG. 10 shows a schematic illustration of the structure of a "formula" knowledge element, FIG. 11 shows a schematic illustration of the structure of the "formula" knowledge element using an example, FIG. 12 shows a schematic illustration of a flowchart for the analysis and production of a formula, FIG. 13 shows a schematic illustration of two examples of formulae, FIG. 14 shows a schematic illustration of a relationship between a component and a subcomponent, on the one hand, and a master table and a detail table, on the other hand, FIG. 15 shows a schematic illustration of an analysis module for input components, FIG. 16 shows a schematic illustration of the task division in the production modules, FIG. 17 shows a schematic illustration of completion of the workflow using an example, FIG. 18 shows a schematic illustration of the relationships between the application blocks when a new data record is produced, FIG. 19 shows a schematic illustration of a further basic document in the form of a checklist, FIG. 20 shows a schematic illustration of a detail from the set of all the assumptions, FIG. 21 shows a schematic illustration of the proposals for production using an example, FIG. 22 shows a schematic illustration of a first knowledge partition, FIG. 23 shows a schematic illustration of a second knowledge partition, FIG. 24 shows a schematic illustration of a third knowledge partition, FIG. 25 shows a schematic illustration of a fourth knowledge partition, FIG. 26 shows a schematic illustration of an application description which has been produced by the first knowledge partition, FIG. 27 shows a schematic illustration of a second application description which has been produced by the second knowledge partition, FIG. 28 shows a schematic illustration of a third application description which has been produced by the third knowledge partition, FIG. 29 shows a schematic illustration of a fourth application description which has been produced by the fourth knowledge partition, FIG. 30 shows a schematic illustration of a further basic document in the form of a presentation with a bar chart, FIG. 31 shows a schematic illustration of a further basic document in the form of a presentation with a line chart, FIG. 32 shows a schematic illustration of an analysis module for the analysis of comments with a core module and a submodule, FIG. 33 shows a schematic illustration of the application manager with an interface for the user and with an interpretation module, FIG. 34 shows a schematic illustration of the application manager in an example implementation with an interface for the user and with an interpretation module in the form of what are known as classes, FIG. 35 shows a schematic illustration of the flow of an application, FIG. 36 shows a schematic illustration of the interplay between screen elements, form fields and data fields, and FIG. 37 shows a schematic illustration of the interplay between data fields, formulae, conditions and actions.

Reference may be made to FIGS. 1 and 2 below:

The invention relates to a method for producing at least one application description, having the following method step:

the at least one application description is produced with a plurality of application blocks.

The drawbacks cited at the outset are now avoided by at least one basic document being read in, the at least one basic document being analyzed, wherein during the analysis a knowledge base is constructed with knowledge elements, wherein the knowledge elements recognized are at least one data field and/or at least one component, and the knowledge elements are preferably at least to some extent flagged as assumptions, at least one conflict-free knowledge partition being determined, wherein the at least one knowledge partition has a respective set of conflict-free assumptions, wherein the at least one application description is produced from the at least one knowledge partition with the application blocks.

The application blocks used are preferably at least one data field block and at least one state block and preferably at least one action block. The method can be executed as a computer-implemented application description generator. The application description generator is stored or can be stored particularly on a computer system using at least one storage means. In this case, the storage means may either be in the form of part of the computer system or may be in the form of portable storage means, such as a CD, DVD, USB stick, magnetic tape or the like, said storage means storing the application description generator or parts of the application description generator.

The application description generator is stored as a computer program. The method steps described by the method can be executed by a processor unit in the computer system or are executed. The computer system preferably has an input unit—particularly a keyboard—and an output unit—particularly a screen and/or a printer—and also a processor unit having at least one processor.

The description below has a part I. and a part II. Part I. explains general aspects of the method in more detail. Part II. explains further aspects of the method and clarifies them using an example.

I.

1. DEFINITION OF TERMS

Application Description

An application description is an exact blueprint for the execution of the work process on a computer. Preferably, the application description can be converted into machine language using a compiler. Alternatively, the application description can be converted into machine language using an interpreter or a runtime environment during the execution of the application description. The runtime environment and the interpreter are computer programs which are suitable for executing the application description on a computer system. The application description may also denote an executable computer program, however.

Application Block

Application blocks are the units from which the application description is produced. The application description may comprise particularly the sum of all the application blocks used.

Work Process

A work process is any succession of activities, which can also be repeated or branched, which, in principle, can be executed by a computer. The work process may comprise the input, processing and output of data. These data may be control data for a technical work process or data relating to another work process, for example.

Method for Producing an Application Description or Design or Application Design

A design or method for producing an application description denotes the entire process from reading in and analyzing the basic documents through the possible further analyses and possible communications with the user to production of the application description.

Basic Documents

Basic documents are any files stored on a storage medium which are able to provide a human user with a meaning within the context of the work process. In this case, basic documents denote the electronic files which the user transfers to the method as an input.

Document Template

The document template is a template which is derived from a basic document and which is used within the context of the method as a template for document instances which can be produced filled with data values.

Document Instance

A document instance is a document which can be produced by the application description and which is produced from one of the basic documents using a document template and is filled with data from the application description. The application description contains the necessary application blocks which describe how the document templates are produced and how the document template for document instances is filled with the relevant data values.

Facts

Facts denote knowledge elements which are considered to be safely valid within the context of the method. Facts are safe constituents of any knowledge partition and hence of any solution. Facts cannot be in conflict with one another.

Assumptions

Assumptions are knowledge elements which are not deemed safe and are therefore flagged as assumptions. An assumption is obtained from the basic documents under reserve and is subjected to a plausibility check in the course of the further method. Assumptions may be in conflict, i.e. two or more assumptions may be mutually exclusive.

Knowledge Partition or Solution

A knowledge partition or solution is a set of knowledge elements which comprises all the facts and a conflict-free set of assumptions. This knowledge partition forms a solution and the basis for producing the application description. The application description is produced on the basis of a particular solution or knowledge partition. Since there may be a plurality of knowledge partitions or solutions for a work process or for a set of basic documents, it is accordingly also possible to produce a plurality of application descriptions, from which the user can then select one or more suitable application descriptions.

Knowledge Base and Knowledge Elements

A knowledge base denotes all the information about the work process which the method collects in the course of the analysis, this finally forming the basis for the production of knowledge partitions and the relevant application descriptions. The knowledge base is structured and formalized into the classification into knowledge elements. A knowledge element is a set of information which forms a unit in the method and which takes an independent role during the analysis and the production of the application description.

2. STRUCTURE AND MANNER OF OPERATION OF THE METHOD

The structure and manner of operation of the method will be discussed in more detail below.

The method uses a set of modules which cooperate in a defined manner. Preferably, a coordination module is provided, with the coordination module providing a user interface for a human planner or user. The coordination module accepts the inputs, i.e. the basic documents and the data sources to be used, and communicates with the user. The user interface allows the selection of the basic documents and possibly of data sources. In addition, the coordination module preferably coordinates the analysis and manages the knowledge elements, which arise as results for the individual analysis substeps, in a knowledge base. In addition, the coordination module can provide a series of functions for closer analysis of knowledge elements. In addition, the coordination module can perform the selection of knowledge partitions and coordinate the production of the application description, which arises from the knowledge partitions.

The analysis is preferably performed by analysis modules. The analysis modules are preferably called by the coordination module. The analysis modules preferably deliver results in the form of knowledge elements, assumptions and proposals for production to the knowledge base. The knowledge base is managed by the coordination module, as mentioned. One category of analysis modules is preferably specialized for the analysis of a particular document type. By way of example, these analysis modules may be specialized for the analysis of MS Word, MS Excel, HTML or similar document types. Further analysis modules may be specialized for the closer analysis of already existing knowledge elements.

From the assumptions, the coordination module preferably determines the knowledge partitions.

The application description is performed or produced on the basis of the knowledge partitions by, in particular, independent production modules. The production modules are preferably likewise controlled by the coordination module. The production modules produce the application blocks, wherein the application blocks are combined in the application description. The application description is preferably likewise managed by the coordination module.

In summary, the method has the following first six aspects:
a knowledge base having knowledge elements relating to the work process;
a set of assumptions about these knowledge elements, wherein this set is used to determine knowledge partitions and hence solutions for the work process;
a set of production proposals for producing the application description, wherein the production proposals are based on the assumptions;
a set of analysis modules which construct the knowledge base, make assumptions and make production proposals; analysis modules denote all modules which analyze something and deliver interim results.
a coordination module which coordinates the analysis, manages the knowledge base and/or produces knowledge partitions on the basis of the set of assumptions;
a set of production modules which take the knowledge partitions and the production proposals and produce the application description using application blocks. Production modules denote all modules which produce the application blocks from analysis results.

2.1 Knowledge Elements and Knowledge Base

The knowledge elements and the knowledge base about the work process will be discussed in more detail below:

The task of each of the analysis modules is to produce knowledge elements about the work process which is intended to be mapped by the application description to be produced. These knowledge elements relate to data, inputs, outputs, functions, structures and relationships for the work process. All the knowledge elements which can be preferably generated by the analysis modules and stored in the knowledge base are presented below:

a) DATA FIELD

At least one data field is recognized in the basic documents as a knowledge element. A data field forms a wildcard which can assume various values of the same data type in the flow of the work process.

All data potentially used in a work process are mapped as a data field in the method. During the analysis, specific values are preferably not allocated to the data fields, but rather the data structure of the work process is ascertained. This data structure and data fields form the basis for the provision of input masks, outputs and database tables for the application description. A data field describes a single "data item" or data element, including one or more possible data types and further properties. A data field is created during the analysis when an analysis module recognizes in a basic document an element or a structure which can be used as a wildcard for values which could be input in the work process, output or part of a calculation or condition. In the application description, a data field essentially corresponds to a variable. A data field should not be confused with the specific value of a variable. A data field particularly has the following properties: during the analysis, each data field is preferably allocated a name, a reference to the origin from which basic document and/or which component this data field stems, a list of possible data types, a list of the components which encompasses it and/or relationships with other knowledge elements as a property.

The name of the data field does not need to be unique. During the analysis, the basic documents are analyzed for names for the recognized data fields. Relationships (see below) between data fields can be produced using the same, similar and/or synonymous names.

A reference to the origin of the data field is a unique reference to the element or the structure which served as a basis for producing the data field. A reference particularly needs to contain the basic document and/or the component of the origin. The list of data types associated with the data field may also be blank. A list of further properties which are preferably associated with the data field may likewise be blank. In addition, the data field has a list of components with which the data field is associated as a further property. In addition, the data field has references to relationships with other knowledge elements as a property.

The selection of the data types used in the method is not limited, in principle. Preferably, integer numbers, decimal numbers, counter strings, a data item and Boolean values (true/false) are recognized as data types in the method. It is also conceivable for further data types to be able to be analyzed during the analysis. By way of example, an analysis module can analyze graphics files using the further data types "dot, line and circle", which can in each case then be processed by an appropriate production module too. It is possible for a specific data type or a data field to be known only to particular analysis modules and production modules and to be able to be processed by these modules.

If the list of data types is blank, this means that the data type of the data field is unknown. If the list of data types contains a plurality of entries, these are competing with one another. In this case, each data type needs to be flagged as an assumption and these assumptions must be in conflict with one another. The properties associated with the data fields may be unlimited, in principle. However, a property must have at least one name and a value or a set of values. During the analysis, properties are used to store information relating to a data field, said information being able to be processed further by other analysis modules or production modules. In particular, analysis modules which are specialized for the processing of particular data fields can use one or more properties for identifying data fields which are relevant to them.

b) COMPONENTS

Components as further knowledge elements will be discussed in more detail below. A component is defined as a set of, in particular, cohesive data fields and the structure which together form these data fields.

The data structure of a work process is reflected in the structure of the basic documents. Components are used to evaluate this structure of the basic documents and to combine data fields within the meaning of a structure to form groups.

A further role is played by the recognized components during the analysis of the flow of the work process and hence during the structuring of the flow logic for the application description. During the analysis, each component is preferably allocated at least one name, a list of data fields, a reference to the origin from which document this component stems and/or possibly references to relationships with other knowledge elements as a property. During the analysis, a component maps part of a basic document or a complete basic document. The mapped part of the basic document or the component is clearly distinguished or delineated from the rest of the document by the type and arrangement of the data fields. By way of example, a component can be formed by a table or a list or an address field with a name, street, town or the like. A component is essentially determined by the set of data fields, together with references to relationships with other knowledge elements which can be used to map the purpose of the component. The component may have the following properties, in particular:

A name, wherein the name does not need to be allocated uniquely. The same, similar or synonymous names can be used to produce relationships between components. By way of example, the name of a basic document (for example an Excel table) can be used as a name for a component, the name of this component being sought in the other documents during the analysis.

A reference to the origin of the component, i.e. a unique reference to that basic document and the part of the basic document which served as a basis for producing the component. The reference specified or contained is particularly the basic document from which the component stems.

In addition, the component has a list of all data fields which the component encompasses. In this case, the list of data fields must not be blank. In addition, the component may have a list of further properties, said list also being able to be blank.

In addition, the components may have references to relationships with other knowledge elements.

The aforementioned common purpose served by the component is preferably described by the list with further properties. These properties may be assumptions about the manner in which the component is used in the work process. Examples of such properties are inputs, outputs, data lists, tables, etc. During the analysis, any component can be flagged as an output component or as an input component as a further property. However, further properties may also describe the structure of the component, for example as a list structure, form structure or the like. Analysis modules may be provided which are specialized for the processing of particular components. These specialized analysis modules can use one or more of the further properties for identifying components which are relevant to them. The properties may comprise a descriptor and possibly additionally a value. Components are created during the analysis when an analysis module considers a set of data fields to be associated on the basis of the way in which they are arranged and presumes this association to have a purpose. Examples of the recognition of such arrangement patterns and associations are given in further parts of the description using an example.

c) FORMULAE

The formula knowledge element will now be explained in more detail as a further knowledge element:

A formula is a mapping specification which is used to determine a result from a set of inputs, particularly using operators. In this case, data fields and constant values can be used as input. The result of the mapping is stored in a data field. A formula is therefore always attached to a data field. In this case, "mapping specification" is understood to mean both calculations and non-numeric mapping operations for a set of inputs onto an output. Knowledge elements of formula type are defined as follows in the particularly preferred refinement:

A formula preferably comprises either precisely one function or an operator and two operands, wherein an operand may in turn be a formula, a function, a data field or a constant value. A function maps a set of input values onto an output value, the function being an encapsulated unit.

d) CONDITION

The "conditions" knowledge element will be discussed in more detail as a further knowledge element:

A "condition" is a special form of a formula which uses particularly comparison and/or logic operators to map a set of inputs onto one of the two values "true or false". Preferably, conditions are attached either to data fields or to components.

In one particularly preferred refinement, knowledge elements of "condition" type may be defined as follows:

A "condition" has one or two operands of Boolean data type. In addition, a condition may have a logic operator. When two operands are provided, an operator also needs to be provided. In this case, the functions and data fields have the Boolean data type. An operand may be a condition, a function, a data field or a comparison. A comparison comprises a comparison operator and two operands having the same data type. Suitable operands are functions, data fields and constant values.

e) RELATIONSHIP

The "relationship" knowledge element will be discussed in more detail as a further knowledge element:

The "relationship" knowledge element maps a connection between two or more knowledge elements. The analysis of the relationships between knowledge elements forms an important source of assumptions about the flow of the work process and hence about the flow logic for the application description. Relationships can exist between all types of knowledge elements. Every relationship preferably comprises a set of knowledge elements and a relationship type. In this case, the relationship type is defined by an analysis module and may preferably be known to all or just a group of analysis and production modules. Examples of relationships will be explained in more detail later using an example.

f) DATA SOURCE

The "data source" knowledge element will be explained in more detail below as a further knowledge element:

The "data source" knowledge element maps a data object which exists permanently outside of the application description or the generated application, from which data object the application, i.e. the executed application description, can fetch data and/or deliver data to the application description.

A work process is usually embedded in an IT and process landscape. On the one hand, the work process reads data from existing databases and receives data from extraneous processes or interfaces. On the other hand, it stores data in existing databases and delivers data to extraneous processes or interfaces. The data source knowledge element maps this communication with these data objects or with the surroundings. In addition, the data source knowledge element is used to create new data objects for storing data during the execution of the application description. The data source knowledge element allows the application, i.e. the executed application description, to interchange data with data objects outside of the applications. These data objects exist outside of the application and the application description, specifically on a continuous basis, so that these data objects can be accessed whenever the application description is executed. The interchange using the data source knowledge element can preferably be effected on a read and/or write basis. Whether an application description allows only data to be read from the external data object, only data to be written to the external data object or whether both are possible is dependent on the work process and arises in the course of the analysis of the basic documents and the data objects.

Data objects can both store data, in particular may be files, databases, etc., and be generated by the application or the application description. Data objects may also be hardware interfaces, e.g. for controlling an external appliance. Data objects exist outside of the application description, which means that they are technically independent data objects which are preferably also available to other programs. The method allows a data source to be allocated for all data objects which are not only of a time-limited nature.

The human user of the method can disclose data objects besides basic documents in the method as an input. This data object then delivers data or can pick up data. During the analysis, the data object is allocated a data source knowledge element. In this case, each data source has a unique name as properties and, particularly as further properties, the data structure, particularly fields and data types. During the analysis, relationships between already recognized data fields and components and data sources are analyzed, particularly using the names of the data fields and the data types used. For components recognized during the analysis, new data sources can be created during the method. In this case, these newly produced data sources associated with the components form data memories, which can be produced in the form of a database table, for example.

g) DATA SOURCE FIELD

The further "data source field" knowledge element will be discussed in more detail below:

The data source field knowledge element represents a single field in a data object. Data source fields can be used to interchange data values with the data objects. A data source field is similar in terms of structure to the data field knowledge element and can therefore be constructed in essentially similar fashion.

h) EXAMPLE

The further "example" knowledge element will be discussed in more detail below:

The example knowledge element is a data value which is available in a basic document for a data field recognized during the analysis or a set of data values for the associated data fields of a single component. The example knowledge element is used to store the data values possibly contained in the basic documents. These data values and hence the example knowledge element are an important source of information relating to data types or special properties of data fields or of components. From the example knowledge element, it is possible to derive assumptions about the data type of a data field. The analysis modules are preferably designed such that it is also possible to obtain more complex knowledge from the analysis of the example knowledge elements for a plurality of data fields, however. By way of example, a formula can be derived from a set of value tuples. By way of example, one of the analysis modules may therefore be designed such that a formula is derived from an example with a value tuple.

2.2 Application Blocks

The preferably used application blocks will be discussed in more detail below:

The knowledge elements are used to map the work process which is represented by the basic documents. By contrast, the application description is compiled from the application blocks. In particular, the application description can essentially comprise the application blocks.

The application blocks used are at least one data field block, at least one state block and preferably at least one action block. This split is based on the fundamental idea that the business process is conditional upon a triangular relationship between data, the flow and a functionality (cf. FIG. 3). The data on which the business process is based and which the user inputs control the flow of the business process or stipulate what flow options exist. The data are represented using data field blocks in this case. The flow of the business process in turn structures the functionality or makes particular functionalities available to the user. The flow and the provision of the functionality are implemented through the use of state blocks. The state blocks can affect the data fields, for example by means of calculations, by changing the data, by presenting the data, etc.

The text below refers to FIG. 4.

The data field block is used for maintaining and manipulating data. The data field block is associated with the data field knowledge element. The data field block can be used to store values or information. The flow of the work process is mapped by at least one state block. The state blocks structure the work process. The state blocks can provide particularly input masks and functionality for the user. The state blocks structure and combine the interaction of the other application blocks.

Action blocks provide the functionality of the work or business process. Action blocks map the execution of the functions, for example there may be action blocks provided for the calculation, the data manipulation, for the output of data, for the production of documents, for the loading of data and for the storage of data. The individual application blocks (cf. FIG. 4) will be explained in more detail below:

a) Data Field Block

The "data field block" application block will be explained in more detail below:

The "data field" knowledge elements are represented by data field blocks in the application description. Data field blocks can take individual values of a particular data type in the execution of the application description. In contrast to the data field knowledge elements, the data field blocks have a particular data type. The value may be the result of a formula block, can be input by the user or can be assigned by an action block. The changes in the value of a data field block can initiate the recalculation of a formula or execution of a formula block or of a condition block or the execution of an action block. In this case, the data field block can have links to formula blocks in which the data field block occurs. The data field block may also be linked to form elements or form element blocks. When a new data value is input into the form element during the execution of the application description, the value of the data field block is then changed, for example.

b) Action Blocks

Action blocks are discussed in more detail below. An action block has a series of commands which are executed in succession, with jumps being possible on the basis of the execution. In a similar way to a function in a programming language, a command is the smallest functional unit of an application description. In this context, a command is defined by a unique identification (ID) which distinguishes the command from all other commands. In addition, a command is identified by the semantics of its execution or of its meaning (what does a command do?). In addition, a command is defined by the parameters with which the command is provided (how does the command do this?). In addition, the command is defined by the results of its execution (what is the result of the command?). Results of the execution of the command may be: a value change in data field blocks, a change in a data source, for example values can be written or erased in the data source, a document can be produced or there may be a transition to another state of the application description.

Each production module has a repertoire of commands which it can incorporate into an action block. In this case, there are commands which are known to all production modules and those which are known to just one production module or which are known to a group of production modules.

The execution of an action block and hence the execution of its commands is part of the execution of the application description and not part of the method for generating the application description. In the prior art, diverse examples are known for how it is possible to implement value changes in data fields, changes in data sources or a transition from one state to another state using commercially available programming languages.

c) Formula Block

The description of formula blocks will be discussed in more detail below. A formula block represents an arbitrary calculation which is constructed from operators and operands, the operands being able to be data values, data field blocks or encapsulated function blocks. In a similar manner to action blocks, function blocks are defined by a unique identification (ID), their parameters, their semantics and their result or the result type, but the analysis modules are usually responsible for the selection of function blocks. However, there are in turn function blocks whose semantics are known to all analysis modules and those whose semantics are known only by one or a group of analysis modules.

d) Condition Blocks

Condition blocks will be discussed in more detail below. A condition block can be regarded as a special case of a formula block and can be implemented as a special case of a formula block. Condition blocks are constructed from comparison and/or logic operators and deliver either "true" or "false" as the result.

e) Task Blocks

Task blocks will be discussed in more detail below. A task block, from a technical point of view, is an action block which, however, can be executed specifically by the user when the application description is executed. Task blocks are attached to one or more state blocks, i.e. they are available to the user only when one of the states or state blocks to which it is attached is currently active. During the execution of the application description, only one state block is ever active. In addition, the option of being able to execute a task block can be made dependent on a condition which needs to be met. By way of example, the production module, which generates a task block for producing a document, can generate a condition which is met when particular data field blocks which are required for the document have been filled. This condition is then attached to the task block as a condition block, so that the task block is not cleared until the user has input the appropriate data. For each task block, it is possible to stipulate that the task block needs to be executed before the current state block or the entire application description is terminated. For each task block, it is possible to stipulate whether the task block can be executed only once or a plurality of times.

f) State Block

State blocks will be explained in more detail below. A state block is defined by the options which it provides for the user during the execution of the application description: that is to say particularly an input which the user can or needs to make, an output which is provided for the user, in the same way as task blocks which the user can or needs to call or which are initiated by the inputs from the user, changes to other state blocks which are actively initiated by the user or are initiated automatically by virtue of stipulated conditions being met. State blocks may have special form element blocks. Form element blocks or a form element block provide(s) the user with options for displaying, changing and the like the data field blocks or data fields linked to the form element block during the execution of the application description. In this case, a form element block is essentially the visible representative of the underlying data field block. During the execution of the application description, the user executes the different state blocks, in particular. In this case, a state block comprises a set of form elements, actions and tasks or, in the application description, a set of form element blocks, action blocks and task blocks and also the possibly further condition blocks. The form elements, actions and tasks are rendered visible by the state block for as long as the application is in the relevant state. The transition between different states and, in the application description, hence the transition between different state blocks is regulated by the action blocks and condition blocks. Condition blocks can automatically transfer the applications, for example, into a new state as soon as the conditions of the condition block are met. Conversely, a condition block can also prevent a particular state change by action blocks or other condition blocks from being possible. The application description is presented by the state blocks preferably in individual forms, which can correspond to successively presented screen windows.

The flow logic of the work or business process is classified into different state blocks by the application description.

g) Document Template Block

Document template blocks will be discussed below. A document template block is produced from a basic document, with instances of the basic document which are filled with data being able to be created. A document template block comprises a prepared and blank copy of the basic document and an action block which is executed when an instance needs to be created. This action block then produces the document instance and fills the document instance with the data. This is an example of commands which are known only to a particular production module. For each class of basic documents for which document template blocks can be created, there is a special production module with specific commands which is tailored to the respective class of basic documents.

h) Form Element Block

Form element blocks will be explained in more detail below: form element blocks are parts of state blocks. A form element block represents a data field block and is used for communication with the user, i.e. for displaying and/or inputting the data value of the data field block.

i) Data Source Block

Data source blocks will be discussed in more detail below. Data source blocks provide the interchange of data between the application description or the executed applications and data objects which exist outside of the application or the rest of the IT world. These data objects exist independently of the application description and can both deliver data to the application description and receive data from the application. Data objects are therefore used both for storing data and for communication with other applications or technical processes. Data source blocks form the interface to the data objects in the application description.

2.3 Proposals for Production

Proposals for the production of the application description will be discussed below:

From the knowledge base, which is in the form of the knowledge elements described above, the analysis modules derive proposals for the production of the application description. A proposal for production is always directed at a particular production module, which implements the proposal and can produce appropriate application blocks. A proposal for production has the following information: information about the production module which is intended to implement the proposal; a set of knowledge elements which the designated production module is intended to convert into application blocks. For each knowledge element, the proposal stores further information which describes the conversion of the knowledge element in more detail. In addition, the proposal contains a list of application blocks which the production module is intended to produce. For each application block, the proposal contains more detailed information for the production module, said information providing a more detailed description of the application block or its production.

Every proposal is based on a basis of assumptions. All knowledge elements which play a part in the production of the proposal, regardless of whether they are explicitly part of the proposal or only implicitly referenced by an application block, and which are flagged as assumptions form the basis of the proposal. The proposal is implemented by the coordination module only if all assumptions from the basis are accepted. This will be explained in more detail below.

2.4 Assumptions, Facts and Knowledge Partitions

Assumptions, facts and knowledge partitions will be discussed in more detail below:

The knowledge elements are at least to some extent flagged as assumptions. Each knowledge element can be flagged either as a fact or an assumption. A knowledge element is deemed to be a fact when it is deemed to be safe and is not in conflict with any other knowledge element. By contrast, assumptions are merely deemed to be plausible and are therefore equipped with a "plausibility" property. Assumptions can be in conflict with other assumptions.

The decision regarding whether a knowledge element is treated as a fact or as assumption is made by the analysis module which produces the knowledge element. In the event of any doubt, an analysis module always assumes that a knowledge element is an assumption if it is possible that knowledge elements produced later might be in conflict with this knowledge element and/or the basic documents on the basis of which the knowledge element is produced are not unambiguous or leave room for interpretation in respect of the type of the knowledge element. In this case, the assumptions are preferably allocated various plausibilities. In an alternative refinement, all assumptions can be allocated the same plausibility.

When a first assumption has been derived from another assumption, i.e. the first assumption is dependent on the other assumption, the other assumptions are deemed to be a prerequisite for the first assumption. Prerequisites play a central role in the ascertainment of knowledge partitions. This is described in more detail below. Whether an assumption is derived from other assumptions is decided by the analysis module which makes the assumption. When an analysis module makes an assumption, this assumption is assessed with a plausibility which may be greater than zero and less than 100, for example, and can be interpreted as a percentage. In this context, this plausibility can essentially correspond to a probability of this assumption being correct. Assumptions having the rating 100 are then treated as facts. The analysis modules stipulate the plausibility of the assumptions. These plausibilities are called relative plausibilities.

The analysis modules also decide whether a knowledge element and an assumption are in conflict with already existing knowledge elements. When a conflict with an existing knowledge element is recognized, the rest of the procedure is dependent on whether the knowledge elements are facts or assumptions. The text below indicates how a conflict and the subsequent options are dealt with:

If the existing knowledge element is a fact and the new knowledge element is a fact, both knowledge elements are converted into assumptions. The plausibility thereof is stipulated at 99%, for example.

If the existing knowledge element is a fact and the new knowledge element is an assumption, the existing knowledge element is converted into an assumption. This assumption can again be provided in a plausibility of 99%, for example. If the existing knowledge element is an assumption and the new knowledge element is a fact, the new knowledge element is regarded as an assumption whose plausibility can be stipulated at 99%, for example. However, this case can arise only if the existing knowledge element has been produced by another analysis module, since a conflict between two knowledge elements which are produced by the same analysis module can arise only if the information in the basic documents is not sufficient to have one of the knowledge elements appear as safe and the other knowledge element therefore appear as not at all plausible. The assumption about the already existing knowledge element does not change at all in this case.

If the existing knowledge element is an assumption and the new knowledge element is likewise an assumption, the new knowledge element with the plausibility ascertained by the analysis module is regarded as an assumption. The assumption about the existing knowledge element does not change at all.

This stipulates how a conflict between an existing knowledge element and a new knowledge element is dealt with. The fact that the knowledge elements formerly flagged as facts are now flagged with a plausibility of 99% is due to the fact that different interpretations of the basic documents are permitted in the method. Conversion of facts into assumptions occurs only if the knowledge elements are produced by different analysis modules. Since the knowledge elements formerly flagged as facts are now flagged as assumptions with a high degree of plausibility, these plausibilities are almost used as facts for the calculation of the partition plausibility of a knowledge partition. The effect achieved by this is twofold:

The fact that a conflict between the two knowledge elements is defined produces at least two different knowledge partitions at the latest, effectively one knowledge partition during each knowledge element. This takes account of different interpretations of the basic documents for the production of the application description. The reason is that a knowledge partition may only contain conflict-free assumptions. If there are two assumptions in conflict and both need to be taken into account by solutions, there must thus be at least two knowledge partitions which each have one of the assumptions in its set of conflict-free assumptions.

The partition plausibility of a knowledge partition is not influenced by the conflict between two analysis modules, which also makes sense in this regard, since different analysis modules use different basic documents, for example, and therefore, in the overall context of a work process, it is entirely possible that one of the two may be correct and the other may be totally incorrect. When the application description is produced, the output may include a comment to the effect that one application description produced is based on a knowledge partition which is in conflict with another knowledge partition or application description in respect of a determined knowledge element. The user of the application description generator or the method thus has the option of taking account of the information about the conflict in the selection of an application description which is suitable for him.

The method is used to determine at least one conflict-free knowledge partition, wherein the at least one knowledge partition has a respective set of conflict-free assumptions. The assumptions are in turn linked to knowledge elements or associated with knowledge elements, which means that a knowledge partition simultaneously defines a set of knowledge elements. During the production of the knowledge elements, proposals for production were generated which can be taken as a basis by the production modules for producing a respective application description. The determination of the knowledge partition is a preliminary stage on the route to the application description which is used for selecting suitable knowledge elements and proposals for production.

The determination of the knowledge partitions compiles assumptions and hence knowledge elements and proposals for production which have been encountered in the course of the analysis relating to the knowledge elements.

The knowledge partition has not only the assumptions but also, in particular, all the facts, i.e. including all the knowledge elements which are deemed safe and all proposals for production which are based exclusively on facts, i.e. the implementation of these proposals for production requires only knowledge elements which are flagged as facts. In addition, the knowledge partition has a, in particular, finalized set of conflict-free assumptions. A set of assumptions is conflict-free when there are no two assumptions in this set which are in conflict with one another. The set of assumptions is finalized when it is not possible to add further assumptions without infringing the property of freedom from conflict.

Two assumptions are in conflict with one another if there is either a conflict defined for them directly or they presuppose assumptions which are in conflict with one another. Two particular assumptions presuppose conflicting assumptions if a pair of conflicting assumptions exists, i.e. a conflict is defined for these conflicting assumptions and one of the conflicting assumptions forms the prerequisite for one of the particular assumptions and the other conflicting assumption forms the prerequisite for the other conflicting assumption. In this case, it does not matter whether the conflicting assumptions are a prerequisite for the particular assumptions directly or in turn via interim assumptions. In this context, the particular assumptions may be based on conflicting assumptions indirectly or directly in order themselves to be flagged as conflicting.

It is important for the set of assumptions to be finalized when the knowledge partitions are determined, for the following reasons:

Firstly, the finalized nature ensures that the knowledge partitions differ from one another, since there can be a plurality of knowledge partitions only if conflicting assumptions exist. Since every finalized knowledge partition has at least one different assumption, the application descriptions generated on the basis of the knowledge partitions also differ. Secondly, the feature of the finalized nature of the set of assumptions keeps down the number of possible knowledge partitions, since otherwise the number of possible knowledge partitions would rise greatly as a result of power set formation for conflict-free assumptions. If the finalized nature is dispensed with, this would result in an increase in computation time.

2.5 Coordination Module

The coordination module will be discussed in more detail below. The coordination module preferably performs one or more of the following tasks:

- The coordination module is preferably used to provide the user with a user interface. The user interface allows communication with the user. By way of example, the user can select the basic documents and the data sources. The coordination module is preferably used to control the analysis. The analysis modules are preferably called by the coordination module. Preferably, the analysis modules do not communicate with one another but rather communicate via the coordination module.
- The coordination module is preferably used to manage the knowledge base. The coordination module is preferably used to provide the analysis modules with functions for managing knowledge elements.
- The coordination module is used to manage the assumptions.
- The coordination module is preferably used to produce the knowledge partitions.
- The coordination module is preferably used to manage the proposals for production. On the basis of the determined knowledge partitions, the coordination module is preferably used to coordinate the work of the production modules. The coordination module is used to produce the application description using the production modules, said application description being stored and cleared with the coordination module.

In one alternative refinement of the method, it is conceivable for the coordination module to be split into a plurality of submodules which each perform one or more of the aforementioned tasks.

The way in which the coordination module performs these tasks will be described in more detail later with reference to an example.

Before the analysis starts, the user can preferably stipulate the parameters for the method using the coordination module for the analysis and for the production. The coordination module is then used to select the basic documents which are intended to use the method for the analysis. During the analysis, questions are preferably put to the user. These questions can be sent by the analysis modules to the coordination module, wherein the coordination module outputs the questions to the user. In addition, the analysis modules can provide the user with information, e.g. about erroneous basic documents, using the coordination module. Following the production of the application descriptions, the coordination module provides the user with the option to test and clear an application description. However, this is no longer part of the method, since the method is complete with the production of the application descriptions.

The communication between the analysis modules is preferably controlled by means of the coordination module by challenges and responses. A challenge can be sent to the coordination module by an analysis module at any time. In this context, a distinction is drawn between two types of challenges:

- In the case of a direct challenge, the analysis module notifies the coordination module of the other analysis module to which the challenge needs to be routed. In this case, the challenge is forwarded to the further analysis module by the coordination module. A direct challenge has the name of the analysis module to which the challenge is sent and the information which the analysis module requires in order to respond to the challenge.
- In addition, an open challenge is preferably provided. In the case of an open challenge, the coordination module is notified of what information the analysis module is delivering and what kind of information the analysis module expects as a response. The coordination module then takes these two pieces of information as a basis for selecting one or more suitable analysis modules to which the open challenge is forwarded. In order to be able to process these open challenges, the coordination module is notified by the analysis modules of what information they are able to process for a challenge and what information, particularly what knowledge elements, they are then able to deliver.

If an analysis module is able to handle the open challenge, the coordination module is provided with the result of the challenge, with a response being forwarded to the originally challenging analysis module by the coordination module. Alternatively, the analysis modules could communicate with one another directly.

Preferably, in addition to challenges, in particular, orders are also sent to the coordination module. Orders are distinguished by challenges in that orders are not executed until at a later time, particularly after the work of the commissioning analysis module has ended. In addition, in the case of some orders, no responses to the analysis module are provided, since the commissioning analysis module may, of course, already have finished handling the order. In the case of other orders, a response may be provided, in which case the commissioning analysis module receives or should receive further information relating to the processing in the response. In particular, advice of the original order can be returned.

2.6 Analysis Modules

The analysis modules will be discussed in more detail generally and specifically below:

Each analysis module is preferably a self-contained program unit. By way of example, each analysis module can be formed by a class, particularly a C++ class. Each analysis module preferably communicates exclusively with the coordination module. The analysis modules are used to read and change the knowledge elements from the knowledge base, and also to create new knowledge elements and to write them to the knowledge base. The analysis modules are used to form assumptions and communicate said assumptions to the coordination module. The coordination module can provide the analysis modules with options for managing assumptions. The analysis modules are used to use the options of the coordination module to manage assumptions. The analysis modules are preferably used to make proposals for production which can be implemented by the production modules.

The analysis modules preferably use a collection of heuristics in order to derive new knowledge elements from the basic documents and/or the knowledge base and preferably to flag said knowledge elements as facts or assumptions. Since the method uses analysis modules, the method can easily be expanded and/or ported to other operating systems, since the analysis modules are essentially defined by means of their input and output behaviors. The text below provides a more detailed presentation of a plurality of types of analysis modules which play a particular role in the method and should therefore also be taken into account in the preferred refinement of the method:

a) Document Analysis Module

Document analysis modules will be discussed in more detail below. The document analysis module is respectively specialized for the analysis of a particular class of basic documents having a specific file format. Examples of these are basic documents having the file format MS Word, MS Excel, pure HTML text files, MS PowerPoint presentations, Open Office text documents, source code files for particular programming languages, e.g. MS Visual C++ or the like. The basic documents are used by the document analysis modules in different ways:

Firstly, the basic documents are sources of knowledge, wherein during the method the knowledge base is constructed with the knowledge elements on the basis of the analysis of the basic documents. The respective document analysis module knows the technical structure for the file format of its document class in order to analyze a special basic document of this kind and to extract knowledge elements found and to store them in the knowledge base. The document analysis modules deliver the data fields, components, formulae, etc. which the basic documents contain. In this context, the document analysis module operates as a self-contained unit. The implementation of the analysis steps of the document analysis module does not need to be known to the coordination module in this case.

In addition, the basic documents play a further role in the method:

In addition to the public knowledge elements which the respective document analysis module adds to the knowledge base, it is able to produce private knowledge and to attach it to the analyzed basic document. This private knowledge is needed if a document template is produced from the basic document, from which document template it is in turn necessary to generate document instances in the course of the execution of the application description. Essentially, the document analysis module produces knowledge regarding how the document template can be constructed. This can be forwarded as a proposal for production to the relevant production module. The document analysis are able to make use of different heuristics or approaches in order to analyze the knowledge elements from the basic documents:

In some classes of basic documents, there are "structures" with a fixed meaning which can also easily be accessed by program means. Examples of these are form fields or tables in Word documents, names or formulae in Excel worksheets, tables or hyperlinks in HTML files or else charts in a PowerPoint presentation. These "structures" can be directly recognized, analyzed and translated into knowledge elements by the relevant document analysis modules. In particular, the document analysis modules effect direct access to form fields, tables, names, formulae, hyperlinks and/or charts and translate them into knowledge elements.

In accordance with a further approach or further heuristics, a respective document analysis module can recognize knowledge elements from the structure of the basic document or from the structure of parts of the basic document. In the case of these heuristics, the type and arrangement of the content of the basic document are examined. By way of example, lists and tables in Word documents can be recognized by their orientation, possibly numbering, etc.

In accordance with further heuristics or in accordance with a further approach, the document analysis modules can evaluate comments in the basic documents. In many document classes, the author of such a basic document has the option of writing comments and storing them in the basic document. Such comments can be directed to other readers of the basic document. By analyzing the comments using the document analysis modules, the method can obtain further information about the structure or arrangement to which the comment relates. If this structure or arrangement is converted into a knowledge element, the knowledge element is thus able to be equipped with further properties on the basis of the comment. By way of example, a formula in plain text could be stored for a recognized data field in an MS Word document ("force=mass×acceleration" or "price=item price×number of items"). From this plain text formula, the relevant document analysis module could then generate a formula knowledge element which is attached to the data field, provided that other "force", "mass", "acceleration" or "number of items" and "item price" data fields are found in this or other basic documents.

b) Knowledge Element Analysis Module

In addition, knowledge element analysis modules are preferably provided which will now be explained in more detail here:

The knowledge element analysis module is specialized for closer analysis of a particular class of knowledge elements. By way of example, the knowledge element analysis modules may be provided for the closer analysis of formulae (see above) or data fields. The knowledge element analysis modules assist the document analysis modules in the generation of knowledge elements by analyzing aspects of knowledge elements which the document analysis modules do not recognize or which can be handled meaningfully only at a later time in the analysis.

c) Component Analysis Modules

In addition, what are known as component analysis modules are preferably provided which will now be explained in more detail:

The component analysis module is specialized for the analysis of a particular class of components. A class of components is defined by the presence or absence of particular properties of a component. Since a component can, in principle, be assigned any properties, analysis modules which allocate component properties (in particular, these are preferably the document analysis modules) and analysis modules which analyze components more closely need to be in tune with one another or use the same property descriptors.

d) Relationship Analysis Modules

Furthermore, relationship analysis modules are preferably provided which will be explained in more detail below:

The relationship analysis module is specialized for the analysis of particular relationships between knowledge elements. In particular, relationship analysis modules are provided for the analysis of relationships between different components. From these relationships, the flow of the business process or the flow logic of the application description is preferably created. This is explained in more detail in the further course of the description (cf. FIG. 11) with reference to an example.

2.7 Determination of the Knowledge Partition(s)

The determination of the at least one knowledge partition and hence determination of possible variants of the application description will be discussed once again below.

When the analysis is complete, the knowledge partitions are then determined on the basis of the assumptions made, i.e. possible variants of the application description are selected. A knowledge partition which can also be called a solution is a maximum, conflict-free set of assumptions and facts. The coordination module is used to determine the individual knowledge partitions.

Preferably, the coordination module has criteria which assess some of the knowledge partitions found as unsuitable and eliminate them, so that only knowledge partitions for suitable application descriptions are created. By way of example, such criteria may be that although a knowledge partition is complete and conflict-free, it is only small in comparison with the other knowledge partitions, i.e. uses only a few knowledge elements. A further criterion might be that the knowledge partition found does not have any inputs or outputs provided. Such recognized criteria can either be used to prompt the coordination module to eliminate the knowledge partition "of its own accord" or to prompt it to make these criteria available to the user of the method in order to make it easier for him to select the suitable application description.

One possible method for determining the knowledge partitions is based on the presentation of the relationship between the assumptions by a graph. In this case, the assumptions may be in conflict with one another or may be based on one another (what are known as conflicts and basic relationships may be prescribed which are mapped by a graph). This determination of the knowledge partitions is particularly preferred and is described by way of example below: the determination involves an (assumption) graph being created. The assumption graph or graph preferably has directional and/or nondirectional edges. The assumption graph is produced particularly by the coordination module. In one particularly preferred refinement, the graph is defined as follows:

There is a set K, the elements of which are denoted as nodes k. For each assumption, there is precisely one node k.

Each node k is marked with a value pk, which corresponds to the absolute plausibility of the assumption which the node represents. In this context, the assumption itself has a plausibility as a property; however, this is the relative plausibility assuming that all basic assumptions are fulfilled.

There is a set C, the elements of which are denoted as directional edges. A directional edge comprises a pair (k1, k2) of nodes k1, k2, with a directional edge being produced precisely when the assumption for k1 is a prerequisite for the assumption for k2.

There is a set U, the elements of which are denoted as nondirectional edges. A nondirectional edge comprises an unordered pair (k1, k2) of nodes k1, k2, with a non-directional edge being produced precisely when the assumptions k1 and k2 are in conflict.

In order to prepare the determination of the knowledge partitions, the graph is first of all set up. In a first substep of the determination, the nodes, particularly without assessment, and the edges are produced. In a second substep of the determination, the absolute plausibilities pk of the assumptions are calculated and are added to the nodes. The calculation of the absolute plausibilities can involve the application of various calculation methods. In this context, the calculation methods preferably meet the following conditions, however:

The absolute plausibility pk of an assumption is based exclusively on the absolute plausibilities pk of its prerequisite and its own relative plausibility.

The absolute plausibility pk of an assumption must never be greater than the relative plausibility. The relative plausibility is an expression of the plausibility assuming that all prerequisites are fulfilled. Since the prerequisites are themselves assumptions with plausibilities, however, these plausibilities must be taken as a starting point for the calculation. The plausibilities are by definition less than 100%, however. A prerequisite with the plausibility 100% would mean that the prerequisite is a fact.

The absolute plausibility pk of an assumption must never be greater than the maximum of the absolute plausibilities of its prerequisites. This is evident from the above.

The absolute plausibility pk of an assumption without a prerequisite is exactly the same as its relative plausibility.

From these conditions, it is now possible to derive a calculation method which first of all determines the absolute plausibilities pk of the assumptions without prerequisites and then uses a formula to inductively calculate all further absolute plausibilities pk. The basis used for forming a suitable calculation method may be calculation methods from a processing without acute knowledge (e.g. fuzzy logic, probability logic, etc.).

When the graph has been set up, i.e. an assessed node exists for all assumptions and an edge exists for all prerequisites and conflicts, maximum partial graphs are sought in which no nondirectional edges exist. A partial graph is at a maximum or complete when it is true that as soon as an assumption or the relevant node is included, all the assumptions which are prerequisite for this assumption or presuppose this assumption are also included. In other words, there must be no directional edge which connects a node in the partial graph to a node which is not encompassed by the partial graph.

Each partial graph found represents a knowledge partition which comprises all the assumptions whose nodes are in the partial graph. The knowledge partition is formed by merging these assumptions for the set of all the facts.

FIG. 5 shows the structure of a graph and the finding of a solution using an example. FIG. 5 shows a graph 1. The graph 1 has a set of nodes 2 to 8 which represent assumptions 1 to 7. For each assumption 1 to 7, there is precisely one node 2 to 8. Each node is marked with precisely one absolute plausibility. By way of example, in this case the node 3 for the assumption 2 is flagged with the plausibility p=90. The graph 1 also has four directional edges 9 to 12. Each directional edge connects a pair of nodes, for example the directional edge 9 connects the nodes 2 and 6 and hence the corresponding assumptions 1 and 5. The assumption 1 is a prerequisite for the assumption 5. It is also clear from FIG. 5 that, by way of example, assumption 6 and assumption 2 are a prerequisite for assumption 7. In addition, the graph 1 in this case has a nondirectional edge 13. The nondirectional edge 13 identifies that the assumption 1 and assumption 2 are in conflict with one another. Since assumption 1 and assumption 2 are in conflict with one another, the assumption 5 and the assumption 6 or 7 are also in conflict with one another. The assumption 6 and the assumption 3 are together a prerequisite for assumption 7.

From this graph 1, it is possible to derive two knowledge partitions or two solutions:

A maximum partial graph without nondirectional edges comprises the assumptions 1 and 5 and also assumption 4 or the nodes 2, 6 and 5. The second maximum partial graph comprises the assumptions 2, 3, 6, 7 and 4 or the nodes 3, 4, 7, 8 and 5.

Each other partial graph is not at a maximum. By way of example, a partial graph having the assumptions 1, 4, 5 and 3 is not at a maximum or complete, since in this case the connected assumptions 7, 6 and 2 would be absent. Another partial graph having the assumptions 1, 2, 3, 5, 6 and 7 would be in conflict and not at a maximum, for example, since in this case assumption 4 is absent and additionally assumption 1 and assumption 2 are connected to one another by the nondirectional edge and hence are flagged as conflicting. The overall graph having all the assumptions 1 to 7 is conflicting, since the overall graph contains the nondirectional edge 13.

During the determination of the knowledge partitions, options should be prescribed for eliminating knowledge partitions which are not very plausible or are clearly inferior to other knowledge partitions. By way of example, knowledge partitions whose partition plausibility is determined could be eliminated. The associated application description of a knowledge partition would in that case be produced only if the partition plausibility is greater than a particular setpoint plausibility. By way of example, the partition plausibility can be calculated as an average for the absolute plausibilities of all assumptions or as an average for the absolute plausibilities of all assumptions which are not prerequisite for other assumptions. Similarly, of two knowledge partitions which result in exactly the same implementation proposals or proposals for production, it would be possible to eliminate the one which has the lower partition plausibility.

In order to speed up the method for determining the knowledge partitions, the absolute plausibilities could also be calculated when the assumptions are actually produced. The coordination module could then provide an appropriate function for calculation which expects as an input the plausibilities of all prerequisites and also the relative plausibility of the assumption and is available to all analysis modules. The advantage of this upstream calculation of the absolute plausibilities is that assumptions which support the setpoint plausibility are eliminated during the actual analysis or are not produced in the first place. The drawback is that some knowledge partitions are not found and are not determined.

The production of the different variants of the application description from the knowledge partitions will be explained in more detail below:

Two knowledge partitions are distinguished from one another by conflicting assumptions. Since a knowledge partition must be at a maximum, assumptions which are in no kind of conflict with one another in one of the knowledge partitions and also do not conflict with one another must be encompassed by both knowledge partitions. The same applies to all facts, since these by definition can conflict with neither other facts nor assumptions. Therefore, application descriptions which are produced from different knowledge partitions are distinguished by proposals for production which are based on conflicting assumptions.

This clarifies the role which assumptions and proposals for production play:

Assumptions allow the analysis modules to introduce different variants for mapping a work process into the analysis and to make them available to the coordination module. The coordination module has the option of taking account of all variants and trying out different variants of an application description which maps the work process by means of software by forming different knowledge partitions. In this context, the proposals for production are used to produce a clear division into analysis and production by virtue of their allowing the analysis modules to formulate their proposals for production using the actual formalism of the application blocks and at the same time to couple them to assumptions such that this can result in complete and conflict-free knowledge partitions. Hence, the proposals for production form a communication means between the analysis modules and the production modules and secondly a tool for the coordination module which can be used to create a variant of the application description from a knowledge partition.

To this end, once it has determined the knowledge partition, the coordination module proceeds with the following steps: first of all, the coordination module is used to implement all proposals for production which arise from the knowledge partition. A proposal for production arises from the knowledge partition when all assumptions which are a prerequisite for the proposal for production are contained in the knowledge partition or the proposal for production is independent of all assumptions, i.e. is not based on an assumption. In order to implement the proposals for production, the coordination module calls the relevant production modules. In this case, the proposals for production contain the information regarding which production module needs to be used.

Next, the coordination module is used to call further production modules which converts knowledge elements associated with the current knowledge partition into application blocks which have previously not been affected by one of the proposals for production. This completes this variant of the application description.

Finally, the coordination module is used to provide the user, via the user interface, with the option of preferably editing and assessing the finished variant of the application description.

Next, the individual variants of the application description can be tested and cleared.

It is conceivable that, in an alternative refinement, no proposals for production are used in the method. If no proposals for production are used, the production modules automatically access the knowledge elements of the individual knowledge partitions. If proposals for production are used, these proposals themselves contain the references to the relevant knowledge elements. The use of proposals for a production allows a clear division, with the complete analysis of all knowledge elements being left to the analysis modules. The production modules can then concentrate on the actual technical production of application blocks.

2.8 Production Modules

The production modules will be discussed in more detail below. In a similar manner to the analysis modules, the production modules are also specialized for particular tasks. Preferably, there are two types of production modules, namely dependent production modules and independent production modules.

Dependent production modules are each associated with an analysis module and implement the proposals for producing said analysis module. By contrast, independent production modules are preferably specialized for determined knowledge elements and/or application blocks and operate independently of the proposals for production which arise from the knowledge partitions. Preferably, each analysis module which makes proposals for production also has a production module existing for it which can implement these proposals. Preferably, each class of application blocks or each application block has at least one production module existing for it which can produce such application blocks. Preferably, each knowledge element has at least one production module existing for it which processes this knowledge element and can convert it into application blocks.

If the method is intended to be used for producing only special applications, it is possible that further production modules exist for these special applications.

The production of actions or action blocks will be discussed in more detail below:

A particular role is played by action blocks, which is able to be produced by one of the production modules. The production module is able to produce arbitrary commands, i.e. arbitrary functionality. To this end, each production module has a library of commands which the production module can produce. This library must be known at least to those analysis modules which produce proposals for production for that production module. If this library is thus respectively known to an associated pair comprising a production module and an analysis module, it is therefore possible to take account of the provided functionality for the production of the proposals.

In addition to the libraries, further commands are preferably provided which are known to all analysis modules and production modules. These commands can control the flow of an action block. By way of example, branch commands may be provided which execute different commands on the basis of the value of a condition and/or a data field. In addition, a jump command may be provided which, in a departure from the linear execution of the commands, executes a different command than the subsequent one.

2.9 Subsequent Editing of an Application Description which has been Produced

Even though the method is in essence finished after the production of an application description, the method or the application description generator can and should provide the planner with tools for subsequently editing the finished application description.

Preferably, the method is designed such that following the production of the application description the description of the user interface, particularly the descriptor of the form fields, the positioning of the form fields and/or the relative size of the form fields, can be edited.

The application description is, in principle, independent of a particular form of the presentation of states and form fields. However, there is a series of presentation-related information which is preferably encompassed by the application description and which can be edited manually by the planner. This preferably includes descriptors (labels) for the form fields,
relative positions of the form fields and distances between the form fields,
relative sizes of the form fields These data are then preferably stored in the relevant application blocks. These data can be stored particularly in the relevant form element blocks.

An implementation of the method and of the application description generator can furthermore provide the planner with the option of setting further parameters such as colors, fonts, etc. and of adding them to the application description.

The way in which the planner can perform the editing of the presentation-related information is a matter for the implementation of the method. In a simple variant, the editing can be effected in table form; in a more convenient variant, it can be effected by an interactive editor which allows editing using the mouse or "drag and drop".

Preferably, the method allows the access rights for users to be edited.

In multi-user environments, it is frequently necessary to restrict or allow the access by individual users or user groups to an application or parts of an application. Although this task can also be performed by a suitably defined analysis module, it makes sense to provide the planner, in the course of subsequently editing an application, with the option of regulating the access particularly to states and tasks. To this end, the planner can define a user or user groups which have rights (read, write, delete, create, etc.) for accessing individual blocks of the application, particularly states and tasks. This editing can be effected on the basis of implementation in a simple table form or may be integrated in an interactive editor which also allows the subsequent editing of presentation-related information.

2.10 Executability of the Application Description

The executability of the application description will be discussed below. As already described at the outset, different ways of executing the application descriptions can be considered. Although these are not part of this method, they should, however, be outlined at this juncture: in accordance with a first option for executing the application description, the application description can be converted into a computer program. The designer delivers the application description in the form of a blueprint for the computer program. Since a blueprint describes the complete program flow the program logic, a suitable translation program can create either a source program in any programming language or else a directly executable program from the blueprint. To this end, the libraries of the production modules in the relevant programming language need to be available as linkable libraries (e.g. as DLL files or Microsoft Windows).

Alternatively, the application description itself may already be available in a programming language or as machine-readable code.

Alternatively, the application description can be effected by a runtime environment or an interpreter. In this context, an interpreter in the narrower sense reads the blueprint and executes it step by step. An interpreter in the broader sense forms a runtime environment. The runtime environment reads in the application description, produces an object for each application block of the application description and then transfers the further execution of the application description to the objects produced. To this end, the interpreter or the runtime environment requires at least the following further modules:

a module for navigating between the state blocks of the application description;
a module for presenting the form elements of a state and for providing the user interfaces;
a module for calculating formulae and conditions;
a module for executing actions and tasks;
a module for providing the command libraries for all the production modules; and
at least one module for applying external data objects which are used or for executing the data source blocks.

In this case, the interpreter may be integrated in an application manager which may contain additional functions, for example management of the basic documents or for the purpose of task management. The method described here can be expanded or refined by various approaches:

By way of example, comments in the basic documents can be used generally by using a standard specification for formulating comments.

II.

An example implementation for the method and hence for the application description generator will be explained in more detail below with reference to FIGS. 6 to 30:

The example implementation is implemented as a computer program which has been written using Visual C#2008 from the Microsoft company and runs on a computer with Windows XP operating system.

1. An Example of the Method and an Application Description Generator, where an Application Description is Produced with the Example A simple order management is provided as an example of the way in which the method or the example implementation works. A conceivable application scenario would be a small trading company which purchases goods from one or more suppliers, assembles them into hampers and sells the hampers. The underlying work process then comprises three steps:

(1) A specialist picks up the purchase order from a customer and produces an order therefrom. An order confirmation for the customer is written and printed.
(2) For each item ordered by the customer (=hamper), the appropriate goods are ordered from the supplier.
(3) The purchase orders are written and printed.

Four basic documents are used (see FIGS. 6 to 9):

An "order.doc" basic document (cf. FIG. 6) in Word format, wherein, in the case of manual execution, the order data are entered into the "order.doc" basic document and this is sent as confirmation to the orderer.

A "purchase order.doc" basic document (cf. FIG. 7) in Word format, wherein the goods which need to be ordered from a supplier are entered into the "purchase order.doc" basic document and this is then sent as a purchase order.

A "parts list.xls" basic document (cf. FIG. 8) in the format as an Excel table, wherein the goods from which the sales item is assembled are entered into the "parts list.xls" basic document for each sales item.

A "customer.xls" basic document (cf. FIG. 9) in the Excel table format, wherein the customers of the company are entered into the Excel table.

Furthermore, there already needs to be a data source object in the form of a database table in which the address data for the suppliers are entered. The database table contains the following fields: a supplier number (type: number, key), a supplier (type: string), a street (type: string), a zip code (type: string) and a residence (type: string).

This database table notifies the application description generator or the method of the user/planner before the analysis is started.

2. The Strategy of the Method

The method described prescribes neither which analysis modules an implementation needs to comprise (apart from the minimum requirements) nor in what order the analysis modules are called by the coordination module. The flow of the analysis, the available analysis modules and the division of labor in the analysis modules are denoted as a strategy of the method.

The flow of the analysis in the example has the following appearance, in broad outline:
1. First of all, the basic documents are analyzed using the document analysis modules and a knowledge base is obtained therefrom. The example implementation supports, by way of example, Microsoft Word documents as an example of text documents and Microsoft Excel documents as an example of table folders.
2. Next, the data structure of the application to be generated is analyzed and constructed. To this end, firstly the data fields are analyzed in more detail for their data types and secondly appropriate data source objects are sought or produced afresh.
3. The functionality of the application is then analyzed and constructed. This includes closer analysis of formulae and conditions as well as the production of actions and tasks.
4. Finally, the flow logic is analyzed and constructed. To this end, relationships between knowledge elements, particularly between components, are analyzed and are translated into proposals for production to produce steps and the succession of steps.

The example implementation comprises the following analysis modules:
1. Document analysis modules:
   Document analysis module for the analysis of documents in MS Word format for the file name endings *.doc or *.docx
   Document analysis module for the analysis of documents in MS Excel format for the file name endings *.xls or *.xlsx
2. Analysis modules for the analysis of the data structure:
   Analysis modules for the analysis of data fields
   Analysis modules for the analysis of the relationship between components and existing data source objects
   Analysis modules for the analysis of components which have been identified as data source objects
3. Analysis modules for the analysis of the functionality:
   Analysis modules for the analysis of formulae
   Analysis modules for the analysis of conditions
   Analysis modules for the analysis of master data
4. Analysis modules for the analysis of the flow logic:
   Analysis modules for the analysis of components which have been identified as input components
   Analysis modules for the analysis of components which have been identified as output components
   Analysis modules for the analysis of connections between two components by a third component For the division of labor in the analysis modules, the example implementation follows the following principles:
the analysis of the purpose of a component is performed exclusively by document analysis modules. The example implementation distinguishes particular component classes which are important for the further analysis (see below) and which are identified by the document analysis modules and marked by properties.

A further aspect of the strategy is the issue of how suitable data source objects are found for data fields. The example implementation looks for data source objects as data sources exclusively at the level of the components, i.e. suitable data source objects are ascertained for entire components and are then attached to the data fields of the components. Alternatively, data source objects could also be ascertained at the level of the data fields. In that case, highly suitable data source objects would need to be filtered out by a separate mechanism, e.g. by forming into sections for the sets of data source fields which are associated with a data source object.

To promote better understanding, the example implementation is in this case described as a closed system, i.e. it works exclusively with known modules which are described in this case. In practice, the method can be configured such that it is capable of using an unknown set of modules, data types, properties, functions, etc. The method itself is open in this respect and it accordingly achieves its true strength through implementation as an open system.

3. Implementation of the Knowledge Elements

This section describes details of the implementation of the knowledge elements in the example implementation. The general approach of the method or application description generator firstly requires precise execution of details at points at which the method permits different methods of implementation. Secondly, a specific implementation of the method requires stipulation of finite sets of data types, properties, etc., where the method only stipulates principles, or describes objects, but does not perform specific enumerations.

3.1. Data Types of Data Fields

The example implementation supports a fixed set of data types for data fields:

| Descriptor | Description |
| --- | --- |
| String | Any character strings |
| Number | Any number (integer and decimal numbers) |
| Data | Date information |
| Boolean | Binary type: true/false |

The value range is restricted only by the available data types.

3.2. Implementation of Assumptions

The method is flexible as to how precisely assumptions are implemented. In the example implementation, there is an additional "assumption" class. When a knowledge element is intended to be deemed an assumption, an object in this class—an assumption—is produced and connected to the knowledge element. Basic relationships and conflicts are then defined between assumptions, rather than between knowledge elements. At some points in this description, it is simply written that an assumption is based on a knowledge element. This then means the assumption about this knowledge element!

As an alternative to this practice, the knowledge elements themselves could also have an "assumption" attribute which turns them into assumptions. The knowledge elements would then need to have the option of storing basic relationships and conflicts with other knowledge elements.

Assumptions must imperatively be provided with a plausibility which distinguishes them from facts. The plausibilities in the example implementation have thus nevertheless been allocated, if even not entirely, at least relatively arbitrarily and are intended to allow merely broad staggering of more or less plausible assumptions.

Knowledge elements which are actually deemed safe but for technical reasons have to be assessed (for finding knowledge partitions or) as assumptions are allocated assumptions with the plausibility 99.

3.3. Implementation of Formulae

Knowledge elements of formula type are defined in the example implementation as follows (cf. FIG. 10):
1. A formula either comprises precisely one function
2. Or:
   a. A formula comprises an operator and two operands.
   b. An operand may be a formula, a function, a data field or a constant value.

A function maps a set of input values onto an output value. A function is therefore defined by its name, synonyms which can be used in the documents, the data type of the output, the number of parameters thereof and the data types of the parameters. The application description generator provides a list containing all available functions to which all analysis modules add the functions which they support when the application description generator starts.

The table below shows the functions which are supported by the example implementation. Upper-case and lower-case letters are ignored for the names and synonyms.

Functions of the Example Implementation

| Name (and synonyms) | Description | Data type | Parameters (data types) |
|---|---|---|---|
| "Date" ("Current date", "Today") | Current date | Date | No parameters |
| "Year" | Delivers the Year for a date | Number | One parameter (Date) |
| "Month" | Delivers the month for a date | Number | One parameter (Date) |
| "Day" | Delivers the day for a date | Number | One parameter (Date) |
| "Root" | Calculates the square root of a number | Number | One parameter (Number) |
| "Part" ("part string") | Delivers the part of the character string which starts at the Start point and is Length characters long. | String | Three parameters: character string, Start and Length (String, Number, Number) |
| "Contains" | Delivers true if the character string contains the indicated Search string, otherwise false | Boolean | Two parameters: Character string, Search string (String, String) |

An operator can be regarded as a function having two parameters, wherein the parameters have the same data type as the output value. Each operator has an attachment priority (numerical value). The attachment priority controls which operators are evaluated or calculated first: operators having a relatively high priority are calculated before those having a relatively low priority. By way of example, multiplication has a higher attachment priority than addition and is calculated first without parentheses. Furthermore, each operator has a list containing data types for which it is defined. In a similar manner to the functions, the application description generator provides a list containing all available operators, to which all analysis modules add the operators which they support when the application description generator starts.

The table below shows the operators which are supported by the example implementation:

| Operator | Words | Arithmetic operator | Attachment priority | Data types (for operands and result) |
|---|---|---|---|---|
| Plus | "+", "plus", "add" | Addition | 1 | Number and Number = Number Date and Date = Date Date and Number = Date |
| Times | "*", "times" | Multiplication | 2 | Number and Number = Number |
| Minus | "−", "minus", "less" | Subtraction | 1 | Number and Number = Number Date and Date = Date Date and Number = Date |
| Divided by | "/", "divided by" | Division | 2 | Number and Number = Number |
| To the power of | "^", "to the power of" | Exponentiation | 3 | Number and Number = Number |
| Concatenated with | "&", "and" | Concatenation of character strings | 1 | String and String = String String and Date = String String and Number = String |

The recursive structure of a formula according to the above definition produces a tree structure which is calculated when an application is executed from bottom to top, that is to say from the leaves to the root. In relation to an individual formula object, the operands are thus always calculated first, then the operator is applied to the results and in this way the formula is calculated. The example implementation distinguishes two different methods for the use of formulae in an application:

As soon as a value changes in a data field which is an operand for a formula or an argument for a function which is operand for a formula, the formula is recalculated and the result stored in the data field with which the formula is associated. This method corresponds to the use of a formula in a spreadsheet, for example.

This formula is used precisely when a data record which encompasses the data field with which the formula is associated is produced afresh. In that case, the formula is calculated and the result is written to the data field. This method corresponds to the use of a formula in a database application, for example.

Which of the methods is used is dependent on how the data field with which the formula is associated is embedded in the application flow. However, finding this out is the task not of the module for generating formulae but of the analysis modules which analyze the flow logic.

3.4. Implementation of Conditions

In a similar way to formulae, knowledge elements of condition type are defined as follows in the example implementation:

1. A condition comprises a logic operator and one or two operands of Boolean data type.
2. An operand may be a condition, a function, a data field or a comparison.
3. A comparison comprises a comparison operator and two operands having the same data type.

The functions and data fields in 2. need to have the Boolean data type. Suitable operands in 3. are functions, data fields and constant values.

The tables below show the logic operators and comparison operators which are supported by the example implementation:

| Comparison operator | Description |
| --- | --- |
| "=", "equals" | Operands are the same |
| "<", "less than" | First operand is less than the second operand |
| "<=", "less than or equal to" | First operand is less than or equal to the second operand |
| ">", "greater than" | First operand is greater than the second operand |
| ">=", "greater than or equal to" | First operand is greater than or equal to the second operand |
| "< >", "not equal to" | Operands are not equal |

| Logic operator | Description |
| --- | --- |
| "and" | Two operands. Delivers true precisely when both operands have the value true. |
| "or" | Two operands. Delivers true precisely when one of the two operands has the value true. |
| "not" | One operand. Delivers true precisely when the operand has the value false. |

3.5. Implementation of Examples

So that examples of a plurality of data fields which are associated can also be analyzed together, each example has not only the value but also an index stored for it which, by way of example, represents a row number which can be used to find associated examples of different data fields.

3.6. Known Data Source Objects

The planner informs the application description generator of existing data source objects simply by indicating the name, the type and the data source fields together with data types. This operation takes place independently of the generation of an application in a management module. The application description generator produces the relevant knowledge elements for each data source object known to it and the associated fields and adds said knowledge elements at the beginning of every new analysis of the blank knowledge base of the coordination module.

The example implementation supports two types of data source objects:
database tables and
interfaces For each type, there is a respective analysis module which is able to recognize suitable components and to relate to them to a data source object.

The known data source objects which are found from the start in the knowledge base are subsequently called existing data source objects. Data source objects which are added in the course of analysis of the knowledge base are called new data source objects.

3.7. Implementation of Components

The implementation supports a series of classes of components which are defined by particular properties. The table below summarizes these component classes:

| Descriptor | Description | Characterizing properties |
| --- | --- | --- |
| List component | A component which represents a list containing an arbitrary number of rows. | "List" |
| Table component | Component in list form which contains a fixed number of rows. | "Table" |
| Form component | Arrangement of data fields in block form which can be regarded as a form. | "Form" |

It is naturally also possible to produce components with other properties which belong to none of the cited classes.

4. The Coordination Module

The coordination module in the example implementation has a simple interface which is used to guide the planner through the method in a plurality of steps:

1. Before the actual start of the analysis, the planner or user can select existing databases which the method can use.
2. The customary file dialog is used by the planner to select the basic documents.
3. When the planner has selected all the basic documents, he starts the analysis (by pushing a button).
4. Questions from the analysis and production modules are collected and presented in a list of questions or else are immediately displayed if required. The responses from the planner are forwarded to the relevant modules.
5. Following the production of the application description, the user has the option of testing and finally clearing each application description.

On the basis of the strategy described above, the analysis takes place in the following steps:

1. First of all, the basic documents are analyzed using the suitable document analysis modules. The coordination module recognizes from the ending of the document files which document analysis module it needs to call. In the example implementation, a document analysis module for MS Word documents ("docx" and "doc" endings) and a document analysis module for MS Excel documents ("xlsx" and "xls") are available.
2. When all the basic documents have been analyzed, the data structure is analyzed more closely:
   a. All orders for the analysis module for the analysis of data fields are processed.
   b. Next, the analysis module for the analysis of the relationship between components and existing data source objects is started.
   c. The analysis module for the analysis of components which have been identified as data source objects (database tables) is then started.
3. The analysis modules are then called, which analyze functionality:
   a. First of all, the orders for the analysis module for the analysis of formulae and for the module for the analysis of conditions are processed.
   b. The analysis module for the analysis of master data is then called.
4. Finally, the analysis modules for the analysis of the flow logic are called:
   a. The module for the analysis of components which have been identified as input components.
   b. The module for the analysis of components which have been identified as output components.
   c. The module for the analysis of connections between two components by a third component.

When the analysis is complete, the coordination module then produces the knowledge partitions (knowledge partitions can also be called knowledge partitions) which are obtained from the assumptions of the analysis. In this case, it produces an assumption graph, as described in the description of the method in section 2.7.

As a formula for calculating the absolute plausibility of an assumption, the example implementation uses the minimum formation, i.e. the absolute plausibility of an assumption is the same as the minimum of the absolute plausibilities of its prerequisites and its own relative plausibility. This formula meets the demands which the method places on such a formula.

The plausibility of a knowledge partition is likewise obtained as a minimum for the plausibilities of all assumptions associated with it. The coordination module of the example implementation implements only knowledge partitions whose plausibility is greater than 50. The setpoint plausibility is therefore 50 in this case. For each knowledge partition, the proposals for production, which are based on their assumptions, are implemented as follows:
1. First of all, the proposals of the document analysis modules for production are implemented. To this end, the production modules are required for producing Word documents and for implementing the generation of Excel documents.
2. Next, the module for implementing the data structure is started with all proposals for production which stem from step 2. of the analysis. The order in which the proposals are processed is decided by the production module.
3. Next, the module for implementing the flow logic is started with all proposals which stem from steps 3. and 4. of the analysis. The order in which the proposals are processed is decided by the production module.

As a result, the planner is provided with a set of application descriptions which he can now test and clear. These steps are no longer part of the method, however, and are therefore not described in more detail at this juncture.

5. Analysis Modules

Preliminary Remarks Regarding the Document Analysis Modules

Sections 5.1. and 5.2. below describe the analysis modules for the analysis of Word and Excel documents.

Dealing with Formulae

Formulae can occur both in Word documents and in Excel documents and are recognized and processed by the analysis modules. However, the analysis modules do not produce knowledge elements for the formulae directly, but rather produce orders to the module for formula analysis. An order comprises the formula as a character string, as is available in the document, and the data field to which the formula is intended to be attached.

The two modules identify formulae in two ways:
1. By appropriate Word or Excel elements. In Word, these are formulae in form fields; in Excel, they are formulae in cells.
2. Another text is identified as (possible) formula if it starts with "equals" or "=".

Dealing with Examples

In a similar manner to dealing with formulae, examples are also not analyzed directly. If one of the modules finds examples for a data field, an order to the module for the analysis of data fields is generated for the data field, said order comprising the data field and the examples. The order is executed by the function for analyzing data fields which is provided by the module.

5.1. Analysis Module for the Analysis of Documents in MS Word Format

The description of the method emphasizes that documents play both a role as a knowledge source and a role as templates for documents which are intended to be produced by the application. In the example implementation, Word documents are treated on the basis of both roles, in principle. For each Word document, a proposal for production is produced which contains the document and information that is required for the production of a data-filled instance of the document by the application.

The analysis module for Microsoft Word documents uses all three approaches which have been in the method regarding the document analysis modules item in the general part of the description. A document is accessed using the COM class library for MS Word documents. This provides access to the elements of a Word document which are described below.

Using these approaches, the analysis module successively performs a series of single analyses which are each concerned with an element type, an arrangement scheme or a comment class:
(1) First of all, the list of all form fields in the Word document is processed. From form fields, the module generates data fields. Each form field is analyzed in three steps:
   a. If the form field has a meaningful name, the module produces a data field with this name and assumes that this data field is a fact.
   b. If the form field does not have a name or has a standard name (e.g. "Text3" or "checkbox1"), the module itself tries to find a meaningful name. In the example implementation, this is done by looking for the first alphanumeric word which is before the form field. If there is such a word, a data field having the relevant name is produced and an assumption about this data field is formed. The plausibility of this assumption is 70 and is increased by 20 if there is a colon after the word and/or is reduced by 20 if the word starts with a lower-case letter. These values are set arbitrarily in the example implementation. In practice, it is possible to introduce parameters which can be set and/or altered by the planner.

c. If step a. or b. has produced a data field, the properties of the form field are used to ascertain and store further information relating to the data field. In the example implementation, these are: the data type and a possibly existing formula. Further information may be: format prompts, maximum length or a VBA macro which is executed for an event.

The module is provided with the data type by virtue of the TextInput.Type property of the form field according to the following table:

| Type of form field | Data type of the data field | Formula |
|---|---|---|
| wdRegularText (normal text) | String | No |
| wdDateText (date) | Date | No |
| wdCurrentDateText (current date) | Date | Yes |
| wdNumberText (number) | Number | No |
| wdCalculationText (calculation) | Number | Yes |

For the "Current date" type, an order to the formula analysis module is produced with the formula "=Date( )" and the data field from a. or b.

For the "calculation" type, an order to the formula analysis module is produced with the formula from the TextInput.Default property of the form field and the data field from a. or b.

(2) After the form fields, the list of all tables in the Word document is processed. From tables, the module generates components and data fields.

Suitable components are lists and tables (see above). A table is then analyzed in six steps:

a. First of all, comments relating to the table, if they exist, are checked for advice regarding the use of the table. In the example implementation, the key term "list" indicates that the table represents a list which can be supplemented by any number of rows. In this case, the columns in the table represent data fields, the names of which are obtained from the headings in the first row of the table. Any data appearing in the table are assessed as examples. A list component is produced.

The key terms "table", "horizontal table" or "vertical table", by contrast, indicate a constant content, i.e. further rows or columns cannot be added. The values in the table are then assessed not as examples but rather as data from the table. A table component is produced.

b. If it has not been possible to ascertain the type of component in step a., the structure of the table is examined. The following table provides information about the association between the table structure and the type of component in the example implementation:

| Structure of the table | Associated component |
|---|---|
| Each cell in the first row contains an alphanumeric word or, if this is not the case, the entire column is blank. No, one or a plurality of rows contain cells filled with values If one of the filled cells contains a text which is identified as a formula, the same text appears in all rows of the relevant column apart from the first row and completely blank rows. At least one row is blank. | List component |
| As previously, with There being no blank rows. At least one column containing a text which is identified as a formula, the same text appearing in all rows apart from the first. | List component |
| As previously, with There being no text which is identified as a formula. There being no column in which each row contains a value. | List component Table component |
| As previously, with There being at least one column in which each row contains a value. | List component Table component |
| Similar to the cited cases, with rows and columns in the descriptions being interchanged. This produces horizontal lists or tables. | Similar to cited cases | c. If it has been possible to ascertain at least one possible component type in step a. or step b., corresponding components are created. Components from step a. are created as facts, and components from step b. are created as assumptions with a plausibility of 90. If a plurality of components are created for a table, the assumptions are defined as conflicts. In this case, an affected component from a. is also created as an assumption, but with a plausibility of 99.

d. Next, for each column or row (in the case of horizontally oriented components), a data field is produced which contains the name from the first row (or column). If a list component is involved, the property (leader) is produced as an assumption with the plausibility 80 for the data field in the first column or row. If the component itself is an assumption, the data fields are also produced as assumptions with a plausibility of 99 which are based on the component. If the columns of a data field contain a text which is identified as a formula, the module produces an order to the formula analysis module with the text as formula text and with the data field which has been produced for this column.

e. If a list component has been produced and there are filled rows (apart from the first row, which contains the names), the values from these rows are stored as examples of this component and the associated data fields. For each data field, an order to the module for the analysis of data fields is produced.

f. If a table component has been produced, the values from the filled rows (apart from the first) are stored as data for this component and the associated data fields. For this purpose, a "data" property is produced for the component, the value of which is an object with the data.

(3) All paragraphs in the Word document are then processed. In this case, the module firstly looks for text whose structure allows a list to be inferred, and at the same time the module looks for what are known as embedded comments which the author of the document can use as an alternative to the Word comments in order to notify the application description generator of something. Each Word document contains a paragraph listing which contains one object per paragraph. The following conditions are just an example of how a list structure may appear and how it can be recognized by the module. Naturally, other variants are also conceivable, for example texts beneath one another in column form or form fields beneath one another can also be recognized as lists. A set of paragraphs is recognized as a list or list structure if it meets the following conditions:

1. The first paragraph contains one or more (alphanumeric) words (and no further character strings) which can be regarded as a title for the list.
2. The next few paragraphs are either blank or merely contain dashes which are formed using the character "_", specifically one such dash precisely beneath each word of the "title paragraph". In this case, it would also be possible to permit deviations, these being penalized by a deduction for the plausibility, for example, however.
3. Two successive blank paragraphs are assessed as an indication of the end of the list structure. If the 2nd condition is not met by a paragraph before two blank paragraphs are reached, the list structure is rejected. In this case too, a certain tolerance could be valid which is then offset by deductions for the plausibility.

In the example implementation, an embedded comment fundamentally starts with two curly brackets "{{" and ends with the opposing pair "}}". The text in between is assessed as a comment and evaluated accordingly.

Each paragraph is thus examined to determine whether it
  may be the start of a list structure if currently no list structure is presumed. If so, a list structure is subsequently presumed.
  meets the second condition if currently a list structure is presumed.
  meets the third condition and hence, if currently a list structure is presumed, concludes and therefore substantiates such a condition.
  contains a character string which is recognized as an embedded comment.

When a list structure is recognized, a list component is produced as an assumption with the plausibility 90. Correspondingly, for each word of the "title paragraph", a data field is produced as an assumption with the plausibility 99, based on the component. If there is a comment for a word and the content of said comment is identified as a formula, the module produces an order to the formula analysis module with the comment as formula text and with the data field produced.

For the data field at the first position from the left, a "leader" property is produced as an assumption with a plausibility of 80.

The example implementation recognizes three comments which are used to control the selection of different text blocks:
  the key terms "indicate when" or "condition" with or without a subsequent colon introduce a comment which links the text block following the comment to a condition. The entire text between the key term and the end of the comment is regarded as a condition and is processed by the condition analysis module. If the application produces an instance of the analyzed Word document, the text block is included in the instance at the precise time that the condition is met. The text block starts directly after the comment and ends with the embedded comment {{End of text block}}.
  In the absence of this comment, the text block comprises precisely the paragraph after the comment.
  The text block and the condition are added to the template information for the proposal for production to produce this document.
  The key terms "optional" or "alternative" introduce a comment which indicates that the subsequent text block is included in an instance of the document at the user's request. The rest of the comment is stored as a selection text. The text block is likewise defined as described in the previous items. The module produces a new data field of yes/no type. The selection text is added to the data field as text to be shown in an input mask. The text block and a condition which is met precisely when the new data field has the value "yes" are added to the template information for the implementation proposal to produce this document.
  The key term "option" introduces a comment which indicates that the subsequent text block is encompassed by a set of text blocks from which the user needs to select one. The key term is followed by a descriptor which is the same for all text blocks which are encompassed by this set. The rest of the comment is stored as a selection text for the text block for this comment. The text block is likewise defined as described in the first item.
  The module produces a new data field with the aforementioned descriptor as a name which is of option type. If this data field has already been produced by a previous comment, it is also valid for this comment. The selection text is added to the list of option values for the data field.
  The text block and a condition which is met precisely when the new data field has the value of the selection text are added to the template information for the proposal for production to produce this document.

(4) Next, all comments in the Word document are processed. If one of the (embedded) comments described in (3) is found, the procedure is the same as described therein. The text block for the comment is then defined by the area for which the comment was stipulated, however. This area is stipulated by the Scope of the Comment Object property.

(5) A component is then produced for the document, said component being provided with the name of the document (document without a file ending) and comprising all the data fields found to date. "Part-whole" relationships between the "document" component and each of the previously found components are then produced. If a component is an assumption, the relationship also has an assumption (with a plausibility of 99) produced for it which is based on the component. For list components, a "master-detail" relationship is additionally produced (possibly likewise as an assumption).

(6) Finally, a proposal for production is produced for a document template, said proposal containing not only a reference to the document and the component produced in (5) but also the collected template information.

Each component in a Word document, including that produced in (5) for the document itself, is allocated the property "input" as an assumption.

The component produced in (5) for the document itself is also provided with the property "output" as an assumption. The assumptions for the properties "input" and "output" of the component produced in (5) are flagged as conflicts.

Example of the Analysis of a Word Document

In the continuous example, two Word documents are used which are be used to show the way in which the module works:

"order.doc" Basic Document (cf. FIG. 6)

The analysis of the form fields (1) provides the following data fields:

| Serial No. | Data field | Data type | Source in the document |
|---|---|---|---|
| 1 | Customer | String | "Customer" form field |
| 2 | Street | String | "Street" form field |
| 3 | Zip code | String | "Zip code" form field |
| 4 | Residence | String | "Residence" form field |
| 5 | Order number | Number | Form field after "order number:" |
| 6 | Customer number | Number | Form field after "customer number:" |
| 7 | Date | Date | "Date" form field |
| 8 | Order date | Date | "Order date" form field |
| 9 | Delivery date | Date | Form field after "delivery date:" |

For the names of the data fields 1, 2, 3, 4, 7 and 8, the module can take the names of the form fields directly according to (1) a. The names of the data fields 5, 6 and 9 are ascertained in accordance with (1) b. For these three data fields, a respective assumption [assumptions 1-3] with a plausibility of 90 is produced. For the data field 7, an order [order 1] for the formula analysis module is produced according to (1) c.

The analysis of the tables (2) delivers a table whose structure is identified in (2) b. in line with the first row in the table for associating the table structure with the type of component. In accordance with (2) c., a component [component 1] having the property "list" is therefore produced. In addition, the component is provided with the property "input". Furthermore, an assumption [assumption 4] with a plausibility of 90 is produced for the component. In (2) d., the following data fields are also produced, which are allocated to the component 1:

| Serial No. | Data field | Data type | Source in the document |
|---|---|---|---|
| 10 | Item | | Table column with heading "Item" |
| 11 | Quantity | | Table column with heading "Quantity" |
| 12 | Price | | Table column with heading "Price" |
| 13 | Total | | Table column with heading "Total" |

For each data field, an assumption [assumptions 5-8] with a plausibility of 99 is produced in accordance with (2) d. These assumptions are based on assumption 4. The data field 10 is provided with the property "leader" as an assumption [assumption 9] having the plausibility 80. As a value for the property, a reference to component 1 is stored.

In the column for data field 13 ("Total"), there is a text which is identified as a formula, since it starts with "equals". Therefore, an order [order 2] to the formula analysis module is produced with the formula text "quantity times total" and data field 13.

The analysis of the paragraphs (3) and the comments (4) provides no further results.

In step (5), a component [component 2] with the name "order" is produced which is allocated the data fields 1-13. The component is provided with the properties "input" and "output" as conflicting assumptions 10 and 11. Furthermore, a "part-whole" relationship is produced between this component and component 1 (as part). In addition, a "master-detail" relationship is produced between the component "order" and component 1 (as a detail). For both relationships, a respective assumption [assumptions 12-13] with the plausibility of 99 is produced. Both assumptions are based on assumption 4.

Finally, in step (6), a proposal for production [proposal 1] is produced with the reference to the document and component 2.

"purchase order.doc" Basic Document (cf. FIG. 7)

The analysis of the form fields (1) provides the following data fields:

| Serial No. | Data field | Data type | Source in the document |
|---|---|---|---|
| 14 | Supplier | String | "Supplier" form field |
| 15 | Street | String | "Street" form field |
| 16 | Zip code | String | "Zip code" form field |
| 17 | Residence | String | "Residence" form field |
| 18 | Purchase order number | Number | "Purchase order number" form field |
| 19 | Supplier number | Number | "Supplier number" form field |
| 20 | Date | Date | "Date" form field |

The module can adopt the names of the form fields directly for the names of all the data fields in accordance with (1) a.

The analysis of the tables (2) provides no results.

The analysis of the paragraphs (3) finds a list structure which is introduced by the row with the words "Item" and "Quantity". Accordingly, a component [component 3] having the property "list" is produced. In addition, the component is provided with the property "input". Furthermore, an assumption [assumption 14] having a plausibility of 90 is produced for the component. The following data fields are then also produced, which are allocated to the component 3:

| Serial No. | Data field | Data type | Source in the document |
|---|---|---|---|
| 21 | Item | | Word "Item" in the "title paragraph" |
| 22 | Quantity | | Word "Quantity" in the "title paragraph" |

For both data fields, a respective assumption [assumptions 15-16] with the plausibility of 99 is produced. These assumptions are based on assumption 14. The data field 13 is provided with the property "leader" as an assumption [assumption 17] having the plausibility 80. As a value for the property, a reference to component 3 is stored. For the word "Quantity", there is a comment which is identified as a formula, since it starts with "equals". Therefore, an order [order 3] to the formula analysis module is produced with the formula text "order quantity times parts list quantity" and data field 22.

The analysis of the comments (4) provides no further results.

In step (5), a component [component 4] with the name "purchase order" is produced which is allocated the data fields 14-22. The component is provided with the properties "input" and "output" as conflicting assumptions 18 and 19. Furthermore, a "part-whole" relationship is produced between this component and component 3 (as a part). In addition, a "master-detail" relationship is produced between the component "order" and component 3 (as a detail). For both relationships, a respective assumption [assumptions 20 and 21] with a plausibility of 99 is produced. Both assumptions are based on assumption 14.

Finally, in step (6), a proposal for production [proposal 2] is produced with the reference to the document and component 4.

5.2. Analysis Module for the Analysis of Documents in MS-Excel Format

In contrast to Word documents, Excel documents are not automatically regarded as document templates.

The analysis module for Microsoft Excel documents uses all three approaches which have been described in the general part relating to the document analysis modules item. A document is accessed using the COM class library for accessing MS-Excel documents.

Using these approaches, the module successively performs a series of single analyses which are each concerned with an element type, an arrangement scheme or a comment class:

(1) First of all, the list of all the cited areas of the Excel document is processed. For each cited area which comprises precisely one cell, a data field having a corresponding name is produced. Cited areas which comprise a plurality of cells have no significance in the example implementation.

(2) Next, the list of worksheets is processed and each worksheet is analyzed:

(3) For each list object in a worksheet, a list component is produced. For each column heading for the list object, a data field is produced. If there is a comment for one of the columns, this comment is allocated to the data field as a property for later processing by the data field analysis module. If the list contains values, these values are allocated both to the component and to the relevant data fields as examples.

(4) For each worksheet which contains no list object, a check is first of all preformed to determine whether the entire worksheet can be regarded as a list. A list is defined by the following conditions:
  1. There is a matrix comprising a plurality of columns and at least one row which is situated at the left-hand and/or upper edge of the worksheet and/or whose adjacent rows and columns at the edge of the matrix comprise only blank cells.
  2. Within the matrix, each column is deemed either to be blank or to have an alphanumeric text in the first row which must start with a letter.
  3. Within the matrix, there are no two adjacent columns or rows which are both blank.

If the entire used area of a worksheet meets these conditions, a suitable component having the name of the document (without a file ending) is produced on the basis of the criteria from table 1. A data field is then produced in the following steps for each nonblank cell in the first row:
  a. If the cell or the cell beneath it has a comment whose content is identified as a formula, the module produces an order to the formula analysis module with the comment as formula text and with the data field produced.
  b. If the list contains values, these are allocated both to the component and to the relevant data fields as examples in the case of a list component. For each data field, an order to the module for the analysis of data fields is produced.

In the case of a table component or an association table, the values are allocated as data to the component and to the data fields. (See comment regarding (2) f. in the Word module).
  c. If this column contains a formula, this formula is allocated to the data field.

For the data field which is situated furthest to the left, the property "leader" is produced as an assumption with the plausibility of 80.

If the component has been identified as a list component, the property "list" and either a property "datasource" or a proposal for production is produced for a document template: if the worksheet contains one or more formulae, a proposal for production is produced for a document template, said proposal relating merely to the worksheet, however. In addition to the document, the component produced is stored. Furthermore, the component is provided with the property "output".

If the worksheet does not contain a formula, the component is provided with the property "datasource".

(5) If the worksheet is not recognized as a list, the worksheet is examined row by row (and, within a row, column by column) for list or form structures. A list structure has already been defined in the previous item. A form structure needs to meet the following conditions:
  1. There is a matrix comprising a plurality of columns and at least one row which is at the left-hand and/or top edge of the worksheet and/or whose adjacent rows and columns at the edge of the matrix comprise only blank cells.
  2. Within the matrix, there is alternately a column in which at least one cell contains an alphanumeric word and a blank (apart from formulae) column. The nonblank column may contain only alphanumeric words and colons after the last word in a cell.
  3. Within the matrix, there are no two adjacent columns or rows which are both blank.

It should be noted that in the example implementation, form structures cannot contain example data, since in that case the second condition would not be met. Naturally, other more powerful (but hence also more complex) conditions are also possible which comprise a relatively large number of form structures and hence allow more variants for the application description generator. Form structures which are "more exotic" can be assumed with a relatively low level of plausibility in comparison with "standard structures" such as those described above.

When a list structure is recognized, the procedure is as described in the previous item. However, the component is produced as an assumption with a plausibility of 90. Accordingly, the data fields are also produced as assumptions (plausibility 99), on the basis of the component. Furthermore, neither a "datasource" property nor a proposal for production is produced.

When a form structure is recognized, a component and an assumption relating to this component are produced first of all. The plausibility of the assumption in the example implementation is 60 and is increased by 10 if there are colons after the words according to 2. and by 20 if there is a formula in one of the cells in the blank columns. This markup can be justified in that the formula indicates that the structure is a calculation, which increases the probability of this structure actually having the presumed meaning. For every nonblank cell of the form structure, a data field is then produced which is likewise flagged as an assumption (plausibility 99) which is based on the component. For each data field, any existing comments (in the cell itself or in its right-hand neighbor) and/or formulae are treated in accordance with items (a) and (c) from the previous subparagraph.

Example of the Analysis of an Excel Document

In the continuous example, two Excel documents are used which can be used to show the way in which the module works:

"Parts list.xls" Document (cf. FIG. 8)

The document comprises a single worksheet.

The analysis of the cited areas (1) and the list objects (3) provides no results.

The analysis of the (single) worksheet (4) identifies the worksheet as a list component. Accordingly, a component [component 5] having the name "parts list" and the properties "list" and "datasource" (since no formulae exist in the worksheet) is produced. The analysis of the first row provides the following data fields which are allocated to the component 5:

| Serial No. | Data field | Data type | Source in the document |
|---|---|---|---|
| 23 | Item order | | Cell A1 |
| 24 | Item purchase order | | Cell B1 |
| 25 | Supplier | | Cell C1 |
| 26 | Quantity | | Cell D1 |

The names of the data fields are adopted directly from the cells in the first row. The data field 23 is provided with the property "leader" as an assumption [assumption 22] having the plausibility 80. As a value for the property, a reference to component 5 is stored.

In accordance with (4) b., a respective example is produced for each cell in the area A1 to D5. All examples are allocated to the component 5. In addition, each example is allocated to the data field whose column contains it. Finally, an order [orders 4-7] to the module for the analysis of data fields is produced per data field.

"Customer list.xls" Basic Document (cf. FIG. 10)

The document comprises a single worksheet.

The analysis of the cited areas (1) and the list objects (3) provides no results.

The analysis of the (single) worksheet (4) identifies the worksheet as a list component. Accordingly, a component [component 6] having the name "customer list" and the properties "list" and "datasource" (since no formulae exist in the worksheet) is produced. The analysis of the first row provides the following data fields which are allocated to the component 6:

| Serial No. | Data field | Data type | Source in the document |
|---|---|---|---|
| 27 | Customer number | | Cell A1 |
| 28 | Customer | | Cell B1 |
| 29 | Street | | Cell C1 |
| 30 | Zip code | | Cell D1 |
| 31 | Residence | | Cell E1 |

The names of the data fields are adopted directly from the cells in the first row. The data field 27 is provided with the property "leader" as an assumption [assumption 23] having the plausibility 80. As a value for the property, a reference to component 6 is stored.

5.3. Analysis Module for the Analysis of Data Fields

This analysis module provides a function which can be used to analyze information relating to a data field and to derive possible data types for the data field therefrom. Other analysis modules can use this function by means of a challenge or an order to the coordination module. However, the module also provides a function which performs this analysis for all data fields which exist in the knowledge base. The application of this function by the coordination module is standard in the example implementation.

In addition, the module provides a function which delivers an appropriate data field for a name. This function can be called only by other analysis modules and only as a challenge.

Function for Analyzing a Data Field

Possible data types for a data field can be derived in the example implementation in four possible ways:

By virtue of direct information in the basic document from which the data field has been derived. Recognizing and processing such information is the task of the document analysis modules.

By evaluating examples of values which the data field can have. The examples are extracted by the document analysis modules, whereas the examples are evaluated by this module. This ensures uniform treatment of examples, irrespective of the origin of a data field and of the examples.

By virtue of background information from the application description generator, which information is available to this module.

By virtue of influences from other modules (see module for the analysis of formulae).

Evaluation of the Examples

If there are examples for the data field, all the data types supported by the example implementation have a count performed for them to determine how many of the examples are compatible with this data type. For the decision regarding whether a data type is suitable for the data field, both the proportion of compatible examples and the total number of examples are significant:

If all examples are compatible, the data type is added to the data field as an assumption with the plausibility 99.

Otherwise, the procedure is dependent on the total number of examples:

Total number of examples <=5

The data type is unsuitable.

Total number of examples >5 and <=20

If precisely one example is not compatible, the data type is added to the data field as an assumption with the plausibility 70.

Total number of examples >20

If no more than 1% of the examples are not compatible, the data type is added to the data field as an assumption with the plausibility 90.

If no more than 3% of the examples are not compatible, the data type is added to the data field as an assumption with the plausibility 80.

If no more than 5% of the examples are not compatible, the data type is added to the data field as an assumption with the plausibility 70.

If a plurality of data types are suitable or there are already data types present, conflicts are produced between the data types. Data types which are already present and which are facts are converted into assumptions with the plausibility 99.

Special treatment is undergone by the Boolean data type:
If all examples are encompassed by one of the following sets, the Boolean data type is added as an assumption with the plausibility 99: {"yes", "no"} or {"true", "false"} or {"x", " "} or {"present", "not present"}
If all examples can be reduced to no more than two examples, which are not encompassed by the aforementioned sets and are neither numbers nor date details, by deleting multiple occurrences, the Boolean data type is added as an assumption with the plausibility 80.

In addition, the number of different examples is ascertained:
If there are more than 5 but no two identical examples, the property "key" is added to the data field as an assumption with the plausibility 90.
If there are more than 20 and only one example which occurs twice, the property "key" is added to the data field as an assumption with the plausibility 70.
If there are a total of at least 20 examples and at least 3 and no more than 15% different examples and all have the String data type, the property "option" is added to the data field as an assumption with the plausibility 80.

Evaluation of the Background Information

The example implementation has a database which stores information relating to possible data fields. This information comprises:
  a name or a list of synonymous names
  possible data types for data fields with one of these names
  possibly the properties "key" and/or "option" for data fields with one of the names The cited information is provided with plausibilities.

The module searches the database for suitable entries by comparing the name of the data field with the names in the database. If it finds a suitable entry, the data type(s) and properties are added to the data field as assumptions with the stored plausibilities. If the data field already has data types, the procedure is as described previously.

Example of the Analysis of a Data Field

In the "parts list.xls" document, there are examples of each data field. The module for the analysis of Excel documents has to this end produced the orders 4-7 which are executed by the function for analyzing a data field. The evaluation of the examples provides the following data types for the data fields in the document:

| Order | Number of the data field | Name of the data field | Data type |
|---|---|---|---|
| 4 | 23 | Item order | Number |
| 5 | 24 | Item purchase order | String |
| 6 | 25 | Supplier | String |
| 7 | 26 | Quantity | Number |

For each data type, an assumption [assumptions 24-27] with a plausibility of 99 is produced. Otherwise, the function provides no further results.

Function for Looking for a Data Field

This function is provided with a name and a desired data type as arguments and in this regard looks for an appropriate data field. The function assumes that the knowledge base has already been searched for data fields of the same name, and it therefore concentrates on heuristics with the aim of finding appropriate data fields with different names. The example implementation implements two approaches:

The first approach uses the background information for synonyms (see previous function). First of all, data fields having synonymous names and appropriate data types are sought. If there are no such data fields but instead there are data fields with synonymous names without data types, one of these data fields is delivered. At the same time, the desired data type is added to the data field as an assumption.

The second approach uses the circumstance that compiled names are gladly used in formulae for the purpose of better understandability. Thus, a formula which calculates a quantity of raw goods from an order quantity and a quantity of raw goods/finished goods will not necessarily be called "quantity=quantity times quantity", but more likely "quantity=order quantity times parts list quantity" or the like.

The function thus attempts to break down the name obtained into meaningful name parts, which, in the case of a name such as "order quantity", is simply done by breaking it down into the existing words. In the case of a name such as "order quantity", this is done by breaking it down using a dictionary or by comparing it with names of data fields and components, for example. The function then looks for data fields whose name corresponds to one of the name parts and which are simultaneously in a component whose name corresponds to another name part. Data fields with an appropriate data type are again preferred, otherwise the data type needs to be added as an assumption to the data field which is delivered.

If the function finds a plurality of appropriate data fields, the module uses a challenge to give the data fields found to the coordination module, which then has the planner select one of the data fields, which is finally delivered to the calling module by the function.

Example of the Search for a Data Field

In the continuous example, there is a data field with the name "Item order" (data field 23), for which an appropriate data field is sought in the later described module for the analysis of connections between two components by a third component. Synonyms for the name are not known to the application description generator. On the basis of the second approach, the name is broken down into "item" and "order", which finds the data field 10 ("Item") in component 2 ("order"). Since this data field does not yet have a data type, the number of the data field 23 data type, including an assumption, is added to it. Further appropriate data fields are not found, which means that data field 10 is delivered as the result.

Similarly, the data field 21 is found for data field 24 ("item purchase order"), for which data field 21 the string data type is adopted.

5.4. Analysis Module for the Analysis of the Relationship of Components with Existing Data Sources The module looks for correlations between the data fields of a component and the data source fields of already existing data sources. If the correlation is high enough, the module produces a relationship between the component and the data source as an assumption. Specifically, the module proceeds as follows:

For each component, it starts the following analysis:

(1) For each existing data source, a coefficient is calculated for the correlation, with the following formula being used (the formula used in this case is relatively simple. Naturally, it is also possible to use complex criteria, as are used in data mining, for example.):

$$a(C, D) = \frac{|C \cap D|}{|C \cup D|}$$

In this case, C is the set of data fields in the component and D is the set of fields in the data source. When determining the intersection, only those data fields or fields which have the same name and the same data type are recognized as being the same.

(2) If $\alpha(C, D) > \alpha_{min}$ is true, where $\alpha_{min}$ indicates the minimum correlation which a component and a data source need to have (as a default, $\alpha_{min} = 0.8$ is true, the value being able to be changed by the planner), the following relationships are produced:

a. A knowledge element in the relationship class is produced with the component and the data source. The type of the relationship is stipulated by "source". For the relationship, an assumption is produced which is provided with the plausibility $$p = \begin{cases} a(C, D) \cdot 100, & \text{if } a(C, D) < 1 \\ 99, & \text{if } a(C, D) = 1 \end{cases}$$

b. For each data field from the intersection between the component and the data source, a "source" relationship is produced with the data field and the corresponding data source field. The type and plausibility are identical to the type and plausibility of the relationship between the component and the data source. For each of these relationships, an assumption is produced which is based on the assumption from a. and is provided with the plausibility 99.

c. If one of the data source fields is defined as a key, a property "key" is added to the corresponding data field, for which property an assumption with the plausibility 99 is produced which is based on the assumption from a.

(3) If $\alpha(C, D) > \alpha_{min}$ is not true, a check is performed to determine whether there is a data source whose fields all occur in the component. The check is performed as in (1). If there is a data source for whose fields there is a respective data field of the same name having the same data type in the component, a new component is produced as an assumption with the plausibility 60. If the examined component itself is an assumption, the assumption for the new component is based on the latter. The new component is allocated all data fields which are suitable for the data source. Furthermore, the component "inherits" the property "input" if the examined component has it.

Next, relationships are produced in a similar manner to (2) a. and b., with the relationship between the component and the data source being based on the new assumption and being provided with the plausibility 99.

Finally, a "part/whole" relationship is produced between the examined component and the new component (as part) as an assumption with a plausibility of 99, on the basis of the assumption for the new component.

Example of the Analysis of the Relationship Between a Component and Existing Data Sources For no component is a correlation with the single existing data source (supplier) obtained in (1) which is large enough (customer list: 43%, purchase order: 56%, 80% is preferably required).

However, (3) results in all fields of the data source appearing in component 4 (purchase order). The appropriate data fields are the data fields 14-17 and 19, for which the name and data type match. Therefore, a new component [component 7] is produced which is allocated the data fields 14-17 and 19. For the new component, an assumption [assumption 28] with the plausibility of 60 is produced. Finally, the relationships and assumptions are produced in accordance with (3) [assumptions 29-34]. The new component is provided with the property "input".

5.5. Analysis Module for the Analysis of Components which have been Identified as Data Source Objects (Database Tables)

The module looks for components which could represent a database table. In the example implementation, the document analysis modules undertake the task of analyzing the presumed purpose of a component and accordingly producing meaningful properties. Therefore, the module looks for components with the property "datasource", that is to say components which are kept by a document analysis module for database tables or representatives of database tables. For each of these components, the module generates a new data source and a proposal for production:

(1) First of all, a new data source is produced with the name of the component. In addition, an assumption is produced which is based on the component and is provided with the plausibility 80.

(2) The new data source is an exact map of the component, i.e. a data source field is produced for each data field of the component and, for each data type of a data field, this data type is produced for the relevant data source field. For each of these knowledge elements, an assumption is produced which is based on the assumption from (1) and is provided with a plausibility of 99. Conflicts are defined for the assumptions relating to the data types.

(3) If the component has relationships with existing data sources, a conflict is produced between each of the relationships and the new data source (or between the assumptions).

(4) The proposal for production is provided with the new data source as a single piece of information. Further information is not necessary, since the production module is specialized for producing new data sources.

(5) Next, the method which was described in 5.4. for the analysis of relationships between components and data sources is performed for the new data source. The component on which the new data source is based is naturally not considered.

Example of the Analysis of Components which have been Identified as Data Sources Following the analysis of the documents, there are two components having the property "datasource": component 5 (parts list) and component 6 (customer list). For each of the two components, a new data source is produced in accordance with (1) [data sources 1 and 2, assumptions 35 and 44]. For the new data source 1, a respective field+data type is produced in accordance with (2) for each of the four data fields of the component 5 [assumptions 36-39 for the data source fields, assumptions 40-43 for the data types, all based on assumption 35]. For the new data source 2, a respective field is accordingly produced for the 5 data fields of the component 6 [assumptions 45-49]. No types are produced for these fields. Finally, a respective proposal for production is produced in step (4) [proposals 3 and 4].

In step (5), no appropriate component is found for component 5. For component 6, on the other hand, the component 2 is found in step (3) of the method in section 5.4. Therefore, a new component [component 8] is produced which is allocated the data fields 1-4 and 6. For the new component, an assumption [assumption 50] with plausibility 60 is produced. Finally, the relationships and assumptions are produced in accordance with 5.4. (3) [assumptions 51-56]. The new component is provided with the property "input".

5.6. Analysis Module for the Analysis of Formulae

This analysis module provides a function which is used to analyze a character string which contains a formula in Infix notation (operator is between its operands) and which is used to translate said character string into a formula knowledge element. Other analysis modules can use this function by means of a challenge to the coordination module. When the sections about the document analysis modules in the example implementation refer to a formula being produced or being allocated to a data field, this means that this function is called.

As parameters, the function is provided with the character string and the data field with which the formula is associated (subsequently called target data field). Optionally, a plausibility for the formula to be produced can be passed to the function. This makes sense when the calling document analysis module is not certain whether the text is actually a formula.

A formula comprises an operator and two operands. An operand may be a further formula, a function, a constant or a data field (cf. FIG. 10).

The task of this module is now firstly to put the linear text form in which formulae appear in documents into the described recursive structure and secondly to identify operators and operands and incorporate them into the formula. Furthermore, the module ensures that all data fields and functions which are involved in the function have an appropriate data type.

Only references to data fields and functions are stored in a formula. For data fields, these are references to the relevant knowledge elements in the knowledge base; for functions, there is the function library, which stores all functions with names, data types and expected parameters which are recognized by the analysis modules and are supported by the production modules.

If the character string begins with "=" or "equals", this word is removed. Before the actual analysis, a check is performed to determine whether the character string is a single function. If so, a formula is produced therefrom directly as a special case. Otherwise, the analysis takes place in the following steps:

(1) For the formula, an assumption is formed, the plausibility of which corresponds to the transferred value or, if no value has been transferred, is 99.

(2) First of all, the character string which contains the formula in text form is analyzed word by word or character by character and in this case the formula is constructed in the recursive form described above. The operands are first of all stored as character strings in this context. The design of the formula takes account of the attachment priorities of the operators, and also parentheses. If the module encounters an operator or a word which is at a position at which an operator is expected which does not appear in the operator list of the application description generator, a fault is triggered (FIG. 12 shows an algorithm which performs this step. The arguments transferred are either a character string or an operand, an operator and a character string).

A tree of formula objects is produced, the root element of which is allocated to the target data field as a value for a freshly produced "formula" property. If the target data field already has a "formula" property, a fault arises (see below).

(3) Next, all operands in the tree structure are analyzed in a recursive method and are replaced by constant values or appropriate references to functions or data fields. Character strings with the structure "Name ( . . . )" represent functions. When the module encounters a function which does not appear in the function list of the application description generator or an incorrect number of parameters, a fault is triggered. Other names initially represent data fields or, if there is no suitable data field present, are a constant. Numbers or date statements represent constants. Appropriate data fields are sought in the following order:

a. First of all, the component in which the formula was found is searched.

b. If the module is not found therein, the component which contains this component ("part/whole" relationship) and is itself not contained by any other component is searched—if such a component is present.

c. If the module is still not found, the entire knowledge base is searched and the first data field found is taken.

d. Finally, the module calls the function for searching for data fields which provides the module for the analysis of data fields (see section 5.3.).

All the functions and data fields used are listed in a list for the functions and a list for the data fields, respectively.

At the same time, the defined data types of each operator in a partial formula are compared with the data types of its two operands. If the data types are not compatible then, if the operand affected is a data field, the latter has the data type of the operator added to it as an assumption (and conflicts with existing data types, which are possibly converted into assumptions, are produced). The assumptions are provided with the plausibility 99 and are based on the assumption of the formula.

If data types are not compatible between operator and function or operator and constant or operator and partial formula (as an operand), a fault is triggered.

For every comparison, a set of suitable data types is formed per partial formula, so that the module has ascertained one or more data types for the entire formula at the end as a result of handling from bottom to top.

(4) In similar fashion to the procedure in (3) for data fields, the possible data types of the formula are added to the target data field as assumptions so long as they do not already exist.

Faults

When a fault is triggered, the analysis of the formula is terminated and the planner is informed by means of the coordination module that the originating document for the formula possibly contains an erroneous formula. Only if the data field already has a "formula" property and the new formula is correct does the module instead use the coordination module to ask the planner the question regarding which of the two formulae it is intended to use.

Example of the Analysis of a Formula

In the continuous example, the document analysis modules have produced three orders for analyzing formulae which are executed by this module:

(a) Order 1: analysis of the formula "Date( )" which is associated with the data field 7 (date in the document "order.doc"). This formula comprises a single function which is recognized by the module (cf. table with functions from the example implementation) and is produced directly as a special case. Data field 7 is thus provided with a new "formula" property having the formula as a value. For the formula, an assumption [assumption 57] is formed.

(b) Order 2: analysis of the formula "quantity times price" which is associated with the data field 13 ("total" in the "order.doc" document). Step 2 generates a formula which comprises a single partial formula. The operator is "times". The formula is allocated to data field 13 as a value for a new "formula" property. For the formula, an assumption [assumption 58] is formed.

In step (3) a., the data fields 11 and 12 are found for the two operands "quantity" and "price". The data type of the formula is set to number in step 3, since this is the only data type of the only operator. Accordingly, the data fields 11 and 12 each have the number data type added to them. For both data types, a respective assumption [assumptions 59 and 60] is formed which are based on assumption 58.

Finally, in step (4), the target data field (data field 13) likewise has the number data type, including an assumption [assumption 61], based on assumption 58, added to it (cf. FIG. 13).

(c) Order 3: analysis of the formula "order quantity times parts list quantity" which is associated with the data field 22 ("quantity" in the "purchase order.doc" document). Step 2 generates a formula which comprises a single partial formula. The operator is "times". The formula is allocated to data field 22 as a value for a new "formula" property. For the formula, an assumption [assumption 62] is formed.

In step (3) d., the data fields 11 and 26 are found for the two operands "order quantity" and "parts list quantity".

The data type of the formula is set to number in step 3, since this is the only data type of the only operator.

Finally, in step (4), the target data field (data field 22) likewise has the number data type, including an assumption [assumption 63], based on assumption 62, added to it (cf. FIG. 13).

FIG. 13 shows the results for the orders (b) and (c).

5.7. Analysis Module for the Analysis of Conditions

Conditions are constructed in a similar manner to formulae. In this respect, the function of this module can be derived largely from that of the previously described module for the analysis of functions, bearing in mind the additional restrictions as a result of the Boolean data type.

5.8. Analysis Module for the Analysis of Master Data

In the example implementation, the master data include both freshly created data sources and existing data sources which are related to components ("source" relationship). The application description generator must decide whether the application provides options for maintaining the master data and, if so, how the maintenance is incorporated into the application. This task is undertaken by this module, which to this end distinguishes between three variants, in principle:
1. The application provides no option for maintaining a particular data source object.
2. The application provides the option to maintain a particular data source object in each step.
3. The application provides the option to maintain a particular data source object only in steps in which the data source object is used.

For existing data source objects, all variants are available. For new data source objects, only variants 2. and 3. are available, since these data source objects would otherwise sometimes always remain blank. Which of the variants needs to be chosen is ascertained by the module by virtue of a question to the planner (via the coordination module) with the aforementioned selection options. If one of the variants 2. and 3. is selected, the module produces an appropriate proposal for production which comprises the respective data source and the chosen variant.

Example of the Analysis of Master Data

In the continuous example, a "source" relationship has been produced for the existing data source "suppliers" (see example for 5.4), and also two new data sources (see example for 5.5). For all three data sources, the module puts a question to the planner. By way of example, it is assumed in this case that the planner chooses variant 1. for the existing data source, variant 2. for data source 1 and variant 3. for data source 2. The module then produces proposals for production [proposals 5 and 6] with the chosen data sources/variants.

5.9. Analysis Module for the Analysis of Components which have been Identified as Input Components The module looks for components which could represent an input form. In the example implementation, the document analysis modules undertake the task of analyzing the presumed purpose of a component and accordingly producing meaningful properties. The module therefore looks for components having the property "input", that is to say components which are kept by a document analysis module for an input form or the representatives of an input form.

The module distinguishes between input components which are not part of another input component and those which are part of another input component. The latter are referred to as subcomponents in this case.

The aim of the module is to produce a proposal for production for a state application block which is used for data input. The module assumes that a new data source is being produced for the input data. However, existing data sources also need to be used in order to avoid double inputs. If the input of the customer orders is involved, for example, and there is already a customer file in existence, the address data for a customer need to be fetched from the customer file.

Specifically, the module has the following tasks:
it needs to generate suitable form elements for the input and position them in the form for the state {introduce and explain the form in the general part}. To this end, the module assumes a grid with two columns and an infinite number of rows in which the form elements are positioned. This knowledge partition allows play for the execution of the application in terms of size of the elements and intervals between the elements.

It needs to produce new data sources for the data which are to be input. In this case, it is necessary to distinguish, in particular, whether a single data source or a plurality of interlinked (master-detail) data sources need to be produced. In the example implementation, a data source for the entire component is produced in principle. An exception is formed only by subcomponents which have the properties "input" and "list", i.e. are input components in list form. The module interprets this to mean that any number of data records for the subcomponent are possible for each data record of the component (cf. FIG. 14).

It needs to decide which data fields of the component are considered in the data sources and which are not. In the example implementation, the module simply adopts all data fields.

It needs to decide which data fields of the component are fetched from already existing data sources. In the example implementation, the module to this end looks for subcomponents which are related to an existing data source and whose data sources have a key field which can be used to address the data records. If there is a plurality of such data sources for a subcomponent, a plurality of proposals for production is produced.

FIG. 15 shows an overview of what is part of the proposals for production which this module makes.

The module searches the property lists of all components. For each component which has the property "input", it starts the following analysis:

(1) If the component has a "part/whole" relationship with another component which contains the subordinate component and the other component also has the property "input" then the following steps are not(!) executed, since a subcomponent is involved which is handled in connection with the component of which it is part.

(2) If a subcomponent is not involved, the module produces a new data source with the name of the component and an associated assumption with the plausibility 99 which is based on the "input" property of the component. A "source" relationship is produced between the component and the new data source and is linked to an assumption (plausibility 99) which is based on the aforementioned assumption.

(3) If the component does not have a guidance field (a data field with the property "leader"), a guidance field is sought using a simple heuristic:
  i. the data field has the number data type and
  ii. the data field is not encompassed by any subcomponent which has a "source" relationship with an existing data source and
  iii. the data field is not encompassed by any subcomponent which has a "master/detail" relationship with the examined component.

If such a data field is found, it is provided with the property "leader" as an assumption having the plausibility 80.

(4) The module produces a proposal for production for the flow logic production module with the content of producing a state which contains the name of the component.

(5) Next, all the data fields of the component are checked to determine whether they are encompassed by a subcomponent having the property "input". If a data field is not encompassed by a subcomponent, the following happens:
  a. The module produces a piece of information relating to a form element for inputting a value for the data field and adds this information to the proposal for production from (4).
  b. The module produces a data source field for the data source from (2) for the data field and a data type for each data type of the data field. For each of these knowledge elements, an assumption is produced which is based on the assumption from (2) and is provided with a plausibility of 99. For the assumptions relating to the data types, conflicts are defined.
    Furthermore, the module produces a "source" relationship between each data field and the associated data source field. To this end, a respective assumption with a plausibility of 99 is produced which is based on the relevant assumptions from the data source field and from the data type.

(6) Next, all components for which the current component has a "part/whole" relationship as a superordinate component and which have the property "input" are handled as follows:
  a. If the subcomponent has the property "list", that is to say has been recognized as a list, the module assumes a master-detail relationship between the main component and this subcomponent. If no guidance field has been found in (3), the module terminates the analysis at this juncture and sends an appropriate piece of information for the planner to the coordination module. Otherwise, a new data source is produced as an assumption similar to (2) with the name of the subcomponent:
    i. For each data field of the subcomponent, a data source field for the new data source is produced.
    ii. An additional data source field is produced for the guidance field of the main component.
    iii. Data types, assumptions and relationships are produced in similar fashion to (5) b.
    Furthermore, the following information is added to the proposal for production from (4):
      A respective piece of information for producing a form element per data field of the subcomponent.
      A piece of information for producing a form element for holding the form elements from the previous item, which form element allows any number of rows to be input.
  b. If the subcomponent does not have the property "list", a check is performed to determine whether it has a "source" relationship with an existing data source. If this is the case, the module produces a piece of information relating to a form element for inputting a value for the data field which is connected to the key of the existing data source, and adds this information to the proposal for production from (4). The form element is provided with an action which is executed when a value has been input. This action looks for the data record matching the value in the existing data source and, if a data record is present, loads the value thereof into the data fields of the subcomponent. Furthermore, the module produces data source fields, data types and assumptions (including conflicts) for all data fields in the subcomponent in a similar manner to (5) b.
  c. If the subcomponent does not have the property "list", has no "source" relationship with an existing data source but has a "source" relationship with a new data source, the procedure is similar to b. However, the form field for the data field is produced, which corresponds to the guidance field of the component on which the new data source is based.
  d. If there is no "source" relationship, the procedure is similar to (5) for all data fields of the subcomponent.

(7) Next, the module produces proposals for production for the new data sources which have been produced in (2) and (6).

(8) Finally, the module asks the planner, via the coordination module, the question regarding how the input data need to be stored. There are three possible responses between which the planner can choose:
  1. "The data do not need to be stored."
    If the planner chooses this response, all knowledge elements and information relating to data sources which have been produced previously are removed again.
  2. "The user can capture and store data once."
    If the planner chooses this response, the proposal for production from (4) has a piece of information added to it which indicates that when the state is terminated the data from the data fields are stored in the data sources.
  3. "The user can input and store data as often as desired."
    If the planner chooses this response, the procedure is as for the second response. In addition, the proposal for production has a piece of information for producing a task added to it which stores the input data and then empties the data fields.
  The response is added to the proposal for production.

(9) In conclusion, the module checks whether the input component is a document for which a document template exists. If this is the case, the module uses the coordination module to ask whether a document needs to be produced for the input data. If the response is "yes", the module adds to the proposal for production a piece of information about a task which triggers the generation of a document with the currently indicated data record.

Example of the Analysis of an Input Component

In the continuous example, two components with the property "input" are produced which are themselves not parts of an input component: component 2 ("order" document) and component 4 ("purchase order"). The procedure of the module is described at this juncture by way of example for component 2:

First of all, step (2) involves the production of a new data source [data source 3] with the name "order" as an assumption [assumption 64] and a "source" relationship between component 2 and data source 3 as an assumption [assumption 65], on the basis of assumption 64.

Although the component contains a data field (10) which has the property "leader", it is with reference to component 1 (see example for 5.1.). For component 2, there is thus no guidance field, which means that step (3) is used: the data fields 5, 6, 10, 11, 12 and 13 have the number data type. Data field 6 is encompassed by component 8 ("source" relationship, see 5.5.), and data fields 10-13 are encompassed by component 1 ("master/detail" relationship, see 5.1.). Therefore, the only remaining candidate is data field 5, which is provided with the property "leader"—as an assumption [assumption 66] with the plausibility of 80—with a reference to component 2 as a value.

Next, step (4) involves the production of a proposal for production [proposal 7] for generating a step with the name "order", which is based on assumption 10.

In steps (5) and (6), all data fields are then analyzed and the following results are then produced:

Form elements for the data fields 5-13, and also a form field for holding the form fields for the data fields 10-13, which allows the input of any number of rows. The form field for data field 6 is provided with an action for loading the data from data source 2.

All form elements are added to the proposal for production which has been produced previously.

Data source fields, data types and relationships in accordance with (5) b. and (6) b. and c. for the data fields 1-9. For these, the appropriate assumptions [assumptions 66-92].

A new data source [data source 4] as an assumption [assumption 93] together with knowledge elements and assumptions [assumptions 94-108] in accordance with (6) a.

Step (7) involves the production of proposals for production [proposals 8 and 9] for the new data sources 3 and 4, which are likewise based on assumption 10. The question in step (8) is answered by way of example with the third response. The question in (9) is answered by way of example with "Yes". Both responses are added to proposal 5.

For component 4 ("purchase order"), the procedure is similar. The proposals for production 10-12 are produced which all are based on assumption 18 (cf. FIG. 22).

5.10. Analysis Module for the Analysis of Components which have been Identified as Output Components The module looks for components which could represent a form which is used to display (=output) data. In the example implementation, the document analysis modules perform the task of analyzing the presumed purpose of a component and accordingly producing meaningful properties. Therefore, the module looks for components with the property "output", that is to say components which are kept by a document analysis module for an output form or a representative of an output form.

First, a proposal for production is produced for a state with form elements for all data fields of the component. The procedure in this context is similar to that described previously for an input component. Similarly, new data sources are produced as described previously.

Next, the module needs to decide which data records are displayed and whether changes to the data are permitted. To this end, it uses the coordination module to ask two questions of the planner:

1. "Is the intention to display only data records which are input or produced within the work session (a work session is understood to mean the specific (single) execution of the application.)?"

The planner can respond only with "Yes" or "No". The response is added to the proposal for production as a piece of information.

2. "Is the user intended to be able to change the displayed data?"

The planner can respond only with "Yes" or "No". If the planner responds with "Yes", the proposal for production has a piece of information added to it about an action which triggers the storage as soon as a data record or the state is left.

Finally, the module checks whether the output component is a document for which a document template exists. If this is the case, the module uses the coordination module to ask whether a document needs to be produced for the displayed data. If the response is "Yes", the module adds to the proposal for production a piece of information about a task which triggers the generation of a document with the currently displayed data record.

Example of the Analysis of an Output Component

The continuous example involves the production of two components with the "output" property which are themselves not parts of an output component: component 2 ("order" document) and component 4 ("purchase order"). Since the analysis of the form elements takes place in a similar manner to the analysis of input components, reference is made to the example in 5.9. The questions in 1. will in this case be answered by way of example with "Yes" and "No", and the question regarding the document template will be answered "Yes".

Overall, the same data sources and assumptions as in the previous example are produced (naturally with new knowledge elements and numberings, which are disregarded in this instance for reasons of clarity).

In addition, the proposals for production 13-15 ("order"+data sources) and 16-18 ("purchase order"+data sources) are produced which are based on the assumptions 11 and 19 respectively.

5.11. Analysis Module for the Analysis of Relationships Between Two Components by a Third Component This module plays an important role in the analysis of the flow logic by connecting states to one another and producing functional relationships between data. The idea is that there are components (called connecting components) which can form a connection between other components. The connection consists in mapping data fields of one component onto data fields of another component, which is described by the data fields of the connecting component. When there is such a connection, data from one component can be used to produce data from the other component.

Components are sought which meet the following conditions:
1. The connecting component must have the property "list", that is to say must be a list and must not be part of another component.
2. The connecting component must have two data fields which meet the following conditions:
   a. For one of the data fields, there is a data field in another component which has the property "input", which data field has the same name and data type or is delivered as a result of the function for searching for data fields of the module for the analysis of data fields (see 5.3.). This component is called the source component. The data field in the source component has the property "leader".
   b. For the other data field, there is a data field in a further component which is identical neither to the connecting component nor to the component from a., which data field has the same name and data type or is delivered as the result of the function for searching for data fields of the module for the analysis of data fields (see 5.3.). This component is called the target component. The data field in this component likewise has the property "leader". The target component or a (superordinate) different component having the "part/whole" relationship with the target component must have either the "output" property or the "datasource" property.
   c. The components from a. and b. are not in the same basic document.
   d. There are no example pairs of the two data fields in the connecting component with the same values, i.e. there are no two rows in the list of the connecting component in which the values for the two data fields are identical.
   e. The component with the property "input" must not have a data field with a formula which has data fields from the other connected component as arguments.
3. There is no data field for which there are data fields in accordance with a. and b. in both components which are found in 2.

The condition in 2.e. is an example of an heuristic which can be used in order to find the best among the plurality of possible candidates for a connection. The idea behind this heuristic is that there is little sense if calculating data for the input involves the use of data which are actually intended to be output later. Naturally, it is also possible to use other heuristics in this case.

The module searches the set of all components for suitable configurations. To this end, first of all components with the property "list" are sought. For each component found, the module looks for pairs of data fields which meet the condition 2., that is to say for which there are particularly two components which are connected by the connecting component and the two data fields. For each combination of data fields and components found, the module produces a "connected" relationship between the three components, for which the following information is stored:
   the connecting component
   the connected components
   the connecting data fields The relationship is an assumption with the plausibility 90 which is based on the properties "list", "input" and "output" of the components involved.

On the basis of the freshly produced relationship, a proposal for production is finally produced which comprises the generation of an action for producing new data for the target component from data for the source component. The integration of the action into the application flow is left to the production module.

Example of the Analysis of Relationships

In the continuous example, there are two components which meet the first condition of the module: component 5 (parts list) and component 6 (customer list). However, only component 5 also meets the second and third conditions by virtue of the data fields 23 and 24. In the example relating to section 5.3., it is shown how the data fields 10 and hence component 1 are found as source component or data field 21 and hence component 3 are found as target component.

The relationship "connected" is now produced between the components 5, 1 and 3 with the connecting data fields 23/10 and 24/21. In this regard, an assumption [assumption 109] with the plausibility of 90 is produced which is based on the assumptions 10 and 19 (for the "list" property of component 5, there is no assumption, since it has been treated as a fact).

On the basis of the assumption 109, a proposal for production [proposal 19] is produced for the purpose of generating an action for data production.

First of all, component 3 as source component and component 1 as target component also meet the conditions 2.a.- 2.d. However, the data field 22 in component 3 has an associated formula, which means that condition 2.e. is not met.

5.12 Analysis Module for the Analysis of Comments

The analysis module for the analysis of comments analyzes texts which are recognized as comments, or considered to be such, by other modules. In this regard, it processes a text preferably word by word and looks for patterns which represent known comments. If the analysis module recognizes a pattern, the text is processed as a comment and, on the basis thereof, suitable knowledge elements are produced which are returned as a result to the challenging module which has recognized the comment and sent it to the analysis module for the analysis of comments.

When a document analysis module finds a comment in a document, it uses the coordination module to send an order to the analysis module for the analysis of comments and at the same time delivers the comment text. In the example implementation, suitable comments are either appropriate document elements (e.g. comment elements in Microsoft Office documents) or comments embedded in normal text which are identified by a particular text form (see analysis module for Word documents). Each document analysis module is itself able to decide whether to process a comment which is found itself or to assign an order to the analysis module for the analysis of comments. In principle, it is the task of the document analysis module to decide which components of a document are suitable as comments or how a comment may have been constructed in the document. If a document analysis module wishes to use the analysis module for the analysis of comments, it preferably needs to transfer the comment found—but imperatively in the form of a character string—to the analysis module for the analysis of comments. Alternatively, it would be conceivable to define a class of comment objects which are produced and transferred by the document analysis modules.

In the example implementation, the analysis module for the analysis of comments knows a set of text patterns among which one or more represent a particular comment class. Each comment class has an associated submodule which processes the text pattern further and produces appropriate knowledge elements.

The analysis of a comment or of the corresponding character string is performed in two steps. First of all, the comment is compared with all text patterns. If a matching text pattern is found, the module executes the associated submodule in the second step (cf. FIG. 32).

A text pattern comprises a series of constant or particular texts and variables. The variables are wildcards for text. Such a series represents a set of texts which can be mapped onto the text pattern by matching or comparing the constant texts and assigning suitable text parts to the variables. The assignment of matching parts of the analyzed comment to the variables of a text pattern forms the basis for the further analysis by the submodule which is encompassed by the text pattern.

The submodules for further analysis of a comment expect as an input the variable assignment which was produced from the comparison of the appropriate text pattern with the comment and also the knowledge elements from the analysis module which commissioned the order to analyze the comment. These knowledge elements more or less form the "environment" in which the further analysis takes place. Alternatively, the entire available knowledge base can naturally also be used as "environment".

Each submodule represents a comment class and, in accordance with the semantics of the comment class, delivers particular information which arises from the analyzed comment. Usually, this is freshly produced knowledge elements which are processed further by the module commissioning the order. On the basis of implementation, the analysis module for the analysis of comments can alternatively deliver other information; in that case, however, it is necessary to ensure that all modules commissioning an order are able to process this information.

Comments can be used to add quite different information to a document. To this end, the analysis module for the analysis of comments has an expandable set of comment classes, each of which implements a (type of) information.

The table below shows a few examples of comment classes with exemplary text patterns and comments:

| Described information | Text patterns (examples) | Comments (examples) |
|---|---|---|
| Data type of a data field | "Data type: Data type" | "Data type: number" "Data type: numerical" |
| Format of a data field | "Format: Format" | "Format: Day.month.year" |
| Validity rules for data fields | "[Value\|The value] [must\|shall] not be an operator value" | "The value must not be greater than 100" |
| Document intended to be sent by e-mail | "[Send to\|send e-mail to] recipient" "Send an e-mail to recipient" | "Send e-mail to accounting" "Send an e-mail to accounting" |
| Access rights to documents | "Editing by user" "Read rights for user" | "Editing by accounting" "Read rights for controlling" |

The text patterns are designed as follows: Variables are printed in italics. Alternative texts are resumed in square parentheses and separated by "|".

Special treating is undergone by formulae and conditions for a data field which are likewise able to be "concealed" in a comment. Since these are of recursive design, it must either be possible, in one implementation of the method, for the matching of the text patterns to be able to process recursively defined expressions (e.g. regular expressions) or else the recognition of formulae and conditions must be left to the appropriate analysis modules for formulae and conditions.

5.13 Analysis Module for the Analysis of Association Tables

Tables as are recognized by the analysis modules for Word and Excel, for example, which contain fixed values can be interpreted as association tables if there is a column in which the values are unique, i.e. no value occurs more than once. Such association tables can be treated as formulae which comprise precisely one function which is obtained from the association. The analysis of association tables is the task of a special analysis module for the analysis of association tables which is specialized for this purpose.

The analysis module for the analysis of association tables is called by the coordination module for all components which have the "table" property (in this regard see the sections about the analysis of tables in the analysis modules for Word and Excel). In the simple example implementation described here, the module continues to process only components which have precisely two data fields.

First of all, the module checks whether there are data fields with unique values, with data fields preferably being formed by the columns in the table. Uniqueness requires two conditions to be met:
1. There are values or examples for the data field.
2. No value appears in the value set or example set more than once.

If these conditions are met for a data field—namely an input data field—then the module produces a formula which is allocated to the other data field—namely the output data field. This formula comprises a single function which refers to the component and results in
1. The values from the component being stored for the later use in the finished application and
2. The appropriate value for the output data field being sought from this value set whenever the formula is calculated, said value being associated with the current value of the input data field.

In principle, this practice can also be applied to components having more than two data fields. The module then either looks for suitable data field pairs or combines a plurality of data fields as input data fields if they have unique value tuples (e.g. a combination of surname, first name and date of birth, which will presumably be unique in practice).

6. Production Modules

The example implementation manages with five production modules, one for implementing the data structure, one for implementing flow logic and functionality and one each for implementing the generation of Word and Excel documents.

FIG. 16 shows which production modules produce which blocks, so that at the end a complete application is obtained.

6.1. Production Module for Producing Document Template Blocks for Word Documents The module processes proposals for production from the analysis module for the analysis of documents in MS Word format and produces a document template block.

A document template block in the example implementation comprises a revised copy of the basic document and an action which fills this copy with data.

The production module creates a copy of the basic document and revises it as follows:
All examples are deleted.
Form fields and elements which have induced data fields are named after the associated data fields (if they do not already have the same name).
Comments are either deleted or, if the information is required for executing the application, are converted into embedded comments.

The action is constructed from Word-specific commands. The example implementation supports the following commands (the execution of which is not described in more detail here, since it is not a matter for the application description generator):

Produce new Word document from the document template.
Assign a form field to the value of a data field.
Remove text block on the basis of a data field or a condition.
Fill table or list structure with the content of a data source, a data field being able to be used for filtering.

From these commands, an action is compiled which fills data fields, tables and list structures with the appropriate data and also removes text blocks identified by comments such that only those which correspond to the values of the associated data fields or conditions remain in the document.

6.2. Production Module for Producing Document Template Blocks for Excel Documents The production module processes proposals for production from the analysis module for the analysis of documents in MS Excel format and produces document templates.

A document template block in the example implementation comprises a revised copy of the basic document and an action which fills this copy with data.

The production module creates a new Excel document with precisely one blank worksheet into which the first row of the basic document is copied. If the data fields are arranged vertically, the first column is copied. This suffices because the module for the analysis of documents in MS Excel format creates only proposals for production for entire worksheets which, in accordance with the definition of list structures in section 4.2, have the headings in the first row or column.

The action is constructed from Excel-specific commands. The example implementation supports the following commands (the execution of which is not described in more detail here, since it is not a matter for the application description generator):

Produce new Excel document from the document template.
Open data source.
Read data relating to a data field from the data source and write it to a cell which is associated with the data field.
Calculate formula and write result to the cell which is associated with the data field with which the formula is associated.
Add row counters and select next data record in the data source.
Close data source.

From these commands, an action is compiled which fills the worksheet with values from a data source.

6.3. Production Module for Producing the Data Structure

This module implements the complete data structure of the application, i.e. data fields and data sources.

First of all, for each data field which occurs in the knowledge partition as a fact or assumption, an appropriate data field block is produced. The data type of the data field is either unambiguously stipulated (since conflicts are precluded, of course) or not all stipulated in the knowledge partition at this time. In the latter case, the block is provided with the standard type String. Note: formulae and conditions which are associated with data fields are not yet implemented at this point.

Next, for each proposal for production for a new data source which is contained in the knowledge partition, a new data source block is produced. The block has information added to it regarding the appropriate data source fields which are contained in the knowledge partition, and advice of the need to be a new data source, which needs to be produced before the first execution of the application in a real database.

Finally, all components which are contained in the knowledge partition are checked for the "source" relationship with an existing data source. For all existing data sources found, a data source block is produced with the reference to the real database/database table (without field information). These blocks are provided with advice of the need to be existing data sources.

6.4. Production Module for Producing the Flow Logic

This module implements the states and all tasks, i.e. the flow and the functionality of the application.

Implementation of Input Components

First of all, proposals for producing the module for the analysis of components which have been identified as input components are processed, insofar as they are contained in the knowledge partition. For each proposal, the following blocks are produced:

A new state which is provided with the name of the input component.
Form fields corresponding to the information from the proposal, which information is allocated to the new state and linked to the relevant data field blocks.
Formulae and conditions which are linked to data fields which occur in the input component, and also actions which trigger the recalculation of formulae and conditions when the value of a data field which is an argument for a formula or condition is changed.
An action which fills the data field that is connected to the key of the data source of the component with a unique value when the data field is reinitialized. This is done at least when the new state is reached.
An action for storing the data which is executed when the state is left.
Possibly a task which likewise stores the data (but can be initiated by the user at any time without leaving the state) and then empties the data fields and form fields.
Possibly a task which executes the action for producing a document, which action is contained in the document template for the document from the proposal for production, which document template has been produced by one of the first two production modules.

The last two blocks are produced only if there is appropriate information in this regard in the proposal.

Implementation of Output Components

Proposals for production of the module for the analysis of components which have been identified as output components are then processed insofar as they are contained in the knowledge partition. For each proposal, the following blocks are produced:

A new state which is provided with the name of the output component.
Form fields corresponding to the information from the proposal, which information is allocated to the new state and linked to the relevant data field blocks.
Formulae and conditions which are linked to data fields which appear in the input component.
An action for loading the data which is executed upon entry into the state.
Tasks for navigation between data records if a plurality of data records is present.
Possibly an action for storing the data when the state or the data record is left when the user uses the tasks for navigation.
Possibly a task which executes the action for producing a document, which action is contained in the document template for the document from the proposal for production, which document template has been produced by one of the first two production modules.

The last two blocks are produced only if there is appropriate information in this regard in the proposal.

Implementation of Connections

Proposals for production of the module for the analysis of connections between two components by a third component are then processed insofar as they are present in the knowledge partition. The module first of all looks for appropriate states. In accordance with the logic which has been described in 4.12, there must be at least one appropriate state which has been produced from the input component which is part of the connection. This state has an action added to it which is executed upon leaving the state after storage and which takes the input data and produces new data records in accordance with the information in the proposal. The state is identified by means of the name, which is of course identical to the name of the component.

All data fields for which new data records are intended to be produced are determined for the action. These are the data fields of the target component and the data fields of a possibly existing "master" component of the target component. These data fields are subsequently called output data fields. The target component is the output component which is part of the connection or the component which has a "master/detail" relationship as a "detail" with an output component.

All output data fields which are associated with a key of the data source for one of the (output) components are allocated actions which fills the data field with a unique value when the data field is reinitialized. This is done in step 5. of the command indicated below for producing new data records for the output component(s).

If one of the output components contains data fields which are connected to the key of a data source in accordance with step (6) b. or c. of the analysis module for from input component (see 5.9), these data fields are each allocated an action for loading other data fields from the data sources, as described in step (6) b. These actions are executed in step 5. of the command indicated below.

If there is no state for the second connected component, an appropriate state is now produced. This may be the case only if the component has the "datasource" property and not the "output" property. In this case, a form field block is produced for the state in order to present the data in table form. Added to this are form field blocks for the data fields of the component and actions for loading and storing in similar fashion to an output component. Tasks for navigation are not necessary, since these are already contained implicitly in the table form. If an appropriate piece of information is contained in the proposal, another task for producing a document is produced from the document template (see above).

Finally, a transition from the state of the first component to the state of the second component is produced, as a result of which the steps are put into an order. This produces the flow of the application.

The action which produces the new data records comprises a single command which has the following parameters transferred to it:

The data source which is connected to the input component, and also a set of pairs of data fields and data source fields connected thereto.

If the input component has a "master/detail" relationship with a superordinate component, the data source which is connected to this component, and also the relevant pairs of data fields and data source fields.

If the master data source from the previous bullet point exists, the data field which is connected to the key in the data source for the input component, and that data source field in the master data source which is connected to this data field.

The data fields which are connected by means of the input component and the connecting component.

A set of pairs of data fields from the output component(s) and data source fields from the data source for the connecting component.

A set of data sources in which new data records are intended to be produced and the associated pairs of data fields and data source fields.

The command uses these data to execute the following operations or steps for each new data record in the input data source (cf. FIG. 18):

1. Load all values from the fields of the data record into the connected data fields.
2. If the master data source exists, load all values from the fields of the appropriate data record for the master data source (connection via the key data field) into the connected data fields.
3. Look for the appropriate data record in the connection data source and load the relevant data fields from the output component with the values of the appropriate fields from this data record.
4. Transfer the values from data fields of the input component into the associated data fields of the output components.
5. Execute actions for initializing the output data fields and actions of the output data fields for loading dependent data.
6. Calculate all formulae which are associated with data fields in the output component and transfer the results to the data fields.
7. Produce new data records for all output data sources and store the values from the associated data fields.
8. Mark the data record from the input data source as no longer new.

Implementation of the Master Data Management

Finally, proposals for production of the module for the analysis of master data are handled. Depending on the information, for each data object or data source, either all states have a task added to them for management of the data object or data sources, or only those steps that use data fields which come from components which have a "source" relationship with the data object have an appropriate task added to them.

The exact appearance of the management of master data is a matter for the execution of the application and is not described in more detail at this juncture. However, there should be at least options for appending, editing and deleting data records, possibly also for printing a master data list.

Completion of the Application Flow

Finally, a graph of the previously connected steps is produced. If this results in unconnected partial graphs, these are compiled to produce a whole, specifically such that states for input components are always inserted before a partial graph and steps with output components are always inserted after a partial graph. In this way, a flow is produced which may admittedly be arbitrary to some extent but at any rate does not conflict with the flow logic of the work process.

FIG. 17 shows an example of the completion of a flow.

7. Example of the Determination of the Knowledge Partitions and Production of an Application Description The production of a knowledge partition and implementation of the knowledge partition are now explained once again with reference to the example from section 1., which was also used to explain the analysis modules in more detail. Since the production modules are less complicated, a similarly detailed explanation is dispensed with at this juncture. It is important to see how a knowledge partition materializes, which proposals for production are provided and which application blocks are produced.

First of all, the coordination module performs items 1. to 4. of the analysis (see 3.). The individual analysis steps for the example are described in more detail in the relevant sections relating to the analysis modules. As a result of the analysis, there is not only the knowledge elements but also a set of assumptions and proposals for production. FIG. 20 shows all the assumptions produced with basic relationships and conflicts. FIG. 21 lists the proposals for production, including the assumptions on which they are based.

On the basis of the conflicts between the assumptions 10 and 18 and the assumptions 11 and 19, four assumption graphs can be produced (FIGS. 22 to 25).

Knowledge Partition 1 is Shown in FIG. 22:

This knowledge partition 1 contains assumptions 10 and 18 and hence the proposals for production 1-12. The result is an application which has two steps for data input in succession (cf. FIG. 26). Orders and purchase orders would be input independently of one another; the Word documents could be produced by means of tasks in the respective steps. This knowledge partition is less than optimum, which the purchase orders are not generated automatically, and it would presumably be rejected by the planner.

Knowledge Partition 2 is Shown in FIG. 23:

This knowledge partition 2 contains the assumptions 11 and 18 and hence the proposals for production 1-6 and 10-15. The result is an application which has a step for inputting the purchase order, which step has from a step for outputting the order (cf. FIG. 27). This knowledge partition is pointless and would fairly certainly be rejected by the planner.

Knowledge Partition 3 is Shown in FIG. 24:

This knowledge partition 3 contains the assumptions 10 and 19 and hence the proposals for production 1-9, 16-18 and 19. The result is an application which, in a first state, allows the input of orders from which, upon changing to the next state, purchase orders are generated which can be viewed and produced in the second state (cf. FIG. 28). The Word documents can be produced by means of tasks in the respective states. Furthermore, the application provides the option of editing the parts list and the customer list. This knowledge partition best meets the demand on the work process and would presumably be approved by the planner. This knowledge partition is subsequently described in somewhat more detail.

Knowledge Partition 4 is Shown in FIG. 25:

This knowledge partition contains the assumptions 11 and 19 and hence the proposals for production 1-6 and 13-18. The result is an application which comprises two successive steps for output (cf. FIG. 29). This knowledge partition is pointless and would fairly certainly be rejected by the planner.

Details Regarding Knowledge Partition 3

Proposals for Production 1 and 2:

Of particular interest in this context is the action which is intended to fill the Word document. The action is produced by the module 6.1. and is designed as follows for the "order.doc" document:

| No. | Command | Parameter |
|---|---|---|
| 1 | Produce document | Path of the document template |
| 2-10 | Value assignments to form fields | Respective name and value of the data fields 1-9 |
| 11 | Fill table with values from a data source | Data source 3 ("order") and value of data field 5 ("order number") as filters |

The action for the "purchase order.doc" document is of similar design.

Proposals for Production 3 and 4:

The two proposals are provided by the production module 6.3. Respective blocks for the data sources "parts list" and "purchase order" are produced. The actual setup of the data sources as database tables is a matter for the execution of the application, which is not subject matter for the method.

Proposals for Production 8, 9, 17, 18:

These proposals for implementing new data sources are likewise provided by the production module 6.3. Blocks for the data sources of the components "order" and "purchase order" are produced.

Proposals for Production 5 and 6:

The two proposals are provided by the production module 6.4. (see therein the item Implementation of the Master Data Management).

For the data source 1 ("parts list"), each step block has a task for managing the data source added to it.

For the data source 2 ("customer list"), only the steps which are based on the "order" component have a task for managing the data source added to them.

Proposal for Production 7:

This proposal is provided by the production module 6.4. (see therein the item Implementation of input components). The blocks described therein, particularly a step with the name "order", are produced. Besides the form elements and tasks/actions for storage, blocks for the formulae for the data fields 7 and 13 are also produced. Finally, a "generate order" task is also produced which is linked to the action for proposal 1.

Proposal for Production 16:

This proposal is likewise made by the production module 6.4. (see therein the item Implementation of output components). The blocks described therein, particularly a step with the name "purchase order", are produced. Besides the form elements and tasks/actions for loading the data, a "generate purchase order" task is also produced which is linked to the action from proposal 2. If it were permitted to edit the data, tasks/actions for storage and a block for the formula for data field 22 would also be produced.

Proposal for Production 19:

This proposal is likewise made by the production module 6.4. (see therein the item Implementation of connections). Not only an action for the key field 18 but also an action which contains precisely one command which implements the generation of data records is produced. The command is provided with the following parameters:

- The data sources for the proposals for production 8 and 9 and the relevant sets of pairs of data fields for the components 1 and 2 and the associated data source fields.
- The data fields 10 and 23 for connecting the input component and the connecting component.
- The data field pairs 21/24 and 14/25 comprising the output component and the connecting component.
- The data sources for the proposals for production 17 and 18, in which new data records are intended to be produced, and the relevant sets of pairs of data fields and data source fields.

The action is allocated to the leaving of the "order" state. The implementation of this command is again a task associated with the execution of the application description and hence not the subject matter of the method. In addition, the transition from the "order" state to "purchase order" is produced. In addition, the transition from the "order" step to "purchase order" is produced.

Note: the module 6.4. implements the proposals in the order 7, 16, 19, 5, 6.

8. Further Method Steps, Particularly Further Analysis Steps 8.1 Checklists

Basic documents can be recognized as a checklist. A checklist comprises a structured series of individual items which need to be processed in a work process. Each item is described by an explanatory text and, if necessary, by additional comments. Hyperlinks may connect the items to other basic documents and/or other documents.

When a document analysis module recognizes such a checklist, the coordination module is preferably used to direct a challenge preferably at a special analysis module for checklists, which is described below for a simple variant of checklists. In another refinement, it is conceivable that the document analysis module itself analyzes the checklist structure.

The analysis module for checklists requires as an input a list of items which each have a serial number, a text, a possibly blank set of comments and/or a possibly blank set of hyperlinks. This list is produced by the challenging analysis module and is appended to the challenge to the coordination module.

As an additional input, the analysis module for checklists can be provided with a plausibility. In this case, the coordination module produces an assumption with this plausibility and returns the plausibility to the challenging document analysis module, which is able to use the assumption to construct conflicts. For all knowledge elements produced subsequently, assumptions are then likewise produced which are based on the returned assumption.

FIG. 19 shows an example of a checklist as a basic document. In this case, the checklist has individual "items". The items are preferably identified by checkable checkboxes, but in another refinement may be marked by other characters, for example bullets or, in particular, serial numbering. This basic document contains the following hyperlinks: customer data.xls, supplier data.xls, parts list.xls. That is to say that these hyperlinks refer to other basic documents, for example the hyperlinks could refer to the basic documents shown in FIGS. 6 to 9.

The analysis module for checklists processes the items in the order preferably of their numbering. The module combines the items into sets which each form a component which represents a state. In this case, the following applies: if the successor to an item (as per the numbering) is not encompassed by the same set as the item itself, no other succeeding item, which has a higher number than this item, can be encompassed by the set which encompasses this item.

The items are combined into components preferably on the basis of the following rules:

An item which has a nonblank set of hyperlinks, at least one of which refers to an input component, is regarded as a wildcard for components or states which are defined outside of the checklist.

The first item in the order which the previously described rule does not fit marks the start of a new component (which also encompasses the items in front).

An item with the comment "new" (or a comparable comment) marks the start of a new component.

Every item which none of the preceding rules fits is added to the current component.

Each component is preferably identified as an input component. For each component, a proposal for production is preferably produced for a state. Furthermore, for two respective components whose sets of items contain directly successive items, a proposal for a transition (in the associated states) is produced. For each hyperlink, a proposal for a transition from the state which is intended to be produced for the current component to a state which is possibly produced for the component which is being addressed by the hyperlink is generated, and also preferably a proposal for the inverse transition.

Data fields are derived from the text of an item. In this case, a distinction is drawn between two cases:

The text contains a list in the form of multiple terms separated by a comma or semicolon, for example 1-2 words. Each term is interpreted as a data field of Boolean type. The relevant proposal for producing a state has a form field added to it for each data field.

If the text does not contain a list, a single data field of Boolean type is produced, the procedure for which is as described previously.

From all the data fields of a component, a condition is constructed which is met precisely when all the data fields have the value "true". The proposal for production for the component is expanded such that the state can be left only when this condition is met.

Hyperlinks which refer to output or master data components are interpreted as tasks which are added to the proposal for production of the component which encompasses the hyperlinks.

The processing of checklists can be refined by supporting items which themselves comprise a list of items and/or by taking account of conditions which need to be met before an item is enabled.

Further analysis steps for word processing basic documents, particularly in MS Word format:

Basic documents, particularly in MS Word format, which merely comprise or have one of the checklist structures described below are interpreted as checklists:

i. The basic document comprises paragraphs, the start of which has a respective checkbox. Furthermore, these paragraphs may contain text, hyperlinks and comments. In addition, there may be paragraphs which comprise only text or are filled with lines comprising the characters "-" or "_".

ii. The basic document comprises a single list, the individual items in which comprise text, hyperlinks and comments.

If one of the two structures is recognized, the associated analysis module (cf. by way of example 5.1 Analysis module for the analysis of documents in MS Word format) produces a challenge to an analysis module for the analysis of checklists. The challenge preferably has a list appended to it which contains items (cf. 8.1, Checklists) which are preferably ascertained as follows:

For i.: If a paragraph in the basic document has a checkbox, an item is produced, the item also being provided with the text, including hyperlinks, and the comments. The checkbox is preferably not provided or appended. If the paragraph with the checkbox has only one line, an item with the comment "new" is produced.

For ii.: For each list item, an item with text, hyperlinks and/or comments is appended.

8.2 Treatment of Hyperlinks Found

During the analysis of the basic documents, for example in Word format, hyperlinks are preferably recognized and analyzed. Hyperlinks, which refer to web pages or other documents, for example basic documents, are interpreted as tasks. For each hyperlink, a further proposal for production is preferably produced. For each component which contains the hyperlink, a further proposal for production is preferably likewise produced. These further proposals for production add a task to the state which was produced for the component:

If the hyperlink refers to a web page, the task opens a browser and loads the web page.

If the hyperlink refers to a basic document which represents master data, a task for master data management is produced.

If the hyperlink refers to a basic document for which a document template exists or has been produced, a task for producing an instance of the basic document is produced.

If the hyperlink refers to another basic document, no task is produced.

If the hyperlink refers to a document which is not a basic document, a task for opening the document is produced.

These correspondingly produced proposals for production are converted by the associated production modules only if a state is also produced for the component.

8.3 Powerpoint

Preferably, an analysis module for presentation files, particularly an analysis module for charts, is provided.

Presentation files, for example Powerpoint files, can be used as basic documents. A Powerpoint presentation is considered in the example implementation to be a template which is filled with data when the generated application description is executed. A presentation file, particularly a Powerpoint presentation file, may contain text fields and charts.

The text below serves to explain text fields:

Data fields are preferably spotted in text fields in two ways:

By the wildcards "_" and "X" or character strings formed therefrom. The name of such a data field is derived in the same way as described in (1)b. for Word documents.

By stringing together a word with an upper-case initial letter, the character ":" and a number or a date statement. The word forms the name of the data field, and the data type is obtained from the number or the date statement.

In order to explain charts, reference can be made to FIGS. 30 and 31:

In this case, exemplary consideration is given to two chart types, namely a bar chart (cf. FIG. 30) and a line chart (cf. FIG. 31). The steps below can also be transferred to other chart types, however—such as pie charts.

In order to construct such charts, two pieces of information are required:

the data fields from which the presented data stem, and the value range for the data field on the X axis, i.e. the values in this data field which are intended to be presented in the chart.

The data in a chart stem from a tuple of data fields, particularly from a pair of data fields, each data field being associated with one axis of the chart. The tuple may be a pair, in particular.

The data in a chart in this case stem from a pair of data fields, one of the data fields representing the X axis and one of the data fields representing the Y axis. Each value of the X-axis data field which is presented in the chart must have an associated value in the Y-axis data field. Therefore, the two data fields must stem from a common data source. The analysis module for the analysis of charts or the analysis module for the analysis of presentation files therefore preferably produces data fields and a component which encompasses both data fields. This component is flagged as an output component. The names of the data fields are preferably derived from the labels in the charts, as are preferably the data types (cf. FIG. 30, 31). In the examples presented in FIGS. 30 and 31, a "Month" data field with the data type "Date" and a "Turnover" data field with the data type "Number" are respectively recognized.

The analysis module for presentation files, particularly for Powerpoint basic documents, first of all analyzes relevant objects from the presentation and produces knowledge elements therefrom. In addition, an implementation proposal for a document template and an action for creating instances of this template are produced.

8.4 Text Files

Text files are read in as a character string. Since a text file contains no usable objects apart from characters or words, the analysis must be limited to particular structures and embedded comments, as have already been described in the analysis module for Word documents. The embedded comments and list structures shown there can be adopted exactly for text files. As simple data fields, it is possible to interpret wildcards, for example, which are compiled from the character "_". The name of such a data field is derived in the same way as described in (1) b. for Word documents. In addition, embedded comments which comprise only one word can be interpreted as data fields, e.g. "{{date}}".

8.5 HTML Files

HTML files are read in as a character string. Knowledge elements can be derived from all HTML commands, in principle. Examples are:

Tables are handled in the same way as tables in Word.

Text fields, checkboxes, radio buttons and selection lists are handled in the same way as form fields in Word.

Hyperlinks are handled in the same way as in Word.

9. The Application Manager 9.1 Tasks and Architecture

As already mentioned, the application description can be executed in different ways. The text below describes in more detail the execution by an interpreter, which in this case is called an application manager. Reference can be made to FIGS. 33 to 37.

The task of the application manager is to incorporate applications which have been produced by the application designer in the form of application descriptions into an existing IT system environment and to execute them. The application description delivered by the application designer is preferably system-independent. The implementation of a respective application manager for different systems allows the same application description to be executed on different systems without any change. In addition to the execution of the application description, the application manager in this case undertakes the role of the interface between the application and the system environment. In particular, the application manager caters for the data interchange between the application and the environment by accessing databases, services and other data sources from the system. To this end, each implementation of the application manager preferably has at least some of the following service features, particularly all of the following service features:

Selection of an application description produced by the application designer, reading-in of this application description and execution of the application described thereby.

Connection to the data sources present in the system environment, selection of appropriate data sources for an application, and access management at runtime for an application.

Implementation of the commands which the application designer can use for setting up actions (see description of the method or of the designer, application blocks).

Subsequently, the method implemented as a computer program is called a designer. In the example implementation of the method or designer, the result is preferably written to tables in a database. These tables contain all blocks which completely describe the flow, data and functions of the application. Alternatively, the application description can also be effected in other forms, e.g. in a text file or an XML file. The implementation of the application manager merely needs to provide a method for reading in the application description for the relevant format.

Each implementation of the application manager has an interface for managing available data sources and for managing and starting available applications. The execution of an application is undertaken by an interpretation module (cf. FIG. 33). The interpretation module must either implement all the commands which can potentially be used by the designer or must have access to separate modules which implement these commands. In addition, there may be further modules which implement additional functionalities (see 9.4 Possible supplementary functions of the application manager). The purpose of such supplementary modules is the further integration of applications produced into the system environment for communication and data management. Examples are user management, document management or the communication between users. Each supplementary module must have an interface to the interpretation module via which an application can use its functions at runtime. FIG. 33 shows the general architecture of an application manager, and also the special architecture of an example implementation to which reference is made in this description.

The example implementation is based on ".net" technology. ".net" technology is a software platform developed by Microsoft and comprises a runtime environment, a collection of class libraries—what are known as APIs—which is intended for programmers, and connected service programs.

All modules are implemented as classes. In particular, there is a class for the interpretation module, which class produces an instance for each application description which is executed, when it starts, which instance reads the application description and provides the application.

The application description, which is generated by the application designer, comprises a set of application blocks which define data, functions and flow for the application. These application blocks are converted, when the application description is read, into a specific structure which is dependent on the implementation of the application manager and which is used as a basis for the execution of the described application.

9.2 Implementation of the Application Blocks

The description of the application blocks of an application has essentially already been provided in the description of the method, i.e. of the application designer. The significance and behavior of these application blocks in relation to the application manager are described in more detail below.

Data Field

Definition: a data field represents a wildcard which can assume different values of the same type during the flow of the work process.

Data fields are related to formulae, conditions, actions, form fields and data sources. Data fields are used for storing data during the execution of an application.

In the example implementation of the application manager, a list of the dependent formulae and conditions is created for each data field. A formula or condition is dependent on a data field when the latter is an operand in the formula or condition. Furthermore, for each data field, there is a list containing form fields which, on the basis of the current step, is filled with all form fields which are associated with the data field and currently visible.

Formula

Definition: a formula is a computation code which is used to calculate a result from a set of inputs (data fields and constant values) using operators. The result of the calculation is stored in a data field; in this respect, a formula is always attached to a data field.

The result of a formula is dependent on the data fields which appear as operands in the formula. If the value of a data field on which the formula is dependent is changed, the formula is recalculated.

Each formula is associated with a data field, the value of which is assigned the result following the calculation of the formula. If there are further formulae dependent on this data field, these are also recalculated. In this way, a series of recalculations for formulae is produced. In the example implementation, the formulae are processed on the basis of the principle of a breadth first search. Alternatively, it is also possible to apply an algorithm which optimizes the order of the calculations by analyzing the relationships such that as few double calculations as possible are performed. In the example implementation, it is furthermore assumed that the concatenation of the formulae does not result in any circular references. Alternatively, possible circular references which occur could be handled by allowing for a termination condition for the recalculation.

Condition

Definition: a condition is a formula which maps a set of inputs onto one of the two values true or false using comparison operators and logic operators. Unlike formulae, conditions can be attached to data fields but also to components.

The result of a condition (true/false) is dependent on the data fields which occur as operands for the condition. If the value of a data field is changed, the condition is reevaluated. In the example implementation, an action is executed on the basis of the result of the condition. A condition may have an associated action for the result true and an associated action for the result false.

Data Sources

Definition: A data source is an object which exists permanently outside of the application and from which the application can fetch data and/or to which the application can deliver data.

As part of the application description, the application designer produces guidelines for the data sources which the application description uses. These guidelines comprise, in the example implementation, the descriptor of the data source and the descriptors and data types of the fields which are used from this data source. It is the task of the application manager to find suitable real data sources for these guidelines and to ensure that these are used when the application description is executed. To this end, the manager is aware of a set of real data sources. In the example implementation, these are stored in a database, with the type, the descriptor, information relating to the technical access to the data source and a list of the available fields with the descriptors and data types being stored for each data source. The types supported in the example implementation are databases or database tables and services. A service is a program which can be called using a known interface and accepts and/or returns data. The following table describes the information which is stored for a data source in the example implementation:

| Type | Access information | Field information |
|---|---|---|
| Database table | Connecting character string for the database in which the table is stored, and name of the table | Names and data types of the fields in this table |
| Service | Name of the server on which the service is executed, and name of the service | Names and data types of the parameters of the service, and also data type of the return value |

When an application description is installed or started for the first time, the manager attempts to allocate to all data sources for the application description a real data source which matches the guidelines from the application designer. This is done by comparing the descriptor and the fields of the real data sources with the guidelines from the application designer. If no data sources or a plurality of data sources match, the application manager asks which data source needs to be used. Similarly, the user is provided with the option of creating a new database table as data source.

Action

Definition: an action comprises a series of commands which are executed in succession, with jumps being possible on the basis of the execution.

Actions are executed by the application manager when associated conditions are met or the user triggers this (see tasks). In addition, it is also possible for actions to be executed when particular events are triggered, e.g. the activation of a step or the reading of the value of a data field.

In the example implementation, an action is executed by virtue of sequential execution of the commands which the action comprises. For each possible command which the application designer knows, the application manager should provide a class which implements this command. In the example implementation, this class has an "Execute" method which is called for the purpose of executing the command.

The table below describes some commands from the example implementation by way of example:

| Command | Description |
|---|---|
| SetDataField | Writes a constant value or the result of a formula to a data field. |
| ResetDataField | Prompts recalculation of the formula which is associated with a data field and writes the result to this data field. |
| FindRow | Reads a data record from a data source and writes the values to one or more data fields. |
| LoadDataFields | Reads the value of one or more data fields from the data source which is associated with these data fields. |
| SaveDataFields | Writes the value of one or more data fields to the data source which is associated with these data fields. |
| StartAdministration | Opens a window for managing master data which are stored in a database. |
| GetNewKey | Produces a new value for the key field of a data record. |
| GotoStep | Prompts the manager to make the indicated step to the current step. |
| ShowMessage | Displays a message on the screen. |
| EnableDataFieldControl/ DisableDataFieldControl | Allows or prevents the input of a value into the screen element which is associated with the data field. |
| ShowDataFieldControl/ | Makes the screen element which is associated with the data field visible or invisible. |

| Command | Description |
|---|---|
| HideDataFieldControl | |
| WordCreateDocument | Produces a new MS Word document. |
| WordSetFormFields | Fills form fields in a Word document with values from data fields. |
| WordFillTable | Fills a table in a Word document with values from data fields. |

States

The state blocks map the step-by-step flow of the application description (cf. FIG. 35). When one of the state blocks is executed, a state is produced. From the point of view of the application manager, such a step is regarded as a state in which an application may be and which can be described by a screen mask with input options and by a set of executable activities for the user, and also possible transitions to other states. At any time in the application execution, precisely one state is active. The states can also be called steps.

The screen mask is described by form elements (cf. FIG. 36). Each form element is associated with a data field. When the state is active, each form element is allocated a screen element; in the example implementation, this is a Windows Forms Control. The application manager uses these screen elements to construct the mask for the active step. Form elements associate the screen elements with precisely one data field in each case. A screen element always displays the value of the associated data field. If the value of a data field is changed by a formula or an action, the new value is immediately displayed by the screen element. If, conversely, the value of a screen element is changed by the user, the new value is written to the data field and all formulae and conditions which are dependent on this data field are recalculated and evaluated.

The executable activities of the user comprise not only inputs into the screen mask but also tasks. A task denotes actions which are characterized particularly by the fact that their execution can be started directly by the user. These tasks are shown on the screen and can be selected and started by the user. In the example implementation, the tasks are shown as a list at the edge of the screen, each task being able to be executed by the click of a mouse. Alternatively, tasks can also be made available in a menu, by buttons or in any other way.

Each state has an associated set of other states which can be reached from this state, i.e. which can become the active state. This defines possible state transitions. A state transition to another state can be linked to a condition, i.e. this state can become active only if the condition is evaluated for the value "true". In addition, for each transition, it is stipulated whether the new state can become active only by virtue of selection by the user or whether this is intended to take place automatically as soon as the linked condition is true. In the example implementation, all states which can become active only by virtue of selection by the user, or the names of said states, are shown in a list on the screen (cf. FIG. 36). The transition is triggered by clicking on the name.

In the example implementation, each state has a method which is executed when it becomes active and a method which is executed when it loses the active status. The first method produces the appropriate screen element for each form field of the state, writes all tasks into the list of tasks and writes all achievable states into the list of states. The second method removes all screen elements which are connected to its form fields and deletes all entries from the lists of tasks or achievable states.

In the example implementation, all types of application blocks are preferably implemented as classes. For each application block which is produced by the application designer and which is stored in the application description, the application manager produces an appropriate object when the application description is loaded. The associations, for example between data fields and formulae or conditions and actions, are implemented by virtue of references to the relevant objects.

9.3 Execution of an Application Description

When the application manager has loaded an application description, the application manager fills all data fields with their default values, calculates all the formulae and evaluates all conditions. The results of the formulae are written to the linked data fields. Furthermore, all the actions linked to conditions are executed, insofar as they have been evaluated to produce the value "true". The application manager then activates the first state (cf. FIG. 35). This involves the application manager setting up the appropriate screen mask and waiting for inputs. The flow of the application is from now on obtained through the interaction of the various objects which produce the application blocks. FIG. 35 shows the flow of an application.

The execution of an application is implemented on two levels. On the first level, the interface, the steps and the form fields or screen elements are used to implement the communication with the user. The interaction between screen elements, form fields and data fields produces a relationship between the inputs of the user and the functionality of the application. This interaction is illustrated in FIG. 36.

On the second level, the functionality of the application is implemented. This occurs by virtue of data fields, formulae, conditions and actions interacting (cf. FIG. 37).

As an aid to understanding, an example flow of a session is described below:
1. The user selects an application and starts it.
2. The manager loads all the application blocks of the application description and produces, for each application block, an object which is valid for the runtime of the application and which produces the application block.
3. Next, all the data fields are assigned initial values, all the formulae are calculated and all the conditions are evaluated.
4. The application manager activates the first state and executes the relevant method. As a result, screen elements are produced for all the form elements in this state and said screen elements are connected to the appropriate data fields. In addition, the lists of tasks and achievable states are filled.
5. The user changes the content of a few data fields.
6. The formulae which are dependent on these data fields are recalculated and write their results to the associated data fields. This initiates the recalculation of further formulae.
7. The conditions which are dependent on the data fields are likewise reevaluated. For each condition which is evaluated for the value true, the associated action is executed. This sometimes allows further calculations and evaluations to be initiated.
8. The user starts a task (action) by clicking on the mouse.
9. The action changes the contents of further data fields and accordingly recalculates formulae again and reevaluates conditions.
10. The evaluation of one of the conditions for the value "true" triggers the transition to another state. First of all, the method is executed when the "old" state is left, as a result of which all the screen elements connected thereto are deleted and the lists of tasks and states are emptied.
11. Next, the "new" state is activated (see step 4).
12. After a few further inputs, the user terminates the current application.

9.4 Possible Supplementary Functions of the Application Manager

In addition to the described main task of integrating application descriptions produced by the application designer into a specific system environment and executing them, the application manager can implement further functions. These can be used for the further integration of an application into the system environment or may be independent of the system environment and/or the applications.

Examples of these are:
Connection of systems for team support such as MS Outlook or Lotus Notes
Integration of functions for team support such as e-mail, calendars or task management with access by applications In summary, the following can be stated:

The achievement of the method described here can best be described by a simple comparison: the method enables a computer to do the work of an application developer, i.e. to analyze a work process which is intended to be implemented on a computer system and to develop an application which maps the work process and can execute it on a computer system. This achievement is produced by the application description generator or application designer, which merely requires a set of electronic basic documents, such as Word documents, Excel work folders or Powerpoint presentations, as an input, with these basic documents playing a role in the work process to be implemented. This corresponds to a procedure for the development of a new work process in which checklists, forms, spreadsheets, lists, text templates or other documents are frequently being developed which can be used to implement the work process.

The application description generator analyzes the basic documents and sets up a knowledge base in which it collects knowledge about the data used, functions and flows of the process which is represented by the basic documents. On the basis of this knowledge, the application designer derives the description of an application which maps the work process. This application description can either be translated into an executable program or can be executed by a kind of interpreter which provides the interface to a user. The latter provides the option of integrating the execution of an application or application description generated by the application generator into any system.

The application description generator preferably essentially comprises a set of specialized modules, each of which performs a defined task as part of the analysis, setup of the knowledge base or setup of the application description. The set of these modules can be expanded as desired, as a result of which the method becomes flexible and scalable.

The knowledge base is a set of defined knowledge elements which are obtained by analyzing the documents and (in the second step) already generated knowledge elements. The knowledge elements describe data and functions of the application; furthermore, the knowledge elements serve as a basis for analyzing the application flow.

The application description comprises a set of defined application blocks which are produced by suitable modules on the basis of the knowledge elements. A crucial advantage of the method is that the application blocks are neither program blocks nor domain-specific. The method preferably dispenses with the prescribed, in particular domain-specific, program code as a necessary part of the application description. As a result, the application description generator is universally usable and requires no kind of domain-specific background knowledge.

The application description generator for designing the application works fully automatically, in principle, but preferably provides a human, called a planner, with multiple options for exerting influence:

The planner can clear the application designer for the use of data source objects (databases, interfaces, etc.) in an existing IT system. This makes it a simple matter to integrate an application produced by the application description generator into the existing IT.

The planner can set parameters which influence the mode of action or the decisions of individual modules of the application description generator.

If the application description generator has multiple alternatives for a decision or is lacking information, it can ask appropriate questions of the planner which the planner needs to answer.

If the application designer has generated an application description, it can provide the planner with the option of optical corrections.

Independently of this, the application description generator also has the option of dealing with missing or uncertain information and making a selection in the event of various decision options.

A coarse overview of the method described is provided by FIG. 1.

List of Contents for the Special Part of the Description:
Part I.
1. Definition of terms
2.1 Knowledge element and knowledge base
   a) Data field
   b) Components
   c) Formulae
   d) Condition
   e) Relationship
   f) Data source
   g) Data source field
   h) Example
2.2 Application blocks
   a) Data field block
   b) Action block
   c) Formula block
   d) Condition block
   e) Task block
   f) State block
   g) Document template block
   h) Form element block
   i) Data source block
2.3 Proposals for production
2.4 Assumptions, facts and knowledge partitions
2.5 Coordination module
2.6 Analysis modules
   a) Document analysis modules
   b) Knowledge element analysis modules
   c) Component analysis modules
   d) Relationship analysis modules
2.7 Determination of the knowledge partition
2.8 Production modules
2.9 Subsequent editing of an application description which has been produced
2.10 Executability of the application description
Part II.
1. Example of the method
2. Strategy of the method
3. Implementation of the knowledge elements
3.1 Data types of data fields
3.2 Implementation of assumptions
3.3 Implementation of formulae
3.4 Implementation of conditions
3.5 Implementation of examples
3.6 Known data source objects
3.7 Implementation of components
4. Coordination module
5. Analysis modules
5.1 Analysis module for the analysis of documents in MS Word format
5.2 Analysis module for the analysis of documents in MS Excel format
5.3 Analysis module for the analysis of data fields
5.4 Analysis module for the analysis of the relationship of components with existing data sources
5.5 Analysis module for the analysis of components which have been identified as data source objects (database tables)
5.6 Analysis module for the analysis of formulae
5.7 Analysis module for the analysis of conditions
5.8 Analysis module for the analysis of master data
5.9 Analysis module for the analysis of components which have been identified as input components
5.10 Analysis module for the analysis of components which have been identified as output components
5.11 Analysis module for the analysis of relationships between two components by a third component
5.12 Analysis module for the analysis of comments
5.13 Analysis module for the analysis of association tables
6. Production modules
6.1 Production module for producing document template blocks for Word documents
6.2 Production module for producing document template blocks for Excel documents
6.3 Production module for producing the data structure
6.4 Production module for producing the flow logic
7. Example of the determination of the knowledge partitions and production of an application description
8. Further method steps, particularly analysis steps
8.1 Checklists
8.2 Treatment of hyperlinks found
8.3 Powerpoint
8.4 Text files
8.5 HTML files
9. Application manager
9.1 Tasks and architecture
9.2 Implementation of the application blocks
9.3 Execution of an application
9.4 Possible supplementary functions of the application manager

| List of reference symbols: | |
| --- | --- |
| 1 | Graph |
| 2 | Node |
| 3 | Node |
| 4 | Node |
| 5 | Node |
| 6 | Node |
| 7 | Node |
| 8 | Node |
| 9 | Directional edge |
| 10 | Directional edge |
| 11 | Directional edge |
| 12 | Directional edge |
| 13 | Nondirectional edge |

The invention claimed is:

1. A method for producing at least one application description, the method which comprises:
   reading-in at least one basic document into a computer;
   analyzing the at least one basic document and thereby constructing a knowledge base with knowledge elements, the knowledge elements thus recognized being at least one data field and/or at least one component, and flagging the knowledge elements at least partly as assumptions;
   determining at least one conflict-free knowledge partition having a respective set of conflict-free assumptions;
   producing the at least one application description with a plurality of application blocks from the at least one knowledge partition with the application blocks, and
   for the purpose of determining the finalized knowledge partitions, generating a graph having nodes and directional and nondirectional edges, wherein the nodes correspond to the assumptions and the directional edges correspond to the prerequisites for the respective assumptions and the nondirectional edges correspond to conflicts between the assumptions.

2. The method according to claim 1, wherein the producing step comprises using application blocks selected from the group consisting of at least one data field block, at least one state block and at least one action block.

3. The method according to claim 1, wherein the step of analyzing the at least one basic document comprises allocating to the data fields properties selected from the group consisting of a name and a list of possible data types.

4. The method according to claim 1, wherein the step of analyzing the at least one basic document comprises allocating to the data fields properties selected from the group consisting of a reference to an origin from which basic document and/or from which component the respective data field stems.

5. The method according to claim 1, wherein the step of analyzing the at least one basic document comprises allocating to the data fields a list of the components which encompasses the data field.

6. The method according to claim 1, which comprises analyzing at least one relationship between the existing knowledge elements as a further knowledge element.

7. The method according to claim 1, which comprises using a dictionary during the analysis which stores similar and/or synonymous descriptors in order to analyze similar and synonymous names.

8. The method according to claim 1, wherein a relationship between two of the data fields is recognized if the names of the two data fields are the same, similar and/or synonymous and/or have other correlations.

9. The method according to claim 1, which comprises recognizing components selected from the group consisting of lists and tables.

10. The method according to claim 1, wherein during the analysis the at least one component is allocated at least one name and/or a set of data fields as properties.

11. The method according to claim 1, wherein analyzing the at least one component comprises allocating properties selected from the group of at least one reference to an origin from which basic document the respective component stems and relationships with other knowledge elements.

12. The method according to claim 1, which comprises reading-in and/or producing at least one existing data source object, and producing a data source and at least one data source field as further knowledge elements for each data source object.

13. The method according to claim 1, which comprises seeking a relationship of the components and/or the data fields with the at least one data source object on the basis of correlations and/or commonalities between the data fields of the component or the data fields, on the one hand, and the data source object, on the other hand, and if a correlation and/or commonality is found, producing the knowledge element which is the relationship between the component and/or the data field, on the one hand, and the data source object, on the other hand.

14. The method according to claim 1, which comprises analyzing the relationship between two components, wherein the relationship consists in mapping of at least one of the data fields of one of the two components onto at least one of the data fields of the other of the two components, wherein the mapping is described by the data fields of a third component.

15. The method according to claim 1, wherein the analysis comprises also flagging at least one of the components as an output component and/or as an input component as a further property.

16. The method according to claim 1, which comprises recognizing at least one formula as a further knowledge element.

17. The method according to claim 1, which comprises recognizing at least one condition as a further knowledge element.

18. The method according to claim 1, which comprises recognizing at least one example as a further knowledge element.

19. The method according to claim 1, which comprises allocating different plausibilities to the assumptions.

20. The method according to claim 1, which comprises determining a partition plausibility for each knowledge partition, and producing the associated application description only if the partition plausibility is greater than a particular setpoint plausibility.

21. The method according to claim 1, which comprises providing analysis modules and performing the analysis with the analysis modules, and providing a plurality of production modules and producing the application description with the plurality of production modules.

22. The method according to claim 1, which comprises providing a coordination module and coordinating with the coordination module the analysis and/or the determination of the at least one knowledge partition and/or providing a user interface for a human planner.

23. The method according to claim 1, wherein when a state block is executed a state of the application is described, wherein the state block describes input options and/or output options and, optionally, a reference to a succeeding state block.

24. The method according to claim 1, wherein the application blocks produced are at least one form element block, wherein the form element block is associated with one of the state blocks.

25. The method according to claim 1, which comprises producing at least one condition block as an application block.

26. The method according to claim 1, which comprises producing at least one formula block as an application block.

27. The method according to claim 1, which comprises producing at least one task block as an application block, wherein the at least one task block is associated with one of the state blocks in order to provide a user with at least one task for selection during the state.

28. The method according to claim 1, which comprises producing at least one data source block as an application block, the data source block describing a data interchange with a data source object.

29. The method according to claim 1, which comprises, subsequent to the producing step, editing the at least one application description.

30. The method according to claim 29, wherein the editing step comprises editing a description of the user interface, including a descriptor of form fields, a positioning of the form fields, and/or a relative size of the form fields.

31. The method according to claim 1, wherein the basic documents are checklists.

32. The method according to claim 31, which comprises analyzing individual items on the checklist and storing as components, and producing a state block for each of the components of the checklists.

33. The method according to claim 31, which comprises producing transitions or proposals for transitions between states that represent successive items on a checklist.

34. The method according to claim 1, wherein the basic documents are charts and/or presentation files, and the method comprises producing for each chart a tuple of data fields and a component which encompasses all data fields.

35. The method according to claim 34, which comprises, during the analysis of the charts and/or presentations, flagging components as output components, and optionally deriving names of the data fields and/or data types of the data fields from labels on the charts.

36. The method according to claim 1, which comprises outputting the at least one application description with a plurality of application blocks.

37. A method for producing at least one application description, the method which comprises:
reading-in at least one basic document into a computer;
analyzing the at least one basic document and thereby constructing a knowledge base with knowledge elements, the knowledge elements thus recognized being at least one data field and/or at least one component, and flagging the knowledge elements at least partly as assumptions;
determining at least one conflict-free knowledge partition having a respective set of conflict-free assumptions;
producing the at least one application description with a plurality of application blocks from the at least one knowledge partition with the application blocks;
providing analysis modules and performing the analysis with the analysis modules, and providing a plurality of production modules and producing the application description with the plurality of production modules; and
using the analysis modules to make proposals for production, wherein the proposals for production are based on particular assumptions and/or facts, and comparing the particular assumptions and/or facts with each of the knowledge partitions, and converting into the application blocks if these particular assumptions and/or facts are contained in one of the knowledge partitions.

38. A method for producing at least one application description, the method which comprises:
reading-in at least one basic document into a computer;
analyzing the at least one basic document and thereby constructing a knowledge base with knowledge elements, the knowledge elements thus recognized being at least one data field and/or at least one component, and flagging the knowledge elements at least partly as assumptions;
determining at least one conflict-free knowledge partition having a respective set of conflict-free assumptions;
producing the at least one application description with a plurality of application blocks from the at least one knowledge partition with the application blocks, wherein the application blocks thus produced include at least one document template block, wherein the structure of a document template is described using a copy with erased data fields from one of the basic documents.

39. An application description generator, comprising a computer program stored in non-transitory form for executing the method according to claim 1 when the program is loaded into and processed on a computer.

40. A computer system, comprising at least one hardware storage device having stored thereon an application description generator configured for executing the method steps according to claim 1 when a corresponding computer program is loaded into a main memory of the computer system.

41. The computer system according to claim 40, which comprises a processor unit configured to execute the method steps when the computer program is loaded into the processor unit.

42. The computer system according to claim 40, which comprises an input unit, an output unit, and a processor unit having at least one processor.

43. A computer-readable memory device, comprising an application description generator stored in non-transitory form configured for executing the method steps according to claim 1 when the application description generator is loaded into a computer memory.

* * * * *